US012644647B2

(12) United States Patent
Merz et al.

(10) Patent No.: US 12,644,647 B2
(45) Date of Patent: Jun. 2, 2026

(54) CARRIER PLATE, LOADING SYSTEM AND FREEZE-DRYING SYSTEM

(71) Applicant: Groninger & Co. GmbH, Crailsheim (DE)

(72) Inventors: Armin Merz, Ellwangen (DE); Roland Engelhard, Aurach-Weinberg (DE)

(73) Assignee: GRONINGER & CO. GMBH, Crailsheim (DE)

( * ) Notice: Subject to any disclaimer, the term of this patent is extended or adjusted under 35 U.S.C. 154(b) by 761 days.

(21) Appl. No.: 18/097,233

(22) Filed: Jan. 14, 2023

(65) Prior Publication Data

US 2023/0228488 A1 Jul. 20, 2023

Related U.S. Application Data

(63) Continuation of application No. PCT/EP2021/069661, filed on Jul. 14, 2021.

(30) Foreign Application Priority Data

Jul. 15, 2020 (DE) ..................... 10 2020 118 727.0

(51) Int. Cl.
*F26B 25/00* (2006.01)
*F26B 5/06* (2006.01)

(52) U.S. Cl.
CPC .............. *F26B 25/003* (2013.01); *F26B 5/06* (2013.01)

(58) Field of Classification Search
CPC ................................ F26B 5/06; F26B 25/003
USPC ..................................................... 34/239, 92
See application file for complete search history.

(56) References Cited

U.S. PATENT DOCUMENTS 4,506,455 A 3/1985 Rossi
5,522,155 A * 6/1996 Jones ...................... A61J 1/065 34/286
5,937,536 A * 8/1999 Kieselbach ............. F26B 5/044 34/92

(Continued)

FOREIGN PATENT DOCUMENTS

CA 2352517 A1 1/2003
CA 2519367 A1 9/2004

(Continued)

OTHER PUBLICATIONS

International Search Report and Written Opinion issued for PCT/EP2021/069661 on Jan. 14, 2022.

(Continued)

*Primary Examiner* — Stephen M Gravini
(74) *Attorney, Agent, or Firm* — Reising Ethington P.C.

(57) ABSTRACT

A carrier plate for inserting containers filled with a medical, pharmaceutical or cosmetic substance into a freeze dryer, wherein the carrier plate comprises a plurality of receptacles that are configured to each receive a container. Furthermore, the present application relates to a carrier plate arrangement having a plurality of such carrier plates. Furthermore, the present application relates to a loading system for a freeze dryer, wherein the loading system comprises one or more handling devices and one or more such carrier plates or the carrier plate arrangement. Furthermore, the present application relates to a loading system and to a freeze-drying system having such a loading system.

41 Claims, 70 Drawing Sheets

(56) References Cited

U.S. PATENT DOCUMENTS

| | | | | | |
|---|---|---|---|---|---|
| 5,964,043 | A * | 10/1999 | Oughton | F26B 5/06 34/92 |
| 7,096,600 | B2 * | 8/2006 | Singh | G21F 9/34 34/494 |
| 8,516,714 | B2 * | 8/2013 | Biemans | A61K 9/19 62/50.7 |
| 9,522,752 | B2 * | 12/2016 | Wissner | F26B 5/06 |
| 9,828,124 | B2 * | 11/2017 | Wissner | B65B 43/42 |
| 10,287,056 | B2 | 5/2019 | Wissner et al. | |
| 10,793,327 | B2 * | 10/2020 | Weimer | A01N 1/162 |
| 12,104,851 | B2 * | 10/2024 | García | F26B 25/003 |
| 12,405,057 | B2 * | 9/2025 | Andrews | A61K 35/16 |
| 2008/0175757 | A1 | 7/2008 | Powell | |
| 2014/0027342 | A1 | 1/2014 | Pawlowski et al. | |
| 2014/0093335 | A1 | 4/2014 | Chiang | |
| 2023/0152036 | A1 * | 5/2023 | Merz | B25J 11/00 34/284 |
| 2023/0228488 | A1 * | 7/2023 | Merz | F26B 25/063 34/236 |

FOREIGN PATENT DOCUMENTS

| | | | | |
|---|---|---|---|---|
| CA | 2698253 | A1 | 4/2009 | |
| CA | 2905204 | A1 | 9/2014 | |
| CA | 2948069 | A1 | 11/2015 | |
| CA | 2996490 | A1 | 3/2017 | |
| CA | 3019789 | A1 | 10/2017 | |
| CA | 3028336 | A1 | 12/2017 | |
| CA | 3075702 | A1 | 4/2019 | |
| CA | 3075703 | A1 | 4/2019 | |
| CA | 3086701 | A1 | 7/2019 | |
| CA | 3226075 | A1 | 1/2020 | |
| CA | 3110336 | A1 | 2/2020 | |
| CA | 3112517 | A1 | 4/2020 | |
| CA | 3120780 | A1 | 6/2020 | |
| CA | 3192432 | A1 | 4/2022 | |
| CA | 3213834 | A1 | 9/2022 | |
| CA | 3231033 | A1 | 3/2023 | |
| CA | 3176846 | C | 11/2023 | |
| CN | 209355688 | U | 9/2019 | |
| DE | 3320848 | A1 | 12/1983 | |
| DE | 19823167 | A1 | 12/1999 | |
| DE | 102008010060 | A1 | 9/2009 | |
| DE | 102012103899 | B4 | 9/2016 | |
| DE | 102015009866 | A1 | 2/2017 | |
| DE | 102020118727 | A1 * | 1/2022 | B25J 21/005 |
| EP | 1275922 | A2 | 1/2003 | |
| EP | 2886983 | A1 | 6/2015 | |
| JP | 2016047750 | A | 4/2016 | |
| KR | 20150009982 | A * | 1/2015 | B65B 7/2892 |
| SU | 1132126 | A1 | 12/1984 | |
| WO | WO2013098834 | A1 | 7/2013 | |
| WO | WO2013164422 | A2 | 11/2013 | |
| WO | WO2016075647 | A1 | 5/2016 | |
| WO | WO2016125095 | A1 | 8/2016 | |
| WO | WO2017178895 | A1 | 10/2017 | |
| WO | WO2019081345 | A1 | 5/2019 | |
| WO | WO-2022013316 | A2 * | 1/2022 | B25J 21/005 |

OTHER PUBLICATIONS

Office action issued by the European Patent Office for application EP 21 746 408.0 on Aug. 13, 2024.

Information Translation of the Office action issued by the European Patent Office for application EP 21 746 408.0 on Aug. 13, 2024.

Kawasaki Robotics: "Handling trays of glass vials—Kawasaki MC004N Robot," Mar. 7, 2014 (Mar. 7, 2014), XP093193300 URL: https://www.youtube.com/watch?v=FzgBo-rN7Jo.

Kawasaki Robotics: "Dispensing & Handling Biomedical Vials—Kawasaki MC004N and YS002N robots," Mar. 7, 2014 (Mar. 7, 2014), XP093193306 URL: https://www.youtube.com/watch?v=oR_y1sar200.

Office action issued by the Canadian Patent Office for application CA 3,186,018 on Jun. 4, 2024.

Office action issued by the German Patent Office for application DE 10 2020 118 727.0 on Apr. 15, 2021.

Informal English translation of the office action issued by the German Patent Office for application DE 10 2020 118 727.0 on Apr. 15, 2021.

Office action issued by the Canadian Patent Office for application CA 3,186,018 on Oct. 9, 2025.

* cited by examiner

CARRIER PLATE, LOADING SYSTEM AND FREEZE-DRYING SYSTEM

CROSS-REFERENCE TO RELATED APPLICATIONS

This is a Continuation application of International patent application PCT/EP2021/069661, filed Jul. 14, 2021, which claims the priority of German patent application DE 10 2020 118 727.0, filed Jul. 15, 2020. Both application PCT/EP2021/069661 and DE 10 2020 118 727.0 are herewith incorporated by reference in their entirety.

FIELD

The present invention generally relates to a carrier plate for inserting containers filled with a pharmaceutical substance into a freeze dryer, wherein the carrier plate comprises a plurality of receptacles for containers. The present invention furthermore generally relates to a loading system for a freeze dryer, wherein the loading system comprises one or more handling devices and one or more such carrier plates. The present invention furthermore generally relates to a freeze-drying system with such a loading system and a freeze dryer.

BACKGROUND

For packaging medical, pharmaceutical or cosmetic substances, it is common to dose these substances into containers and subsequently close them. As containers, for example, vials, carpules, cylindrical ampoules, bottles, syringes, and the like can be used.

Known packaging machines comprise, for packaging these substances, a filling station in which the containers are filled with the substance, a stopper placing station in which a stopper is placed on the containers, and a crimping station in which each container is closed with a crimping cap. The entire packaging process of the substances is performed in an aseptic environment, for example in a clean room or ultra-clean room.

Between the filling station and the crimping station, a freeze-drying station may additionally be arranged, in which the substance is freeze-dried in the containers.

Freeze-drying, which is also referred to as lyophilization or sublimation drying, is a method for gentle drying of products. Freeze-drying is based on the physical process of sublimation. Thereby, the ice crystals sublimate without any intermediate occurrence of a liquid phase directly into the gaseous state. The end product of freeze-drying is called a lyophilizate. Freeze-drying is particularly applied to thermally sensitive products.

Freeze-drying is particularly used for drying of pharmaceutical products. The pharmaceutical industry uses this method to dry drugs that would not be durable for long if dissolved in water. Before intake, the drugs are dissolved again in water.

For freeze-drying, the containers filled with the substance are inserted into a freeze dryer, which performs the freeze-drying. The freeze dryer can comprise, for example, a plurality of placement surfaces on different levels, on each of which several containers can be placed. The individual levels can also be referred to as shelves.

From the prior art, various loading techniques for freeze dryers are known.

For example, the containers can be inserted into the shelves individually or in groups. This loading process can be performed manually or automatically. Individual inserting of the containers into the freeze dryer is very time-consuming and therefore less desirable.

The insertion of container groups into the freeze dryer, i.e., the simultaneous insertion of several containers, requires more complex handling of the containers, since the containers should not be damaged during loading of a freeze dryer, and precise positioning of the containers within the freezer is desirable. The containers can be damaged by impacts, for example. When loading several containers at the same time, it should therefore be paid attention that the containers do not collide with each other. By precise positioning of the containers, a higher packing density can be achieved in the freezer and impacts can be avoided.

It is known, for example, from DE 10 2015 009 866 A1, to push several containers by means of a pusher from a transfer table over a loading bridge onto a placement plate within the freeze dryer.

The moving of individual or several containers within an isolator is disadvantageous, as this encourages impacts and impedes exact positioning.

Furthermore, loading techniques are known from the prior art in which the containers are arranged in transport containers or transport tubs, so-called trays, wherein these trays are inserted into the freeze dryer.

For example, document US 2014/093335 A1 shows a rail transport means for use in a manufacturing process for bottle preparation. The rail transport means provided with a rail and a sliding block slidably mounted on the rail. On the sliding block are provided a first movable guide track, a second movable guide track, a position switching device, and a material loading and unloading mechanism. The rail transport means is capable of automatically transferring feed trays between the filling area and other relative equipment participating in the manufacturing process, such as the freeze dryer and the sealing device, without requiring a manual engagement, thereby enabling the manufacturing process for bottle preparation to be performed in a dust-free and sterile environment, wherein the product yield and the production efficiency are increased.

Furthermore, document WO 2013/098834 A1 shows a loading device for loading containers into freeze dryers that are not configured for automatic loading.

By the loading of a freeze dryer with trays in which the containers are arranged, it is avoided that individual or several containers have to be moved, in particular pushed. This facilitates the handling of a group of containers as well as the positioning of the containers. However, the containers are loosely arranged in the trays and can collide with each other. Moreover, the arrangement in these trays impedes accessibility to the individual containers within a tray.

Furthermore, loading techniques are known from the prior art in which the containers are arranged in nests, wherein the nests with the containers are inserted into the freeze dryer. A nest is understood to be a carrier that comprises receptacles for the containers.

For example, document WO 2013/164422 A2 shows that in a method and a device for treatment or processing of containers used for storing substances for medical, pharmaceutical or cosmetic applications or containing the same, cylindrical containers open at at least one end are automatically guided past or pass through treatment stations for treatment or processing by means of a conveyor device, while the processing stations are jointly held by a carrier in a regular two-dimensional arrangement. The carrier has several openings or containers that determine the regular arrangement. The treatment or processing of the containers is performed at or in at least one of the processing stations while the containers are held by the carrier. This opens up new possibilities for the treatment or processing of the containers, for example, during crimping of metal covers or during freeze-drying.

Furthermore, document WO 2016/075647 A1 discloses a freeze-drying method in which several vials are not in contact with the shelf of the freeze-drying apparatus. The present application is further directed to freeze-drying product and intermediate product obtainable by this method.

Furthermore, document WO 2016/125095 A1 shows a method for freeze-drying a substance, comprising: placing at least one vial containing the substance in a freeze-drying chamber, wherein the at least one vial comprises an opening into which a stopper is inserted in a closed state not allowing gas exchange between the interior and the exterior of the vial; providing mechanical means external to the stopper that are arranged at the opening to restrict upward movement of the stopper; lowering the temperature in the freeze-drying chamber to a predefined value below the freezing temperature of the substance and reducing the pressure in the freeze-drying chamber to a predefined pressure at a predefined temperature, the predefined pressure being chosen such that the force exerted by it on the stopper lifts the stopper from the closed state to an exchange state in which the stopper is only partly inserted in the opening of the vial thereby allowing gas exchange between the interior and the exterior of the vial, wherein the lowering of the temperature within the freeze-drying chamber to the predefined value is performed before the pressure in the freeze-drying chamber is reduced to the predefined pressure, and wherein the lifting of the stopper from the closed state abruptly lowers the pressure in the at least one vial, thereby initiating nucleation in the substance in that vial. In addition, mechanical means are provided which can be used to perform the method for freeze-drying a substance.

Furthermore, document WO 2017/178895 A1 shows systems and methods for aseptically filling pharmaceutical containers with a pharmaceutical substance and then lyophilizing it. The system and the method can employ a lyophilizer loader subsystem having an interior chamber in communication with an interior chamber of a lyophilizer subsystem via a portal with a sealable door, with the collective interior being aseptically sealable. An articulated robotic arm can be employed to batch transfer to the lyophilizer subsystem container nests bearing the pharmaceutical containers. In one refinement, the nests may be transferred serially to the loader subsystem, with the articulated robotic arm being configured to transfer the nests of containers in batches to the lyophilizer subsystem. The articulated robotic arm can also be configured to be used to move batches of nests within the lyophilizer subsystem. One implementation includes two articulated arms and a joint rotary wrist driven by two rotary shoulders.

Furthermore, document EP 2 886 983 A1 shows a holder structure for simultaneously holding a plurality of containers for substances for cosmetic, medicinal or pharmaceutical applications. The holder structure comprises a carrier comprising a plurality of openings or receptacles into which the containers can be inserted, as well as holding means for holding the containers in the openings or receptacles of the holder structure, wherein the holder structure comprises a longitudinal direction (x) and a transversal direction (y). Respectively immediately adjacent holder structures can be directly connected with each other such that they are immovable relative to each other in the longitudinal direction and/or in the transversal direction. The releasable, temporary connection allows a plurality of holder structures to be connected with each other and to be jointly inserted into a processing or process station, such as a freeze dryer, and removed therefrom again.

Nests, like trays, facilitate the handling of groups of containers. In addition, arrangement in nests prevents containers from being able to collide with each other. The nests used in the prior art for loading a freeze dryer, however, are designed so as to impede the accessibility to the containers, making it difficult to insert the containers into the nest and to remove the containers from the nest. This follows on the one hand from the fact that the used nests are usually designed so as to protect the containers over a large area. For this, the individual receptacles of the nest are configured such that they reach to the neck of the bottle or to the filling opening of the individual containers. This makes the accessibility to the containers more difficult. Alternatively, the nests used in the prior art are designed such that the containers hang freely in the nests, that is, are held at the neck of the bottle. This also makes accessibility to the containers as well as inserting and removing them more difficult, since in such nests two handling devices are required for removing and inserting, one arranged below the containers to lift a container from a receptacle of the nest or place it therein, and a further one arranged above the containers to grip and transfer a lifted container.

The known loading techniques for freeze dryers still leave room for improvements. In particular, there is a need regarding easy, safe and accurate handling of a plurality of containers when inserted into a freeze dryer. Furthermore, means used to handle the containers shall be compact and easy to handle or control.

SUMMARY

It is therefore an object of the present application to provide means for inserting containers filled with a pharmaceutical substance into a freeze dryer, by means of which a plurality of containers can be easily, safely, and accurately inserted into a freeze dryer.

Furthermore, it is an object of the present application to provide means for inserting containers filled with a pharmaceutical substance into the freeze dryer which are easy to handle.

In a first aspect, there is provided a carrier plate for inserting containers filled with a pharmaceutical substance into a freeze dryer, wherein the carrier plate comprises a plurality of receptacles for containers.

In general, a plate is a flat, planar and, in particular, stiff component. A plate comprises in a first and second spatial direction a base surface and in a third spatial direction a thickness. The spatial directions are each pairwise perpendicular to each other. The first and second spatial directions can also be referred to as the length and width directions of the carrier plate. The third direction corresponds to a height direction of the carrier plate. Correspondingly, the plate has in the length direction a length and in the width direction a width, wherein the length is greater than or equal to the width. The thickness of the carrier plate is thereby substantially smaller than the length and width of the plate. Substantially smaller can mean, for example, that the length and width of the plate are at least five times as large, preferably at least seven times as large, in particular at least ten times as large, as the thickness of the plate. The base surface can in principle comprise any arbitrary form. For example, the base surface can be round, oval, triangular, quadrangular, or polygonal. In particular, the plate can comprise a rectangular or square form. In other words, the plate can be, for example, a rectangular or square plate.

A carrier plate is a plate configured to support objects on its plane. The carrier plate is thus configured to support containers on its plane. A carrier plate can also be referred to as a plate-shaped carrier.

The thickness of the carrier plate can amount to 0.5 cm to 5 cm, preferably 0.8 cm to 1.5 cm, in particular 1 cm. A length of the plate can preferably amount to 10 cm to 150 cm, preferably to 20 cm to 80 cm, in particular to 30 cm, 40 cm, 50 cm, 60 cm or 70 cm. A width of the plate can preferably amount to 10 cm to 150 cm, preferably to 20 cm to 80 cm, in particular to 30 cm, 40 cm, 50 cm, 60 cm or 70 cm. In the case of a rectangular plate, the length of the plate can be, for example, twice the width of the plate. In the case of a square plate, length and width are of equal size.

As containers, for example, vials, carpules, cylindrical ampoules, bottles, syringes, and the like can be used. For example, the containers can comprise a cylindrical form. The containers can comprise a volume between 1 ml and 100 ml. The containers can comprise a diameter between 10 mm and 100 mm, in particular between 16 mm and 30 mm. The containers can comprise a height between 20 and 200 mm, preferably between 35 mm and 75 mm. In particular, as containers, vials of types 2R to 30R according to DIN/ISO 8362 can be used. These container types are listed below in Table 1.

TABLE 1

| Typ | Volume [ml] | Diameter [mm] | Height [mm] | Wall thickness [mm] |
|---|---|---|---|---|
| 2R | 4 | 16 | 35 | 1 |
| 4R | 6 | 16 | 45 | 1 |
| 6R | 10 | 22 | 40 | 1 |
| 8R | 11.5 | 22 | 45 | 1 |
| 10R | 13.5 | 24 | 45 | 1 |
| 15R | 19 | 24 | 60 | 1 |
| 20R | 25 | 30 | 55 | 1.2 |
| 25R | 30.5 | 30 | 65 | 1.2 |
| 30R | 36 | 30 | 75 | 1.2 |

A container of type 2R is designed for a filling quantity of 2 ml. Correspondingly, the containers of types 4R to 30R are designed for filling volumes of 4 ml to 30 ml. The number in the type designation thus indicates the intended filling quantity of the substance to be filled.

The receptacles of the carrier plate are configured such that each receptacle can receive a respective container. In other words, each receptacle is configured for the reception of respectively one container. The receptacles are arranged on the plane of the carrier plate so that the containers, when arranged in the receptacles, are carried by the carrier plate. In other words, this plane of the carrier plate in the operating state, i.e., when the containers are carried, is an upper side of the carrier plate, so that the containers stand on the plane, i.e., on the upper side, of the carrier plate when the containers are received in the receptacles and are carried by the carrier plate. In other words, the containers are held in the receptacles in the operating state. Through this, it is achieved that the containers are safely spaced apart from each other when inserted into the freeze dryer or when removed from the freeze dryer and thus cannot bump or rub each other.

By the plate-shaped configuration of the carrier plate, it is furthermore achieved that the containers can be easily placed on the carrier plate in the receptacles or received from the carrier plate out of the receptacles. Due to the plate-shaped, i.e., flat, configuration, only a lower part of the containers, for example a bottom portion, is arranged in the receptacles. In other words, each receptacle holds only a bottom portion of the respective container arranged therein. In this way, a majority of a container is accessible so that the containers can be easily inserted into the receptacles and removed again therefrom. In other words, the carrier plate can be more easily equipped with containers and subsequently emptied again.

In a second aspect, there is provided a carrier plate arrangement having a plurality of carrier plates for inserting containers filled with a pharmaceutical substance into a freeze dryer, wherein each carrier plate comprises a plurality of receptacles for containers, wherein each carrier plate comprises a first coupling portion and a second coupling portion, wherein the first coupling portion of each carrier plate is couplable with the second coupling portion of an adjacent carrier plate.

By means of such a carrier plate arrangement, several carrier plates can be coupled with each other. As a result, several coupled carrier plates can be moved together. It is thus possible to insert several carrier plates in the coupled state together into the freeze dryer or to remove them from the freeze dryer again. This is in particular of advantage if several carrier plates can be arranged one behind the other on a placement surface of the freeze dryer. Instead of pushing the carrier plates individually one after the other into the freeze dryer onto the placement surface or pulling them off the placement surface, several coupled carrier plates can be moved simultaneously on the placement surface. By this, the inserting of the carrier plates into the freeze dryer and the removing of the carrier plates from the freeze dryer is further simplified.

In a third aspect, there is provided a loading system for a freeze dryer, wherein the loading system comprises one or more handling devices and one or more carrier plates according to the first aspect or a carrier plate arrangement according to the second aspect.

By means of the loading system, a freeze dryer can be loaded and/or unloaded with the carrier plates. The handling devices can thereby be configured for handling the carrier plates and/or the containers.

In a fourth aspect, there is provided a freeze-drying system having a freeze dryer and a loading system according to the third aspect.

By the proposed carrier plate, carrier plate arrangement, loading system, and freeze-drying system, means for inserting containers filled with a pharmaceutical substance into a freeze dryer are provided, by means of which a plurality of containers can be easily, safely, and accurately inserted into a freeze dryer. Furthermore, these means are themselves easy to handle and to control.

In a first refinement, the receptacles of the carrier plate are configured by recesses in the surface of the carrier plate.

When a container is received in a receptacle, the container thus stands in the recess and is held by the edge of the recess. The recess can comprise a depth of 0.1 cm to 1 cm, preferably 0.3 to 0.7 cm, in particular 0.5 cm. Preferably, the recesses are at maximum half as deep as a height of the containers, so that a maximum of 50% of the container is enclosed by the receptacle. The depth of the recess can correspond to 5% to 50%, preferably 7% to 20%, in particular 10% of the height of the containers.

In other words, the recesses are configured to receive a bottom part or bottom portion of the container. In particular, at least 50% of the container can extend out of the recess. As a result, the handling is improved because the containers are better accessible hereby.

In a further refinement, the receptacles of each carrier plate comprise a cylindrical form.

In particular, the recesses of the receptacles can be configured cylindrically. The form of the receptacles can thus be adapted to cylindrical containers. As a result, in particular cylindrical containers can be held in the receptacle such that they contact the edge of the receptacle over their full circumference. In this way, a secure hold in the receptacle is improved.

In a further refinement, the plurality of receptacles comprises first receptacles for receiving first containers of a first container type and second receptacles for receiving second containers of a second container type.

The first container type and the second container type are different. The first and second receptacles can be configured by recesses in the surface of the carrier plate, wherein the configuration, i.e., shape and size, of the recesses are adapted to the respective container type. The first container type can comprise a first container size, for example, and the second container type can comprise a second container size. For example, the first container type can be 2R and the second container type can be 6R. In this way, different container types can be received by means of a carrier plate. In particular, the same carrier plate can be further used if containers of a different container type shall be used for packaging a substance. As a result, it is no longer necessary to use a specific carrier for each container type, which would have the consequence that in case of a change of container type, a different carrier is to be used as well. Instead, the same carrier plate can be used for at least two different container types. As a result, the flexibility is increased and the handling is further simplified.

In a further refinement, a diameter of the first and second receptacles substantially corresponds to a diameter of the respective container type.

In particular, the recess of each first and second receptacle comprises a diameter that substantially corresponds to the diameter of the respective container type. In essence, this means that the diameter of a receptacle is configured such that the corresponding containers can be arranged in this receptacle without play. In this way, the first and second receptacles are adapted to the respective container type.

In a further refinement, the first receptacles are smaller than the second receptacles, in particular wherein the diameter of the first receptacles is smaller than the diameter of the second receptacles.

In particular, the diameter of the recesses of the first receptacles is smaller than the diameter of the recesses of the second receptacles. Correspondingly, the first receptacles are configured for a smaller container type and the second receptacles are configured for a larger container type, wherein the first container type is smaller than the second container type. In particular, a diameter of the first containers is smaller than a diameter of the second containers. For example, the first container type can be 2R or 4R and the second container type can be 6R or 8R. Alternatively, the first container type can be 6R or 8R and the second container type can be 10R or 15R. Alternatively, the first container type can be 10R or 15R and the second container type can be 20R, 25R, or 30R.

In a further refinement, the carrier plate comprises a first side surface on which the receptacles are arranged.

In principle, a plate comprises two side surfaces that are arranged on opposite sides of the plate and extend in the width and length directions. The two side surfaces are thus distanced from each other corresponding to the thickness of the plate.

In a further refinement, the first receptacles and the second receptacles are arranged on a first side surface of the carrier plate.

In other words, the first and second receptacles are arranged together on a side surface.

The arrangement of the first and second receptacles on the same side surface has the consequence that the first and second containers can be arranged on the same side surface. In this way, for example, first containers of the first container type can be arranged on the carrier plate first and subsequently second containers can be arranged on the carrier plate without having to change the orientation of the plate. Alternatively, containers of two different container types could be arranged on the plate at the same time as well.

In a further refinement, the first side surface in an operating position is the top side of the carrier plate.

In the operating position, the top side of the carrier plate is the side on which the containers can stand. Correspondingly, the second side surface in this operating position is the bottom side of the carrier plate. The bottom side is arranged opposite to the top side. In the operating position, no containers can stand on the bottom side. In this operating position, the first containers are arrangeable in the first receptacles and/or the second containers are arrangeable in the second receptacles. Thereby, the respective containers stand in the corresponding receptacles on the carrier plate.

In a further refinement, the receptacles are distributed at regular distances, in particular according to a regular pattern, on the first side surface.

A regular distribution of the receptacles facilitates the insertion and removal of the containers. For example, the receptacles can be arranged in rows.

In a further refinement, each receptacle comprises the same distance to adjacent receptacles.

In this way, the inserting and removing of the containers is further facilitated.

In a further refinement, the receptacles are distributed in a pattern on the first side surface, wherein the pattern is configured such that the receptacles are each arranged adjacent to each other in two or three spatial directions.

In the case of two spatial directions, the two spatial directions can be arranged orthogonally to each other. In the case of three spatial directions, the three spatial directions can be arranged at an angle of 60° to each other. Both patterns provide a highly ordered distribution of receptacles. In both patterns, the receptacles of one type are arranged in rows. The arrangement in rows allows that several containers, in particular a complete row of containers, can be arranged in receptacles simultaneously and at the same time easily. The second pattern, in which the receptacles are arranged spaced apart from each other in three spatial directions, is particularly preferred because this pattern allows the best packing density of containers on the carrier plate.

In a further refinement, the first receptacles and the second receptacles are distributed at regular distances, in particular according to a regular pattern, on the first side surface.

A regular distribution of the first and second receptacles facilitates insertion and removal of the containers. For example, the first and the second receptacles can each be arranged in rows. In particular, each row of second receptacles can be followed by two rows of first receptacles. Preferably, two successive rows of first receptacles comprise an offset from each other corresponding to half the distance between two adjacent first receptacles, wherein two successive rows of second receptacles comprise an offset from each other corresponding to half the distance between two adjacent second receptacles.

In a further refinement, each first receptacle comprises the same distance to adjacent first receptacles, wherein each second receptacle comprises the same distance to adjacent second receptacles.

In this way, a very ordered distribution of the first and second receptacles on the first side surface is achieved. As a result, the insertion and removal of the containers is further facilitated.

In a further refinement, the first and second receptacles are distributed in a pattern on the first side surface, wherein the pattern is configured such that the first receptacles or the second receptacles are each arranged adjacent to one another in two or three spatial directions.

As previously described, these two pattern variants for arranging the receptacles provide a highly ordered distribution of the receptacles, wherein in both patterns the receptacles of one type are arranged in rows. The arrangement in rows enables that several containers of one container type, in particular a complete row of containers, can be simultaneously and at the same time easily inserted into the corresponding receptacles.

In a further refinement, a distance between adjacent first receptacles is half as great as a distance between adjacent second receptacles.

As a result, the distribution ratio of the first receptacles to the second receptacles amounts to 4:1. A distribution ratio of 4:1 is particularly advantageous when the second receptacles are larger than the first receptacles. In this way, the packing density of the receptacles is further optimized.

In a further refinement, a respective second receptacle is arranged between three or four adjacent first receptacles.

A second receptacle has three adjacent first receptacles when the first receptacles and the second receptacles are each arranged adjacent to each other in three spatial directions. A second receptacle has four adjacent receptacles when the first receptacles and the second receptacles are each arranged adjacent to each other in two spatial directions. In this way, the packing density of the receptacles is further optimized, as the second receptacles are suitably arranged between the first receptacles.

In a further refinement, the first and second receptacles partially overlap.

In this way, the packing density of the receptacles on the carrier plate can be further optimized. The overlap is in particular such that each receptacle for the corresponding first or second container forms at least three abutment points which are arranged such that the container is held in the receptacle.

In a further refinement, the carrier plate comprises a first plate and a second plate that are connected to each other, wherein the first plate forms the walls of the plurality of receptacles, in particular the first and second receptacles, wherein the second plate forms the bottoms of the plurality of receptacles, in particular the first and second receptacles.

As a result, the carrier plate is configured by two plates connected with each other. The first plate thereby forms the first side surface and the second plate forms a second side surface of the carrier plate, wherein the second side surface opposes the first side surface. As a result, the top side and the bottom side of the carrier plate are each configured by one of the plates. Moreover, the first and the second plates can be manufactured separately and connected to each other only for forming the carrier plate, which facilitates the manufacturing process.

In a further refinement, the second plate is formed of a material that comprises a coefficient of thermal conductivity that is greater than or equal to 5 W/(m×K), in particular greater than or equal to 8 W/(m×K), in particular greater than or equal to 10 W/(m×K), in particular greater than or equal to 15 W/(m×K).

In this way, an effective cooling of the substance in the container during the freeze-drying is achieved via the bottom of the receptacles.

In a further refinement, the second plate is manufactured from a metal, in particular from a stainless steel, in particular wherein the first plate is manufactured from a plastic.

Metals have a coefficient of thermal conductivity that is mostly much greater than 5 W/(m×K). Due to the manufacture of the second plate from a metal, therefore, effective cooling of the substance in the container during the freeze-dryer is likewise achieved via the bottom of the receptacles.

In a preferred refinement, the first plate is made of a stainless steel and the second plate is made of a plastic.

The use of stainless steel for the second plate enables effective cooling of the substance in the container during the freeze-drying via the bottom of the receptacles, while the use of a plastic for the first plate improves its manufacturability. Additionally, this results in a weight reduction, which in turn is advantageous for the handling by means of robots. For example, the first plate can be manufactured from plastic by means of an injection molding process. Stainless steel and plastic are furthermore particularly suitable for clean room applications due to their properties.

In a further refinement, the plurality of receptacles furthermore comprises, on a second side surface, third receptacles for receiving third containers of a third container type and/or fourth receptacles for receiving fourth containers of a fourth container type, wherein the second side surface opposes the first side surface.

In this way, the carrier plate is configured to be able to receive four different container types. In particular, the first, second, third and fourth containers can comprise different diameters. As a result, the range of application of the carrier plate is further increased, since by means of one carrier plate four different container types can be handled.

In a further refinement, the third receptacles and/or the fourth receptacles are distributed at regular distances, in particular according to a regular pattern, on the second side surface.

The regular distribution of the third and/or fourth receptacles on the second side surface, in particular the pattern of distribution, is preferably configured corresponding to the previously described variants for the distribution of the first and second receptacles on the first side surface.

In a further refinement, in a first operating position, the first side surface is a top side of the carrier plate and the second side surface is a bottom side of the carrier plate, wherein in a second operating position, the second side surface is a top side of the carrier plate and the first side surface is a bottom side of the carrier plate.

In the first operating position, the first and/or second containers are thus arrangeable in the corresponding first and/or second receptacles. In the second operating position, the third and/or fourth containers are arrangeable in the corresponding third and/or fourth receptacles.

In an alternative refinement, the first receptacles are arranged on the first side surface of the carrier plate and the second receptacles are arranged on the second side surface of the carrier plate that opposes the first side surface.

Thereby, in the first operating position, the first containers are arrangeable in the first receptacles and, in the second operating position, the second containers are arrangeable in the second receptacles. In this way, it is also enabled that at least two different container types can be handled by means of one carrier plate, whereby the range of application of the carrier plate is increased.

In a further refinement, the carrier plate comprises a first coupling portion, by means of which the carrier plate is couplable with a corresponding coupling portion of another object.

In the coupled state, the movement of the carrier plate is coupled with the movement of the other object. As a result, the carrier plate and the other object are movable together. For example, the carrier plate can be moved by the other object. In this way, the handling of the carrier plate can be further improved.

In a further refinement, the first coupling portion is arranged on a first edge side of the carrier plate.

The edge sides extend between the first side surface and the second side surface, that is, in at least one operating state, between the top side and the bottom side. The edge sides of a carrier plate are better accessible for coupling than the first and second side surfaces. The first edge side is arranged opposite to a second edge side. Preferably, the first coupling portion is arranged centrally on the first edge side. In other words, the first coupling portion is arranged on the first edge side where a center axis of the carrier plate that extends from the first edge side to the second edge side intersects the first edge side. In the operating position of the carrier plate, the center axis is arranged parallel to the insertion direction. The center axis runs in particular parallel to the side surfaces and perpendicular to the first and second edge side.

In a further refinement, the first coupling portion comprises a holding member, wherein the second coupling portion of the other object is engageable with the holding member for coupling.

The holding member can comprise, for example, a rod or a web with which the first coupling portion is engageable with a corresponding element of the second coupling portion. The element of the second coupling portion can be, for example, configured hook-shaped so as to be engageable with the holding member. For example, the member of the second coupling portion can hook with the holding member to couple the first coupling portion with the second coupling portion. In this way, a simple coupling of the coupling portions is enabled.

In a further refinement, the first coupling portion comprises a recess, wherein the holding member is arranged in the recess, wherein the recess is configured such that the second coupling portion of the other object can engage the recess to couple the carrier plate with the other object.

Preferably, the recess is arranged at the first edge side and is open outwardly. The recess can be open at the first edge side and at the first side surface and/or the second side surface. The recess can in particular extend from the first side surface to the second side surface. In particular, the recess can be configured in a U-shape. The holding member can extend through the recess, in particular from a first side of the recess to a second, opposite side of the recess. By engaging the second coupling portion in the recess, the coupling is further simplified.

In a further refinement, the other object is a first adjacent carrier plate, wherein the coupling portion of the other object is a second coupling portion of the adjacent carrier plate.

In other words, the carrier plate comprises a first coupling portion and the adjacent carrier plate comprises a corresponding second coupling portion, wherein the two carrier plates are couplable with each other by means of the two coupling portions. In the coupled state, the two carrier plates can be moved together. In this way, the handling of several carrier plates is facilitated. In particular, several carrier plates can be inserted into the freeze dryer or removed therefrom again together in the coupled state. Furthermore, the carrier plates can also be moved together on a placement surface within the freeze dryer, in particular pulled or pushed. As a result, the handling and positioning of several carrier plates in a freeze dryer is improved.

In a further refinement, the carrier plate comprises a second coupling portion by means of which the carrier plate is couplable with a corresponding first coupling portion of a second adjacent carrier plate.

The carrier plate thus comprises two coupling portions by means of which the carrier plate is couplable with an adjacent carrier plate and with a further object. The further object can be, for example, a further adjacent carrier plate, so that by means of the coupling portions three or more carrier plates are couplable with each other. The further object can also be a handling tool, for example a handling robot, by means of which the carrier plate and the adjacent carrier plate coupled with the carrier plate via the second coupling portion can be moved. As a result, the handling and positioning of several carrier plates, in particular in a freeze dryer, is further improved.

In a further refinement, the second coupling portion of the carrier plate is arranged on a second edge side of the carrier plate that opposes the first edge side.

In this way, for example, three or more carrier plates or two carrier plates and a further object can be coupled with each other in a row. Preferably, the second coupling portion is arranged centrally on the second edge side. In other words, the second coupling portion is arranged on the second edge side where the center axis of the carrier plate intersects the second edge side.

In a further refinement, the second coupling portion comprises a locking member, wherein the first coupling portion is engageable with the locking member for coupling.

The locking member can comprise, for example, a hook or hook-shaped member with which the second coupling portion is engageable with a corresponding member (for example, the aforementioned holding member) of the first coupling portion. For example, the hook-shaped member of the second coupling portion can hook with the holding member to couple the first coupling portion to the second coupling portion. In this way, simple coupling of the coupling portions is enabled.

In a further refinement, the holding member of the first coupling portion of the carrier plate is configured such that the locking member of the second coupling portion of the first adjacent carrier plate can be engaged with the holding member of the first coupling portion of the carrier plate to couple the carrier plate with the first adjacent carrier plate.

The holding member of the first coupling portion of the carrier plate is preferably configured such that the locking member of the second coupling portion of the first adjacent carrier plate can engage the recess of the holding member of the first coupling portion of the carrier plate to couple the carrier plate with the first adjacent carrier plate. In this way, two carrier plates can be easily handled together.

In a further refinement, the locking member of the second coupling portion of the carrier plate is configured such that it can be engaged with the holding member of the first coupling portion of the second adjacent carrier plate to couple the carrier plate with the second adjacent carrier plate.

The locking member of the second coupling portion of the carrier plate is preferably configured such that it can engage the recess of the holding member of the first coupling portion of the second adjacent carrier plate to couple the carrier plate with the second adjacent carrier plate. In this way, two carrier plates can be easily handled together.

In a further refinement, each carrier plate comprises two third coupling portions by means of which the carrier plate is couplable with corresponding coupling portions of the other object.

In the coupled state, the movement of the carrier plate is coupled with the movement of the other object. As a result, the carrier plate and the other object are movable together. For example, the carrier plate can be moved by the other object. In this way, the handling of the carrier plate can be further improved. By the use of two coupling portions for transferring the carrier plate, the carrier plate can be transferred more stably.

In a further refinement, the two third coupling portions are arranged on the second edge side of the carrier plate.

Preferably, the third coupling portions are arranged symmetrically with respect to the center axis of the carrier plate. The second coupling portion of the carrier plate is thus arranged between the two third coupling portions of the carrier plate. In particular, the second coupling portion comprises the same distance to both third coupling portions.

In a further refinement, each third coupling portion comprises a holding member, wherein the coupling portion of the other object is engageable with the holding member for coupling.

The holding member can comprise, for example, a rod or a web with which the first coupling portion is engageable with a corresponding element of the second coupling portion. The element of the second coupling portion can be, for example, configured hook-shaped so as to be engageable with the holding member. For example, the member of the second coupling portion can hook with the holding member to couple the first coupling portion with the second coupling portion. In this way, a simple coupling of the coupling portions is enabled.

In a further refinement, each third coupling portion comprises a recess, wherein the holding member is arranged in the recess, wherein the recess is configured such that the coupling portion of the other object can engage the recess in order to couple the carrier plate with the other object.

Preferably, the recess is arranged at the second edge side and is open outwardly. The recess can be open at the second edge side and at the first side surface and/or the second side surface. The recess can in particular extend from the first side surface to the second side surface. In particular, the recess can be configured to be U-shaped. The holding member can extend through the recess, in particular from a first side of the recess to a second, opposite side of the recess. By engaging the coupling portion of the other object in the recess, the coupling is further simplified. For example, the other object can be a receiving device or a linear unit of a handling device. The other object can also be a robot.

In a further refinement, the other object is a handling device.

In this way, the handling device can be coupled with the carrier plate to handle the carrier plate, in particular to move the carrier plate. For example, the handling device can be configured to lift, place, push, and/or pull the carrier plate. The handling device is preferably a handling robot that is configured to handle the carrier plate. The handling robot can comprise an end effector for handling the carrier plate. The handling robot can comprise a multi-jointed arm at the end of which the end effector can be arranged, wherein the end effector is movable in space by means of the arm.

In a further refinement, the handling device comprises a receiving device having at least one receiving member each forming at least one coupling portion, wherein the first coupling portion of the carrier plate or each third coupling portion of the carrier plate is engageable with the coupling portion of the respective receiving member for coupling.

In this way, the carrier plate can be easily coupled with the handling device. The end effector of the handling robot can comprise the receiving device with the receiving member. Each receiving member is preferably hook-shaped or configured as a hook, wherein the receiving member is hooked with the first or third coupling portions of the carrier plate for coupling.

In a further refinement, the holding member of the first or each third coupling portion of the carrier plate is configured such that the respective receiving member can be engaged with the corresponding holding member of the first or third coupling portion of the carrier plate to couple the handling device with the carrier plate.

In this way, the carrier plate is easily coupled with the handling device so that the handling device can move the carrier plate. The holding member of the first or third coupling portion of the carrier plate is preferably configured such that the receiving member can engage the recess of the first coupling portion of the carrier plate to couple the handling device with the carrier plate. In particular, the receiving member is hooked with the holding member for coupling.

In a further refinement, the handling device comprises a linear unit having a pushing member that forms at least one coupling portion, wherein the first coupling portion or every third coupling portion of the carrier plate is engageable with the corresponding coupling portion of the pushing member for coupling.

For this purpose, the pushing member can be configured such that it can engage the recess of the first or any third coupling portion of the carrier plate to couple with the first or any third coupling portion. In the coupled state, the pushing member can then push the carrier plate in an insertion direction and pull it against the insertion direction. In particular, each coupling portion of the pushing member can comprise a protrusion extending downwardly from the bottom side of the pushing member. Each protrusion can be engaged with the recess of the first coupling portion or engaged with a corresponding recess of a respective third coupling portion to pull and/or push the carrier plate.

In a further refinement, adjacent carrier plates are coupled with each other by means of the corresponding first and second coupling portions, in particular so that the carrier plates can be pushed and pulled together.

In this way, a plurality of carrier plates can be easily handled together.

In a further refinement, the plurality of carrier plates comprises a first carrier plate, a second carrier plate, and a third carrier plate, wherein first carrier plate is coupled with the second carrier plate and the second carrier plate is coupled with the third carrier plate.

In particular, the second coupling portion of the first carrier plate is thereby coupled with the first coupling portion of the second carrier plate, and the second coupling portion of the second carrier plate is coupled with the first coupling portion of the third carrier plate. In this way, three carrier plates can be moved together, in particular pushed and pulled. As a result, the inserting and removing of several carrier plates into the freeze dryer, in particular onto a placement surface of the freeze dryer, is simplified.

In a further refinement, at least one of the handling devices is configured to insert the containers into the receptacles of a carrier plate and/or to remove the containers from the receptacles of the carrier plate.

This handling device is preferably a handling robot having a gripping device. For example, the gripping device can be configured to grip one or several containers to handle them. In this way, the carrier plate can be easily loaded or unloaded with containers. This is particularly advantageous if the containers are transported on or off individually and are arranged in a carrier plate for loading the freeze dryer.

In a further refinement, at least one of the handling devices is configured to push one or more carrier plates into the freeze dryer and/or pull them out of the freeze dryer.

The handling device is preferably a linear unit having a pushing member. By means of the pushing member, the carrier plates can be pushed into the freeze dryer, in particular onto a placement surface of the freeze dryer. In particular, the pushing member can also couple with the first coupling portion of a carrier plate to move the carrier plate horizontally. If several carrier plates are coupled with each other, for example as a carrier plate arrangement, the pushing member can move these carrier plates horizontally. By means of the pushing member, one or several carrier plates can then be pushed into the freeze dryer and/or pulled out of the freeze dryer. In particular, the carrier plates can be pushed onto a placement surface of the freeze dryer and/or pulled off the placement surface in this way.

In a further refinement, at least one of the handling devices is configured to couple with at least one carrier plate in order to move the at least one carrier plate.

The handling device is preferably a handling robot having a receiving device. As previously described, the receiving device can comprise at least one, in particular hook-shaped, receiving member that is couplable with the first or third coupling portion of a carrier plate. By means of the handling device, the carrier plate can be lifted and placed. Moreover, by means of the handling device, the carrier plate can be moved horizontally, in particular pushed and pulled. In this way, the carrier plates can be easily handled in the loading system by means of this handling device. For example, the carrier plates can be provided by means of this handling device in a handling station, in particular on a transfer plate of the handling station, of the loading system. Furthermore, this handling device can also be used to insert the carrier plates at least partially into the freeze dryer. For example, the carrier plates by means of this handling device can be at least partially pushed from the transfer plate onto a placement surface of the freeze dryer and/or pulled from the placement surface of the freeze dryer back onto the transfer plate.

It is understood that the above features and those to be explained below can be used not only in the combination indicated in each case, but also in other combinations or on their own, without departing from the scope of the present invention.

DRAWINGS

Embodiments of the invention are shown in the drawings and are explained in more detail in the following description. Showing:

Figure 46:
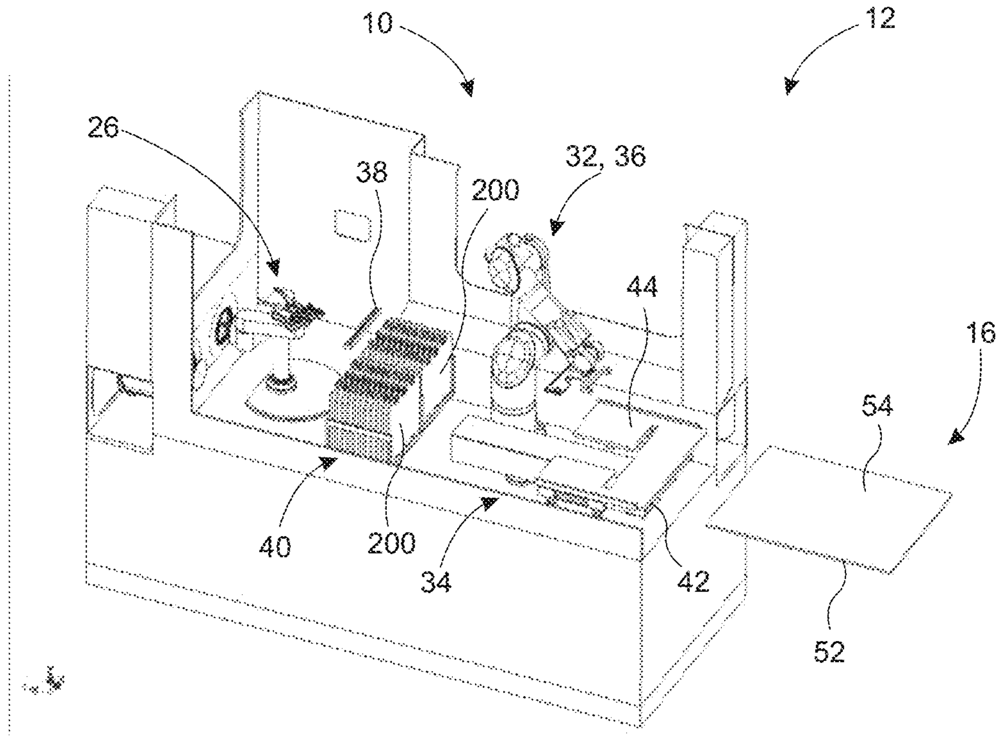
FIG. 46 is an isometric view of a third embodiment of a loading system for a freeze dryer.
Figure 47A:
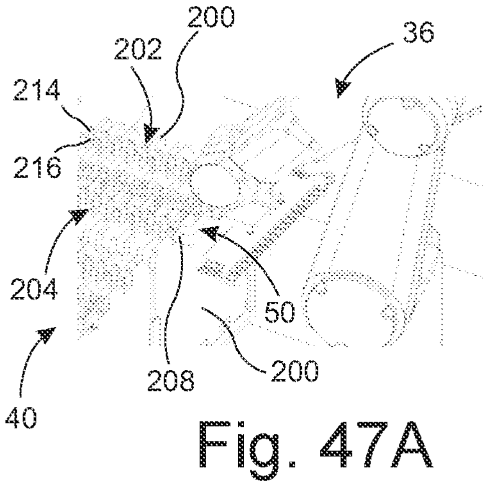
Figure 47B:
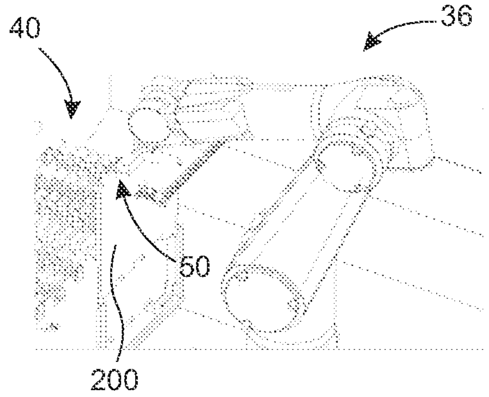
Figure 47C:
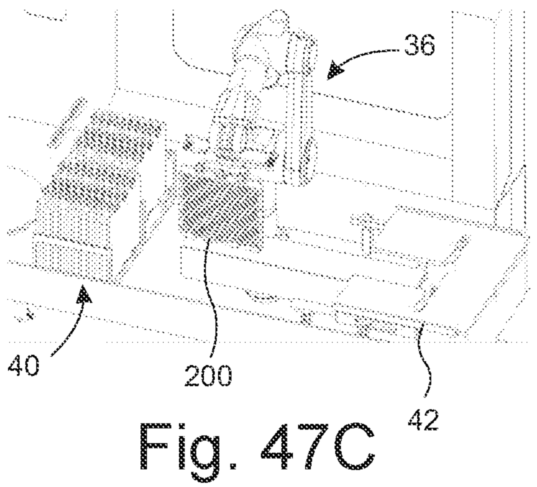
Figure 47D:
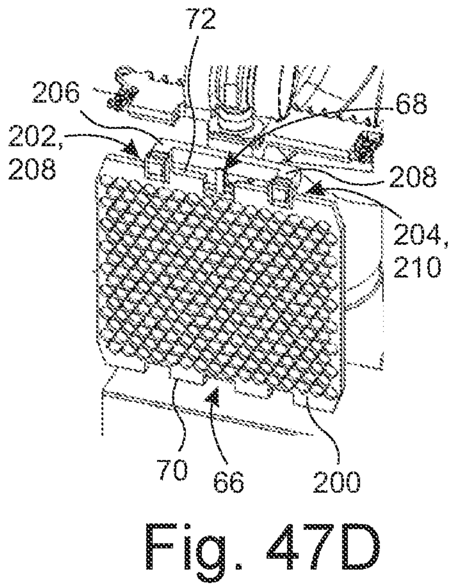
Figure 48A:
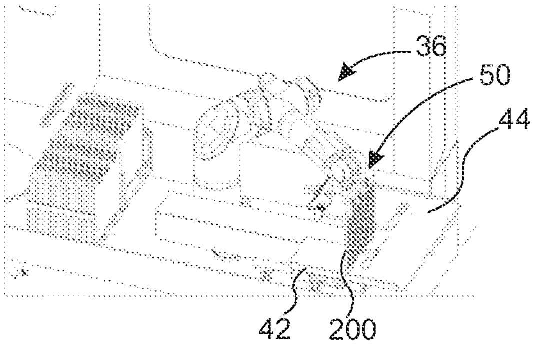
Figure 48B:
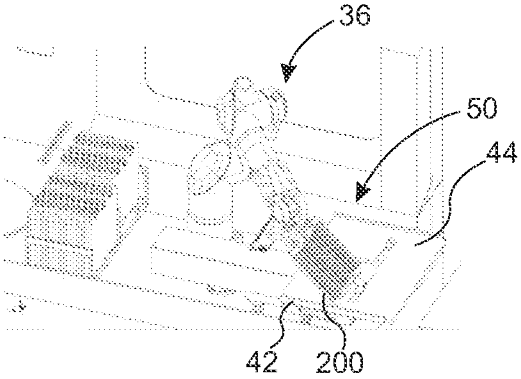
Figure 48C:
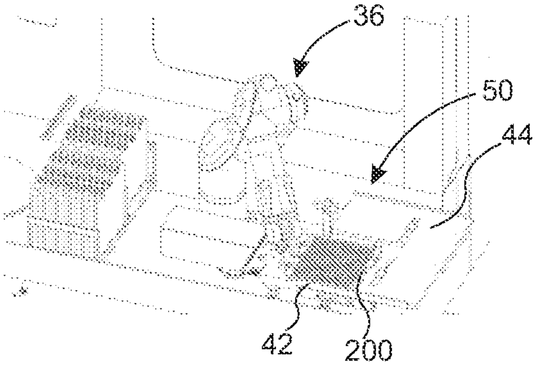
Figure 64A:
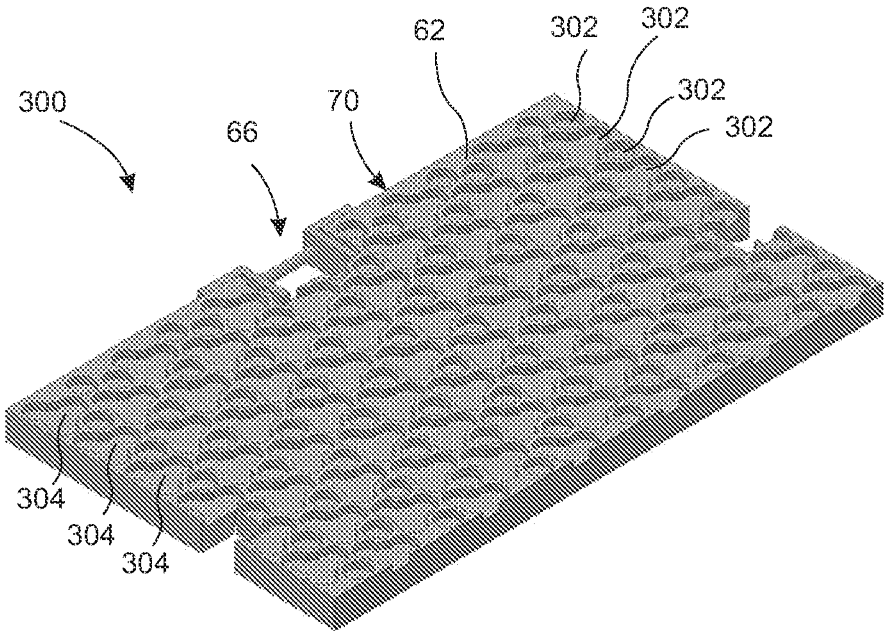
Figure 64B:
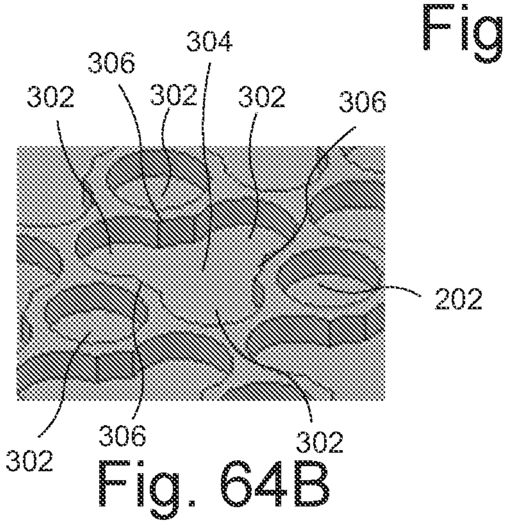
Figure 64C:
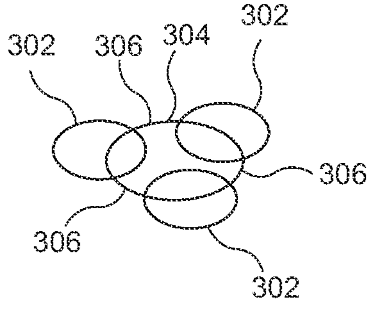
Figure 65:
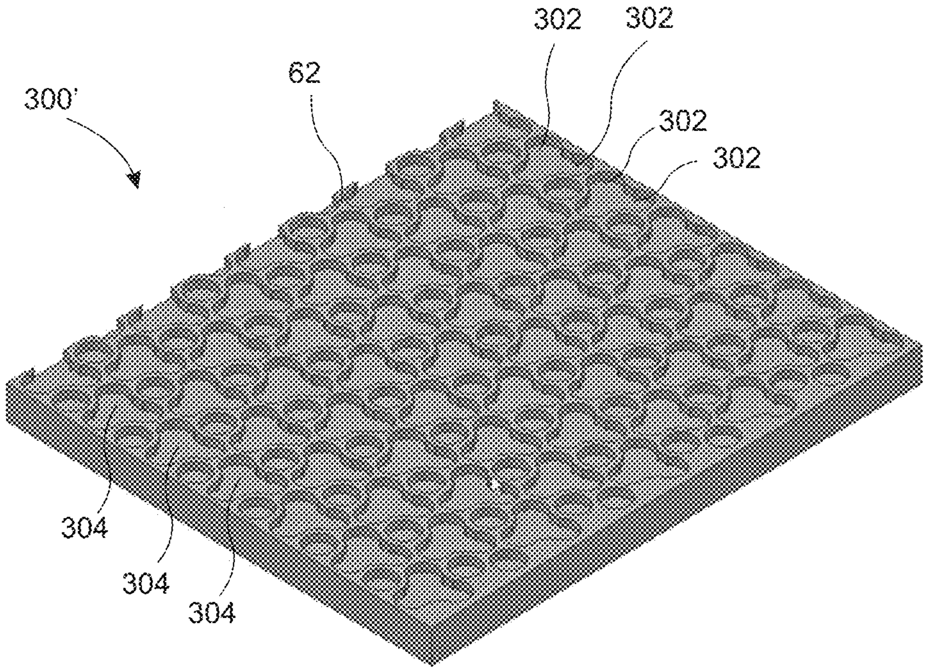
Figure 66:
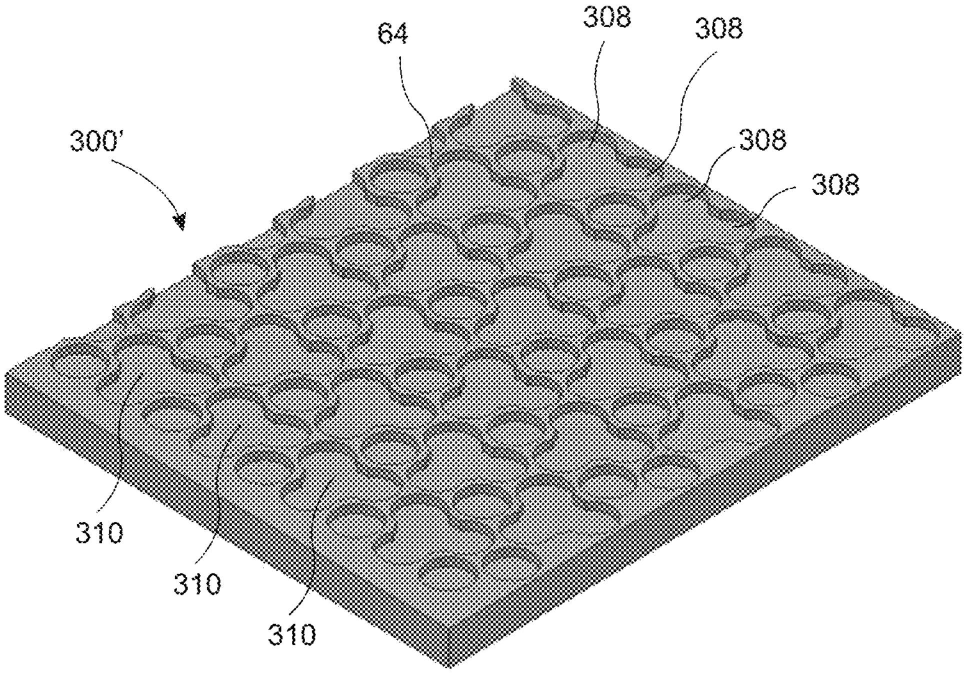
Figure 67:
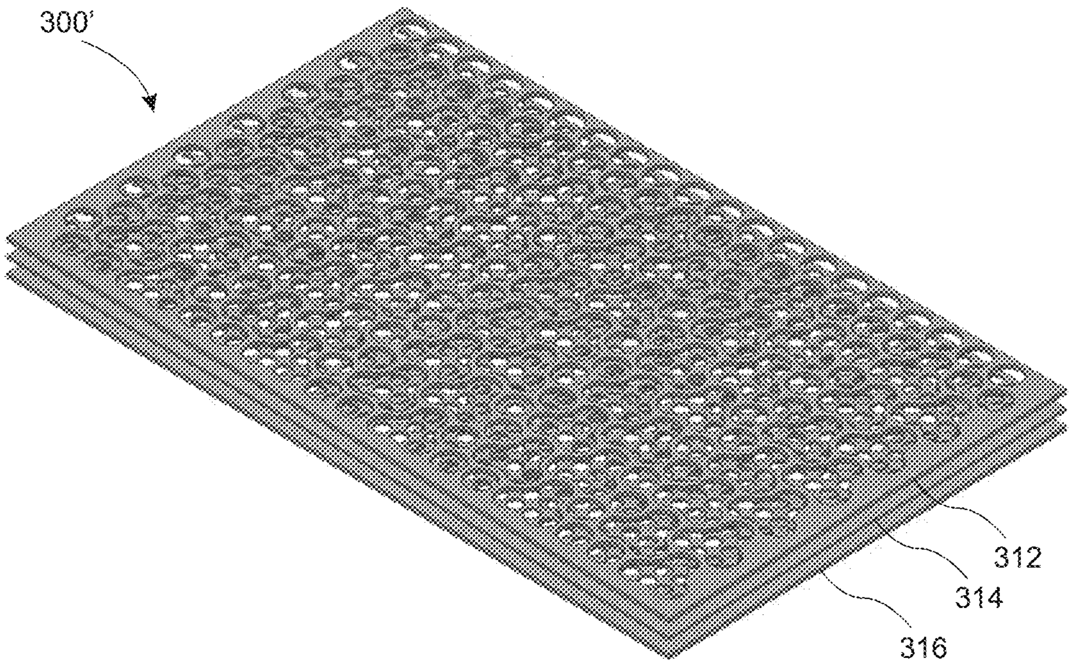
Figure 68:
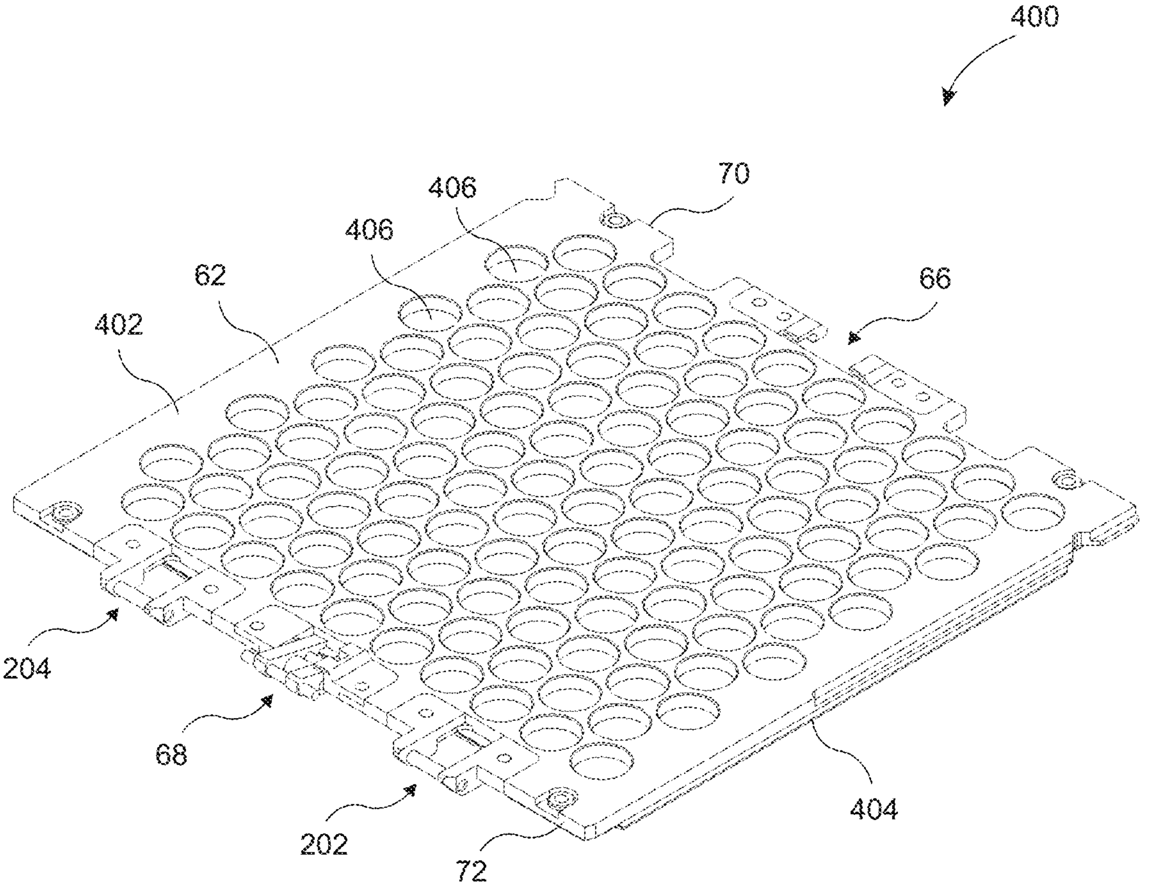
Figure 69:
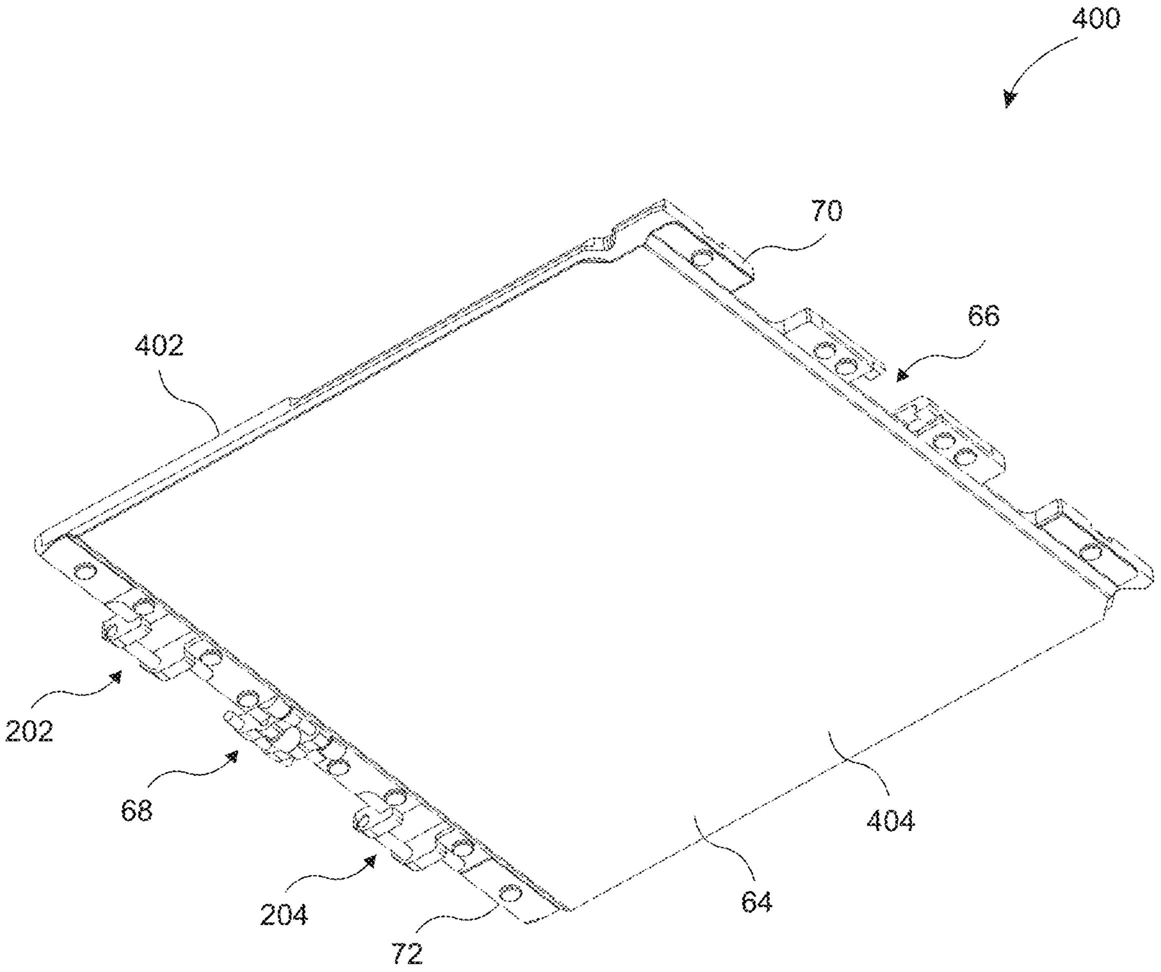
Figure 70:
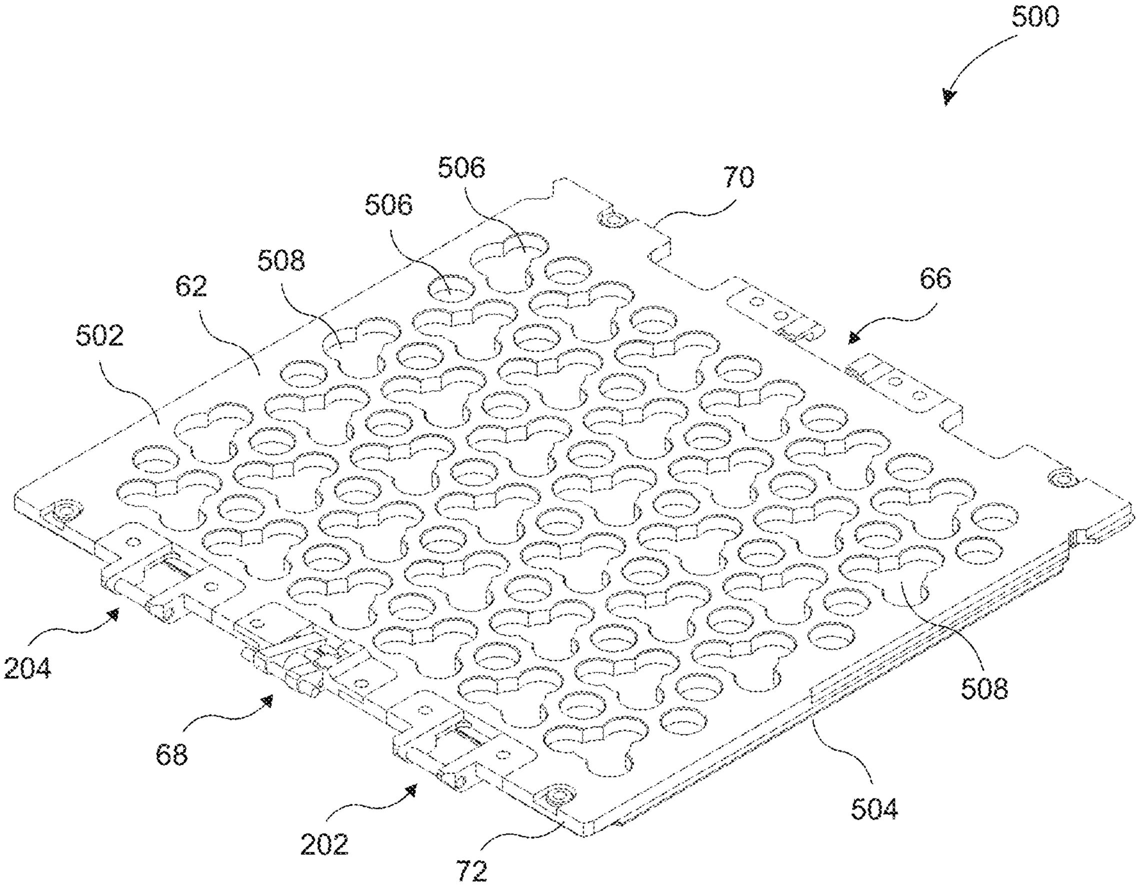

FIGS. 47(A)-63(C) are detailed views of the loading system of FIG. 46 in various operating conditions;

FIG. 64(A) is an isometric view of a first embodiment of a carrier plate;

FIG. 64(B) is a detailed view of receptacles of the carrier plate of FIG. 64(A);

FIG. 64(C) is a schematic view of receptacles of FIG. 64(B);

FIG. 65 is an isometric view at a first side surface of a second embodiment of a carrier plate;

FIG. 66 is an isometric view at a second side surface of the carrier plate of FIG. 65;

FIG. 67 is an isometric view at an arrangement of three plates for manufacturing of the carrier plate of FIG. 65;

FIG. 68 is an isometric view at a first side surface of a third embodiment of a carrier plate;

FIG. 69 is an isometric view at a second side surface of the carrier plate of FIG. 68; and FIG. 70 is an isometric view at a first side surface of a fourth embodiment of a carrier plate.

DETAILED DESCRIPTION

Figure 1:
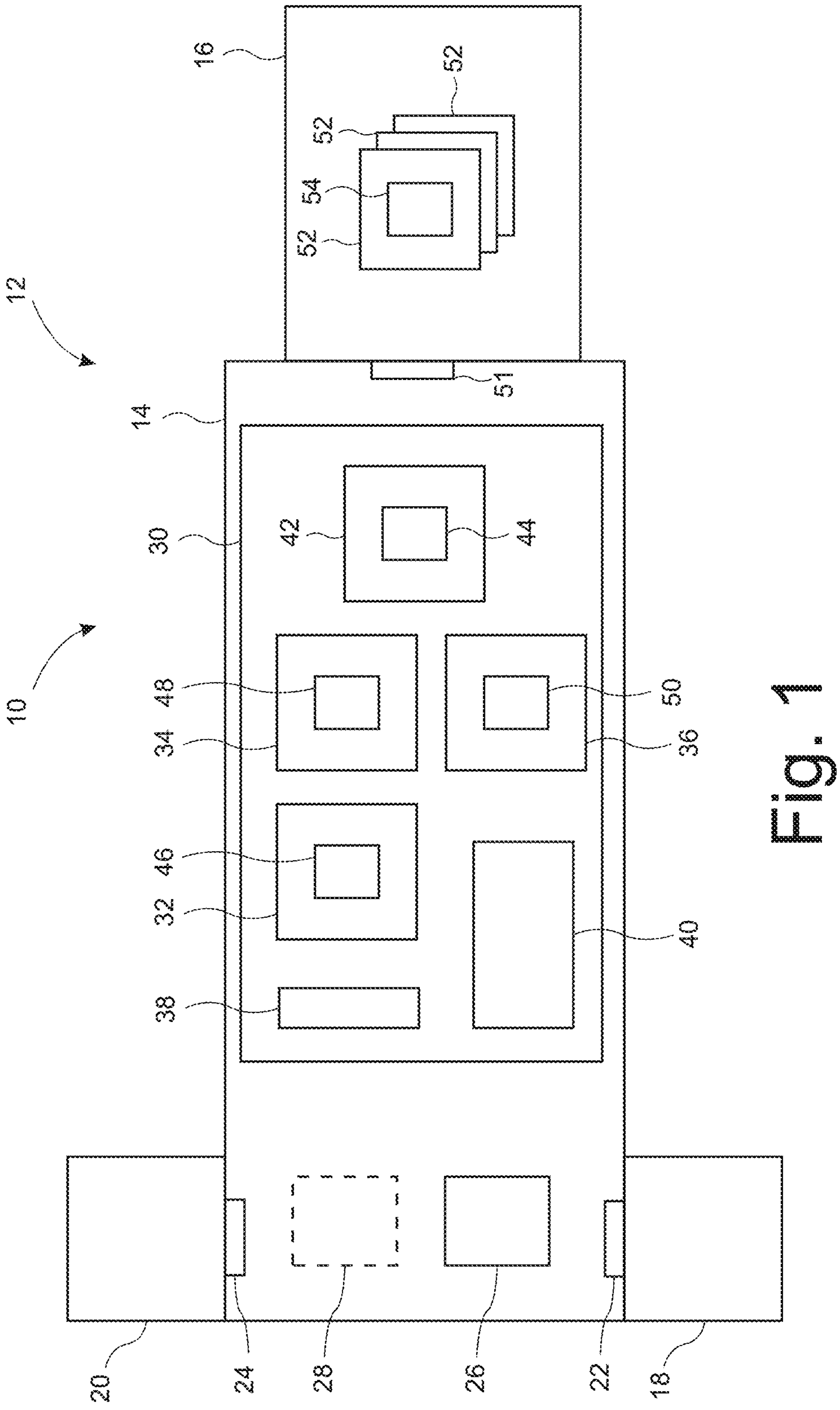
FIG. 1 is a schematic view of a first embodiment of a loading system for a freeze dryer.

FIG. 1 shows a first embodiment of a loading system 10 for a freeze dryer 16. The loading system 10 is part of a freeze-drying system 12 that comprises the loading system 10 and the freeze dryer 16. The freeze-drying system 12 can be part of a packaging machine in which pharmaceutical or cosmetic substances are packaged in containers 114.

For this purpose, the packaging machine comprises a filling module 18, a freeze-drying module 14, and a crimping module 20. The filling module 18 can comprise a filling station, in which the containers are filled with the substance, and a stopper placing station, in which a stopper is placed on the containers. The crimping module 20 can comprise a crimping station in which each container is closed with a crimping cap. The entire packaging process of the substances is performed in an aseptic environment, for example in a clean room or ultra-clean room.

Freeze-drying module 14 is coupled with the freeze dryer 16 via a port 51. The loading system 10 is arranged in the freeze-drying module 14. By means of the loading system, containers can be inserted into the freeze dryer through the port 51 and removed from the freeze dryer after the freeze-drying.

The freeze-drying system 12 can comprise the freeze-drying module 14. The freeze-drying module 14 is arranged between the filling module 18 and the crimping module 20. By means of a first transfer station 22, containers can be transferred between the filling module 18 and the freeze-drying module 14. By means of a second transfer station 24, containers can be transferred between the freeze-drying module 14 and the crimping module 20.

For feeding the containers from the filling module 18 and for removing the containers into the crimping module 20, the freeze-drying module 14 comprises at least one transport device 26, 28. For example, the freeze-drying module 14 comprises a first transport device 26 for feeding the containers and a second transport device 28 for removing the containers. Alternatively, only the first transport device 26 can be provided, wherein the first transport device 26 then performs the feeding and removing of the containers. During the feeding and removing, the containers can, for example, be transferred between the modules 14, 18, 20 via the transfer stations 22, 24.

At least one of the transport devices 26, 28 can be configured, for example, as a handling robot that comprises a gripping tool for handling containers. Alternatively, the transport devices 26, 28 can also be configured in other ways to feed or remove the containers. For example, at least one of the transport devices 26 can also be configured as a transport belt or other type of conveyor technology to feed or remove the containers.

The loading system 10 comprises a handling station 30. The handling station 30 is arranged between the transport devices 26, 28 and the freeze dryer. The handling station 30 is in particular arranged next to the port 51.

The handling station 30 comprises a first handling device 32, a second handling device 34, a third handling device 36, a container holder 38, a carrier plate holder 40, and a transfer plate 42.

The container holder 38 comprises receptacles for containers, in which containers can be received respectively individually. For feeding the containers, the first transport device inserts the containers to be fed into the container holder 38. For removing the containers, the first transport device 26 or the second transport device 28 removes containers to be removed from the container holder 38.

The carrier plate holder 40 comprises receptacles or holders for carrier plates. The carrier plates serve as carriers for a plurality of containers. For this purpose, each carrier plate comprises a plurality of receptacles, each of which is configured to receive a container.

The transfer plate 42 comprises a transfer surface 44. The transfer surface 44 is a top side of the transfer plate 42. The transfer surface 44 is preferably oriented horizontally. On the transfer surface 44, the carrier plates are arranged for loading and unloading the freeze dryer. For loading the freeze dryer 16, the carrier plates are arranged one after another on the transfer plate 42, equipped with containers and then inserted into the freeze dryer 16. For unloading the freeze dryer 16, the carrier plates are taken out of the freeze dryer 16 one after another, arranged on the transfer plate 42 and the containers are removed.

The freeze dryer 16 comprises a plurality of placement plates 52. Each placement plate 52 comprises a placement surface 54 on which one or more carrier plates can be arranged, in particular placed. Each placement surface 54 is the top side of a corresponding placement plate 52. The placement plates 52 can be vertically movable. For this purpose, the freeze dryer 16 can comprise a drive device which can move the placement plates 52 vertically.

Preferably, the transfer plate 42 is arranged at the port 51. Between the transfer plate 42 and the placement plate 52, a gap can be arranged. To keep the gap as small as possible, the transfer plate 42 and the placement plate 52 can be arranged as close as possible to the port. The gap is preferably smaller than half the width of the carrier plate. In this way, it is achieved that when inserting and removing the carrier plate, the carrier plate always rests on the placement surface and on the transfer surface when the center of gravity of the carrier plate is arranged above the gap.

The first handling device 32 is configured to transfer the containers between the container holder 38 and the transfer plate 42. For example, the handling device 32 can remove the fed containers from the container holder 38, transfer them to the transfer plate 42, and insert them into receptacles of a carrier plate arranged on the transfer plate 42. Furthermore, the handling device 32 can remove the containers to be removed from the receptacles of a carrier plate arranged on the transfer plate 42, transfer them to the container holder 38, and insert them therein.

The first handling device 32 can comprise a gripping device 46 for handling the containers. The gripping device 46 is configured to grip the containers. For example, the handling device 32 can be configured as a handling robot that comprises a multi-jointed arm and an end effector, wherein the end effector is arranged at an end of the arm. The gripping device can be arranged at the end effector.

The second handling device 34 is configured to insert the carrier plates into the freeze dryer 16 and to remove them from the freeze dryer 16 again after the freeze-drying. In other words, the handling device 34 is configured to transfer the carrier plates between the transfer plate 42 and the freeze dryer 16. The handling device 34 can, for example, insert one or several carrier plates from the transfer plate 42 onto one of the placement surfaces 54 to insert the carrier plates into the freeze dryer. The handling device 34 can furthermore pull one or several carrier plates from a placement surface 54 onto the transfer plate 42 to remove or retrieve the carrier plates from the freeze dryer. Prior to the insertion or removal, the corresponding placement surface is transferred to the level of the transfer surface 44 so that the carrier plates can be moved or pulled planarly. Preferably, when inserting the carrier plate, the placement surface 54 is arranged lower than the transfer surface 44, and when removing the carrier plate, the placement surface 54 is arranged higher than the transfer surface 44. In particular, thereby an offset between the transfer surface 44 and the placement surface 54 in the vertical direction is only a few millimeters. For example, the offset can be less than 5 mm, in particular less than 1 mm. In particular, the offset can be 0.25 mm, 0.5 mm, 0.75 mm, 0.9 mm, 1 mm, 2 mm, 3 mm, 4 mm or 5 mm.

The second handling device 34 can comprise a linear unit 48 for handling the carrier plates. The linear unit 48 is configured to move the carrier plates horizontally, in particular to push and pull them. Preferably, the second handling device 34 can push and pull several carrier plates simultaneously.

The third handling device 36 is configured to transfer the carrier plates between the carrier plate holder 40 and the transfer plate 42. For example, the handling device 36 can remove a respective carrier plate from a receptacle of the carrier plate holder 40, transfer it to the transfer plate 42, and place it on the transfer surface 44. Furthermore, the third handling device 36 can lift a respective carrier plate from the transfer plate 42, transfer it to the carrier plate holder 40, and place it in a receptacle of the carrier plate holder 40. Furthermore, the third handling device 36 can displace the carrier plate on the transfer plate 42 to position the carrier plate on the transfer surface 44.

The third handling device 36 can comprise a receiving device 50 for handling a carrier plate. The receiving device 50 can comprise at least one receiving member that can couple with the carrier plate to be handled in order to move the carrier plate.

The loading system 10 can comprise a control device (not shown) that is configured to control the handling devices 32, 34, 36. The control device can also be configured to control the transport devices 26, 28 and the drive device of the freeze dryer 16.

FIGS. 2 to 36 show a second embodiment of the loading system 10. The loading system 10 is shown in FIGS. 2 to 36 in various operating positions. The loading system 10 of the second embodiment corresponds substantially to the loading system 10 of the first embodiment of FIG. 1. The same elements are identified by the same reference signs and are not explained in further detail.

In the loading system 10, carrier plates 58 are used to load or unload the freeze dryer 16 with containers 114. The containers 114 have a cylindrical shape. In other words, the containers 114 are configured to be rotationally symmetrical with respect to an axis. The containers 114 comprise, in an axial direction with respect to the axis, a bottom on one side and an opening on the other side. On the opening of the containers 114, a stopper can be arranged. During the handling in the loading system 10, the containers 114 are handled such that the opening is arranged upwardly with respect to a vertical direction and the bottom is arranged downwardly.

Each carrier plate 58 is configured to be cuboid-shaped. Each carrier plate 58 has a rectangular base surface. Each carrier plate 58 comprises a first side surface 62 and a second side surface 64. The first side surface 62 is arranged opposite the second side surface 64. The first and the second side surfaces 62, 64 are arranged parallel to each other. The side surfaces 62, 64 extend in the length and width direction of the carrier plate 58. The shape of each side surface 62, 64 thus corresponds to the shape of the base surface of the carrier plate 58. The side surfaces 62, 64 thus each have a rectangular shape. A distance between the first side surface 62 to the second side surface 64 thus corresponds to the thickness of the carrier plate 58. The thickness of the carrier plate 58 is substantially smaller than the length and width of the carrier plate 58. Each carrier plate 58 comprises a plurality of receptacles 60 on the first side surface 62. Each receptacle 60 is configured to receive a respective container. The receptacles are configured as recesses on the first side surface 62 of the carrier plate 58. Each recess comprises the same depth. Each recess extends from the first side surface 62 toward the second side surface 62. The recesses, however, do not extend to the second side surface 64. In other words, a depth of the recesses is less than a distance of the first side surface 62 to the second side surface 64. The receptacles 60 are regularly distributed on the first side surface 62. In particular, the receptacles 60 are arranged in rows and comprise the same distance to adjacent receptacles 60.

The first side surface 62 is divided in the length direction into two equally sized areas. The areas are preferably square. In each area, the rows of receptacles 60 are arranged one after the other in the width direction of the carrier plate 58. Each row extends in the length direction.

In the operating state, that is, when a carrier plate 58 is received on the transfer plate 42 or on one of the placement plates 52, the first side surface 62 corresponds to the top side of the carrier plate 58. Correspondingly, the second side surface 64 corresponds to the bottom side of the carrier plate 58 in the operating state. In the operating state, the containers 114 can be inserted into the receptacles 60. The inserted containers 114 then stand in the recesses of the receptacles 60 and are held by the edge of each receptacle 60 in the respective receptacle 60.

Each carrier plate 58 furthermore comprises a first edge side 70 and a second edge side 72. The first edge side 70 is arranged opposite to the second edge side 72. The first and second edge sides 70, 72 each extend from the first side surface 62 to the second side surface 64. In particular, the first and second side surfaces 62, 64 are arranged perpendicular to the first and second edge sides. The first and second edge sides 70, 72 extend in the length and height direction of the carrier plate 58. Each carrier plate 58 comprises a first coupling portion 66 and a second coupling portion 68. The first coupling portion 66 is arranged on the first edge side 70 of the carrier plate 58. The second coupling portion 68 is arranged on the second edge side 72 of the carrier plate 58. The first and second coupling portions 66, 68 are each arranged centrally with respect to the longitudinal direction on the corresponding edge side 70, 72.

The first coupling portion 66 of a carrier plate 58 can couple with a coupling portion of another object. The coupling portion of the other object can be, for example, the second coupling portion 68 of an adjacent carrier plate 58. In the coupled state, the carrier plate 58 and the object coupled thereto are movable together in at least one spatial direction. For example, coupled carrier plates 58 can be handled together.

The first coupling portion 66 comprises a holding member 74 and a recess 76. The holding member 74 is configured as a web that extends from one side of the recess 76 to an opposite side of the recess 76. The web is preferably arranged parallel to the first and second side surfaces 62, 64 and parallel to the first and second edge sides 70, 72. The web is preferably arranged at an outer end of the recess 76. A corresponding member of another object can couple with the holding member 74 to couple the carrier plate 58 with the other object. For example, the member can engage with the recess 76 to couple with the holding member 74.

The second coupling portion 68 comprises a locking member 78. The locking member 78 can be a hook member that is rotatably mounted at the coupling portion 66 for rotation about a rotational axis. The rotational axis is preferably arranged parallel to the first and second side surfaces 62, 64 as well as parallel to the first and second edge sides 70, 72. Thus, the rotational axis is also arranged parallel to the web of the holding member 74 of the same carrier plate 58. The locking member 78 can be displaced between a coupling state and an uncoupling state. The displacement is achieved by rotation about a rotational axis.

In the coupling state, the second coupling portion 68 can couple with a first coupling portion 66 of a further carrier plate 58. In the uncoupling state, the second coupling portion 68 does not couple with a first coupling portion 66 of a further carrier plate 58. For coupling two carrier plates 58, the carrier plates 58 are arranged such that the second coupling portion 66 of the first carrier plate 58 is adjacent to the first coupling portion 68 of the second carrier plate 58, wherein the locking member 78 of the first carrier plate 58 is arranged in the uncoupling state. Then, this locking member 78 is moved to the coupling state to couple the carrier plates 58 with each other. Thereby, the locking member 78 of the first carrier plate 58 engages the recess 76 of the second carrier plate 58 and thereby couples with the holding member 74 of the second recess. The hook-shaped locking member 78 preferably extends on both sides of the rotational axis, wherein the locking member 78 comprises a hook portion on one side and an actuating portion on the other side. The hook portion comprises, for example, a hook-shaped receptacle. By means of the hook portion, the locking member 78 can couple. In particular, the hook-shaped receptacle can receive the holding member 74 of the first coupling portion 66 for coupling. By means of the actuating portion, the locking member 78 can be actuated. By actuating the actuating portion, the locking member 78 is rotated about a rotational axis to displace the locking member 78 between the coupling state and the uncoupling state. For example, the actuating portion can be pressed for actuation.

In the operating state, the locking member 78 as an initial state, preferably due to gravity, can be arranged in the coupling state. In the operating state, preferably the hook-shaped receptacle of the hook portion of the locking member 78 is oriented downward. For coupling with a further carrier plate 58, the locking member 78 must then first be moved to the uncoupling state, preferably against the force of gravity, so that the respective coupling portions 66, 68 can be arranged adjacent to each other for coupling. Thereby, the hook-shaped receptacle of the hook portion of the locking member 78 is moved upwardly. For moving to the uncoupling state, the actuating portion of the locking member 78 can be actuated.

The locking member 78 can also comprise a flank at the radially outer end of the hook portion. By actuation of the flank, the locking member 78 can be moved from the coupling state to the uncoupling state. For example, for arranging the coupling portions 66, 68 side by side, the carrier plates 58 can be moved toward each other so that the holding member 74 is moved toward the locking member 78. The holding member 74 can actuate the flank of the locking member 78 during this relative movement of the carrier plates 58 to move the locking member 78 to the uncoupling state. In other words, the locking member 78 swerves due to a pushing movement of the holding member 74 in a rotational direction about a rotational axis in the direction of the uncoupling state. As soon as the carrier plates 58 are adjacent to each other, i.e., when the holding member 74 has passed the flank, the locking member 78 can be moved back to the coupling state to couple the carrier plates 58 to each other. Preferably, the locking member 78 automatically returns to the coupling state due to gravity when the holding member 74 has passed the flank.

For releasing the coupling of two carrier plates 58, the corresponding locking member 78 is again moved into the uncoupling state. For this purpose, the actuating portion of the locking member 78 can be actuated again, for example.

The container holder 38 comprises a plurality of receptacles 102. Each receptacle 102 is configured to receive a respective container 114. The receptacles 102 are arranged in a row. The receptacles 102 are arranged at regular distances.

The carrier plate holder 40 comprises a plurality of holders or receptacles 56 in which the carrier plates 58 can be held. In each receptacle 56, a carrier plate 58 can be held. The receptacles 56 are configured such that the receptacles 56 are open upwardly in the vertical direction and closed downwardly. Closed means that the carrier plates 58, when they are arranged in a receptacle 56, rest on at least one support member at the lower end of the receptacle 56. In particular, the receptacles 56 are configured such that the carrier plates 58 are received in the receptacles 56 such that the side surfaces 62, 64 are arranged parallel to the vertical direction. As a result, the carrier plates 58 can be arranged in the receptacles such that the first edge side 70 is arranged on the top and the second edge side 72 is arranged on the bottom. In this way, the first coupling portion 66 is accessible from above.

In the loading system 10 of the second embodiment, the first handling device 32 and the third handling device 36 are configured by means of a handling robot 84. The handling robot 84 comprises a support structure 86 and an end effector 88 mounted thereto. The support structure 86 is configured as a multi-jointed arm. By means of the multi-jointed arm, the end effector 88 is movable in three spatial directions, i.e. horizontally and vertically.

The end effector 88 comprises the gripping device 46 of the first handling device 32 and the receiving device 50 of the third handling device 36. The gripping device 46 is arranged at a first side 90 of the end effector 88. The receiving device 50 is arranged on a second side 92 of the end effector 88. The first side 90 and the second side 92 are arranged on opposite sides of the end effector 88.

The gripping device 46 is configured to transfer respective one or several containers 114 between the container holder 38 and the transfer plate 42, in particular a carrier plate 58 arranged on the transfer plate 42. For this purpose, the gripping device comprises a plurality of gripping members. Each gripping member is configured to grip a respective container. The gripping members of the gripping device 46 are arranged in a row. The gripping members are arranged at regular distances. By means of the gripping members, the gripping device can remove a row of containers 114 from the receptacles 102 of the container holder 38 and insert them into empty receptacles 60 of the carrier plate 58. Thereby, the distance between adjacent gripping members is equal to the distance between adjacent receptacles 102 and equal to a distance between adjacent receptacles 60.

The receiving device 50 is configured to handle a respective carrier plate 58. For handling, the receiving device 50 comprises a receiving member 80. The receiving member 80 comprises a coupling portion 82, by means of which the receiving device 50 is couplable with the first coupling portion 66 of a carrier plate 58. In the coupled state, third handling device 36 can handle the carrier plate 58 by means of the receiving device 50. Preferably, the third handling device 36 can move the carrier plate 58 horizontally and vertically, in particular lift, lower and displace it on a surface.

The receiving member 80 is configured hook-shaped in the area of the coupling portion 82. In other words, the receiving member 80 comprises a hook-shaped receptacle in the area of the coupling portion 82. In the operating state, the hook-shaped receptacle is open upwardly. For coupling with the first coupling portion 66 of a carrier plate 58, the hook-shaped receptacle can receive the holding member 74 of the first coupling portion 66 of the carrier plate 58. By means of this coupling, the carrier plate 58 can be moved vertically, in particular lifted and lowered, as well as moved or transferred horizontally. When the carrier plate 58 is fully lifted, the side surfaces 62, 64 of the carrier plate 58 are vertically oriented and the first and second edge sides 70, 72 are correspondingly horizontally oriented, wherein the first edge side 70 is arranged at the top and the second edge side 72 is arranged at the bottom.

On the side of the receiving member 80 opposite to the hook-shaped receptacle, the receiving member 80 can additionally comprise a protrusion which can engage the recess 76 of a carrier plate 58 in order to couple the receiving device 50 with the carrier plate 58. By means of this coupling, the carrier plate 58 can be moved, in particular pulled or pushed, when the carrier plate 58 in the operating state rests on a surface, in particular on the transfer surface 44 or on one of the placement surfaces 54.

The second handling device 34 is configured as a handling robot 104. The handling robot 104 comprises the linear unit 48 and a stroke unit 106. In other words, the handling robot 104 is configured as a stroke and linear unit. The linear unit 48 is configured to move the carrier plates 58 horizontally, in particular to push and pull them. In particular, the linear unit 48 can push the carrier plates 58 in an insertion direction from the transfer plate 42 onto one of the placement plates 52 and, correspondingly, pull them back from the placement plate 52 onto the transfer plate 42 against the insertion direction. For this purpose, the linear unit 48 comprises a pushing member 108. The linear unit 48 is configured to move the pushing member 108 back and forth in a, preferably horizontal, direction. The pushing member 108 is thereby extended in the direction of the freeze dryer, or retracted in the opposite direction. In other words, the pushing member 108 can push or pull the carrier plates 58 by means of this movement. The stroke unit 106 is configured to move the linear unit 48 vertically. In this way, the height at which the linear unit 48 performs the pushing or pulling movement can be adjusted.

For moving the carrier plate 58, the pushing member 108 can be placed against the first or second edge side 70, 72 and then push the carrier plate 58 in the corresponding direction. In this way, the pushing member can pull or push the carrier plate 58. The carrier plate 58 is pushed when the carrier plate 58 is moved away from the linear unit 48. This occurs, for example, during the inserting of the carrier plate 58 into the freeze dryer. Thereby, the pushing member 108 can push against the first edge side 70 and thus push the carrier plate 58 into the freeze dryer. Correspondingly, the carrier plate 58 is pulled when the carrier plate 58 is moved toward the linear unit 48. This occurs, for example, during the removing of the carrier plate 58 from the freeze dryer. Thereby, the pushing member 108 can push against the second edge side and thus pull the carrier plate 58 out of the freeze dryer.

Additionally, the pushing member 108 can comprise a coupling portion 110 by means of which the pushing member 108 is couplable with the first coupling portion 66 on the first edge side 70 of a carrier plate 58. In the coupled state, the pushing member 108 can then also pull the carrier plate 58. In this way, the pushing member does not need to be moved to the second edge side 72 for pulling. The pushing member 108 can comprise, for example, a protrusion extending vertically downward as the coupling portion 110. The protrusion can be engaged with the recess 76 so that the protrusion engages the holding member 74 during pulling. The protrusion is engaged with or disengaged from the recess 76 by means of a vertical movement. The vertical movement is performed by means of the stroke unit 106.

The protrusion of the pushing member 108 can also be used to actuate the actuating portion of the locking member 78 of the second coupling portion 68. For this purpose, the pushing member can be vertically moved by means of the stroke unit 106 such that the protrusion presses on the actuating portion, to thus relocate the locking member 78 to the uncoupling state. With two coupled carrier plates 58, the coupling can thus be released by actuation of the corresponding actuating portion. Since the actuating portion is arranged at the second edge side 72, the pushing member 108, in the actuated state, can also simultaneously pull the carrier plate 58 away from the other carrier plate 58, thereby distancing it therefrom. In this way, for example, coupled carrier plates 58 can be decoupled from each other.

The loading system 10 of the second embodiment comprises only one transport device 26, by means of which the containers are fed and removed. The transport device 26 comprises a handling robot 94. The handling robot 94 comprises a support structure 96 and an end effector 98 mounted thereon. The support structure 96 is configured as a multi-jointed arm. By means of the multi-jointed arm, the end effector 98 is movable in three spatial directions, i.e., horizontally and vertically. The end effector 98 comprises a gripping tool 100, by means of which one or several containers 114 can be handled, respectively. For example, the gripping tool comprises one or more grippers by means of which a respective container can be gripped. In the illustrated embodiment, the gripping tool 100 comprises two grippers, by means of each of which two containers can be handled simultaneously. In other words, the gripping tool 100 is configured to handle the containers in pairs.

The transfer plate 42 is arranged between the handling devices 32, 34, 36 and the freeze dryer. When a placement surface 54 is arranged at the level of the transfer surface 44, a distance between the placement plate 52 and the transfer plate 42 is less than half a width of a carrier plate 58. The transfer plate comprises a recess 112. The recess 112 extends in the vertical direction from the bottom side to the top side of the transfer plate 42. In this way, the linear unit 48 or the receiving device 50 can be moved vertically through the recess 112. Furthermore, the recess 112 extends from the side facing away from the freeze dryer into the transfer plate 42. The recess 112 extends in particular from the side facing away from the freeze dryer to the center of the transfer plate 42.

In the illustration of FIGS. 2 to 36, the filling module 18, the crimping module 20, the transfer stations 22 and 24, the port 51 as well as the wall of the freeze dryer 16 and partially the wall of the freeze dryer module 14 are omitted in order to better illustrate the individual processes within the loading system 10. Furthermore, only one placement plate 52 of the plurality of placement plates 52 within the freeze dryer 16 is always illustrated in FIGS. 2 to 36 in order to better illustrate the movement of the carrier plates.

Figure 2:
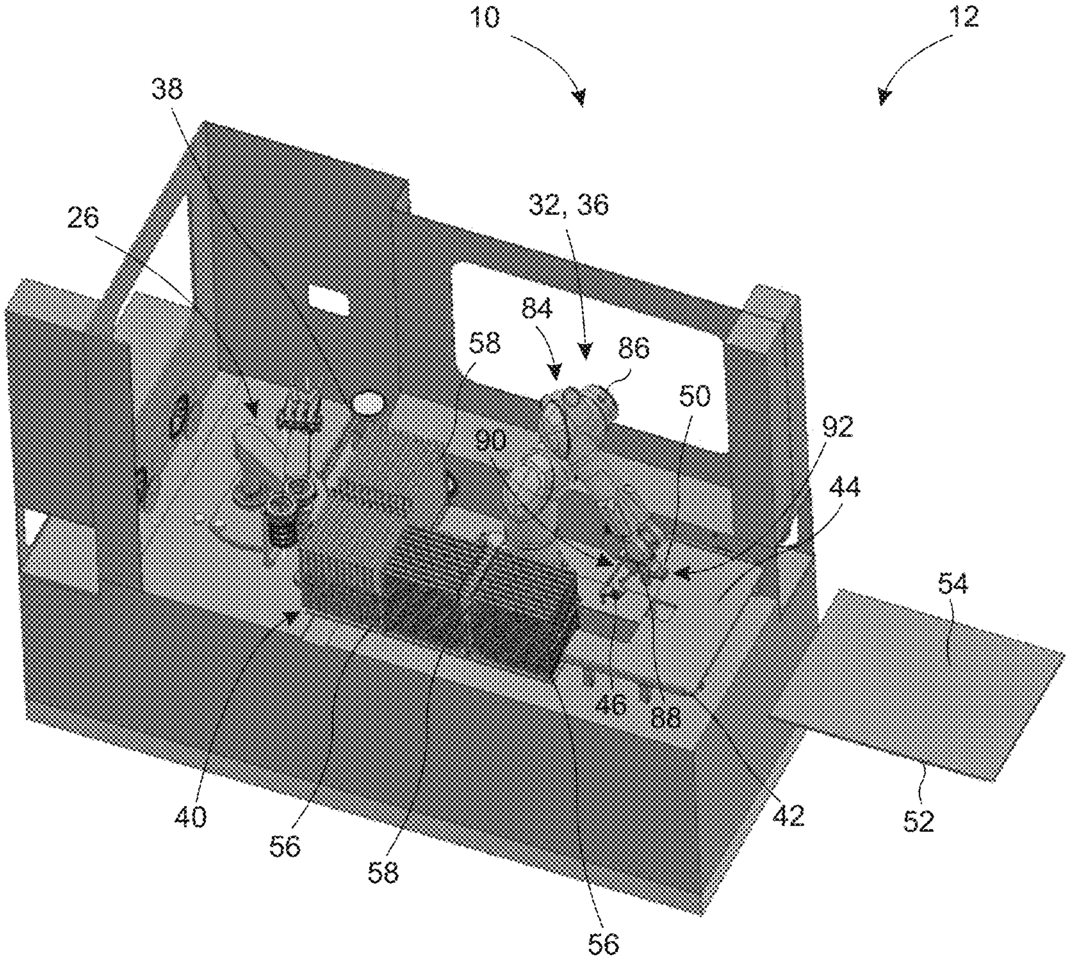
FIG. 2 is an isometric view of a second embodiment of a loading system for a freeze dryer.

In FIG. 2, an operating state is illustrated that is assumed prior to a start of a freeze-drying cycle, in particular prior to a start of filling or packaging of the containers. In this state, all carrier plates 58 are arranged in the receptacles 56 of the carrier plate holder 40. In other words, the carrier plates 58 are stored in this way in the carrier plate holder 40 until their use. In this operating state, in particular, H2O2 decontamination of the freeze-drying module can be performed. In other words, the operating state of FIG. 2 is assumed during a decontamination cycle. Thereby, each carrier plate 58 is arranged in a corresponding receptacle 56 such that the first edge side 70 is arranged at the top with respect to a vertical direction and the second edge side 72 is arranged at the bottom. Furthermore, the linear unit 48 of the second handling device 34 is arranged below the transfer plate.

Departing from the operating state of FIG. 2, the empty carrier plates are next placed into the freeze dryer 16. The placing and intermediate storing of the carrier plates 58 into the freeze dryer is thereby a special embodiment. In principle, the carrier plates 58 can also be held in the carrier plate holder 40 until they are removed from the carrier plate holder 40 and equipped with containers 114. For loading the empty carrier plates 58, the handling robot 84 transfers the carrier plates 58 one after the other to the transfer plate 42. From the transfer plate 42, the carrier plates 58 are then inserted into the freeze dryer by means of the stroke and linear unit 104.

Figure 3:
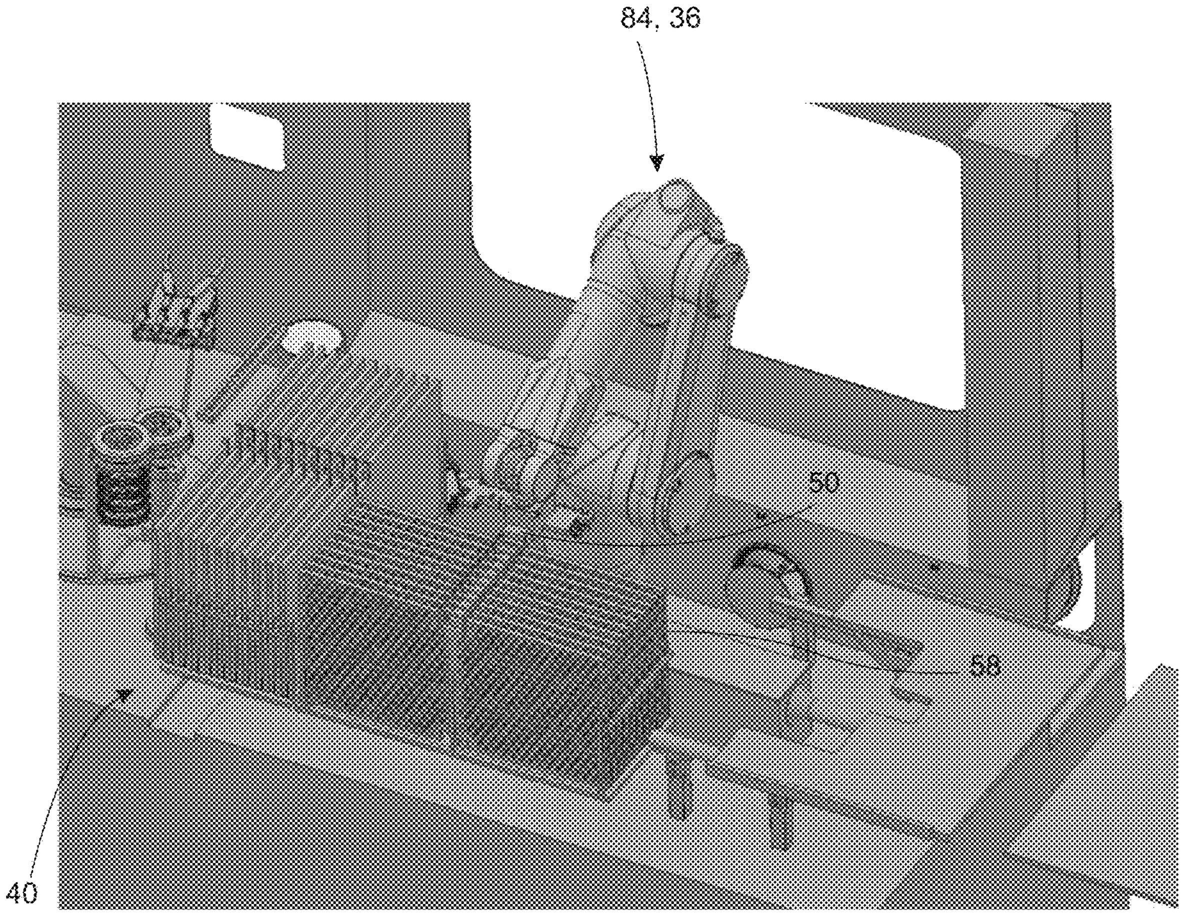
FIGS. 3-36 are detailed views of the loading system of FIG. 2 in various operating conditions.
Figure 4:
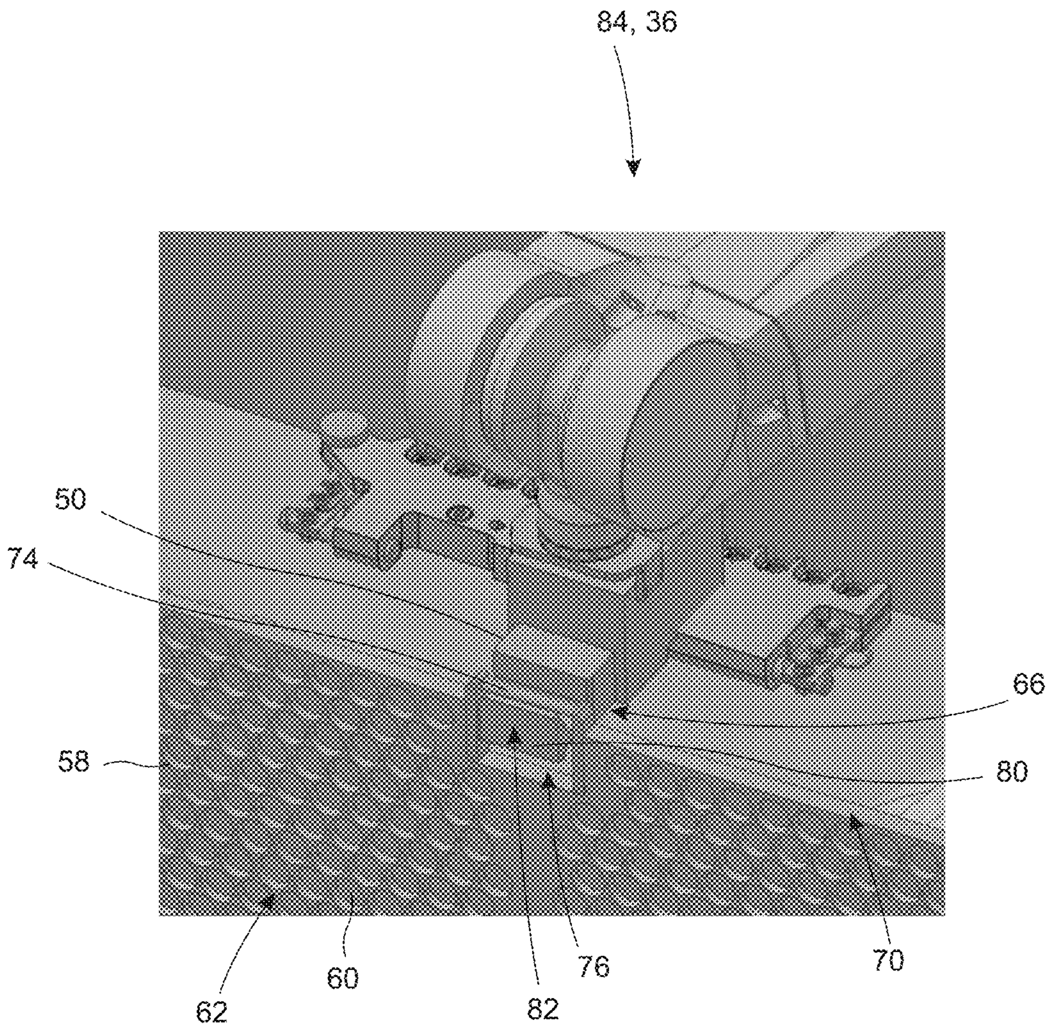
Figure 5:
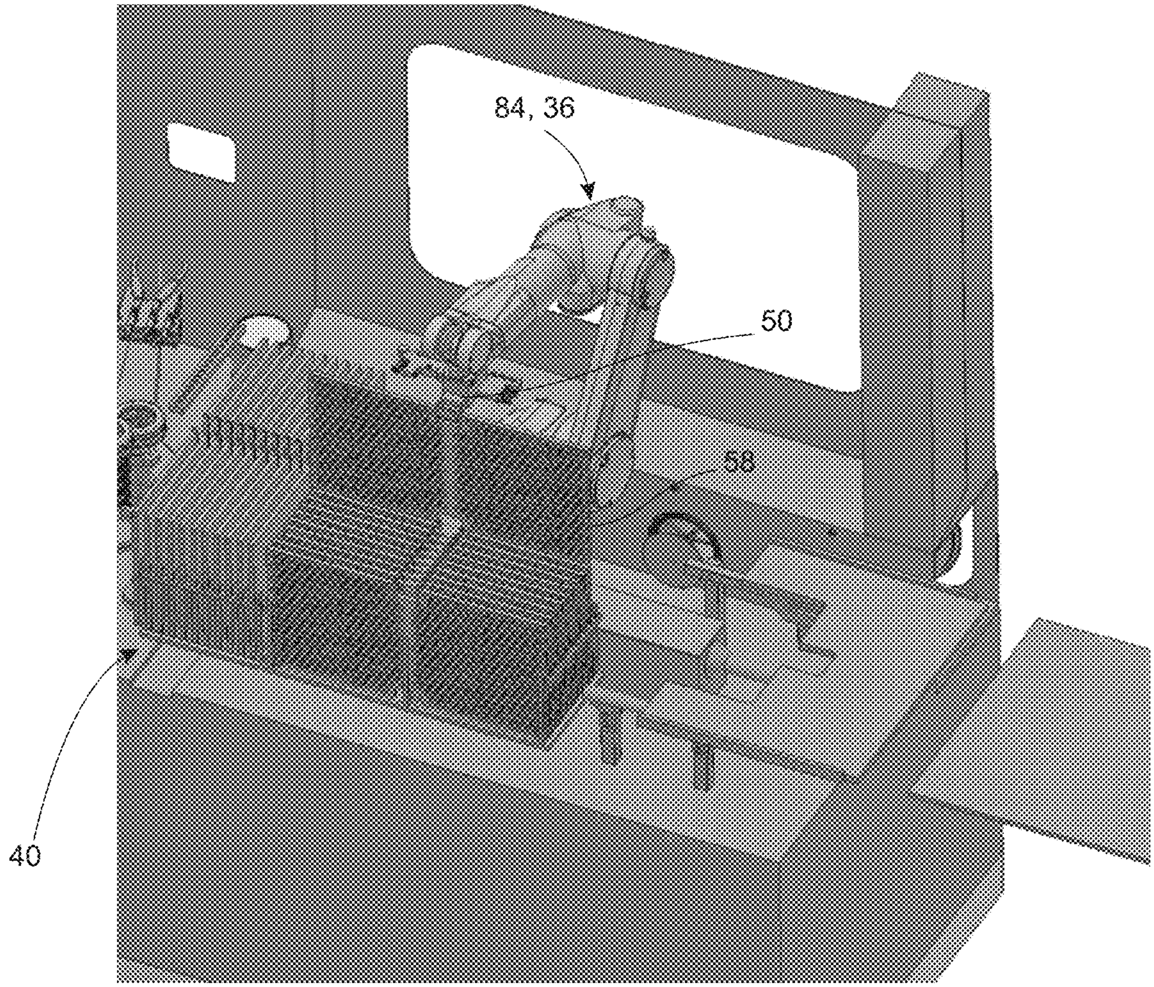
Figure 6:
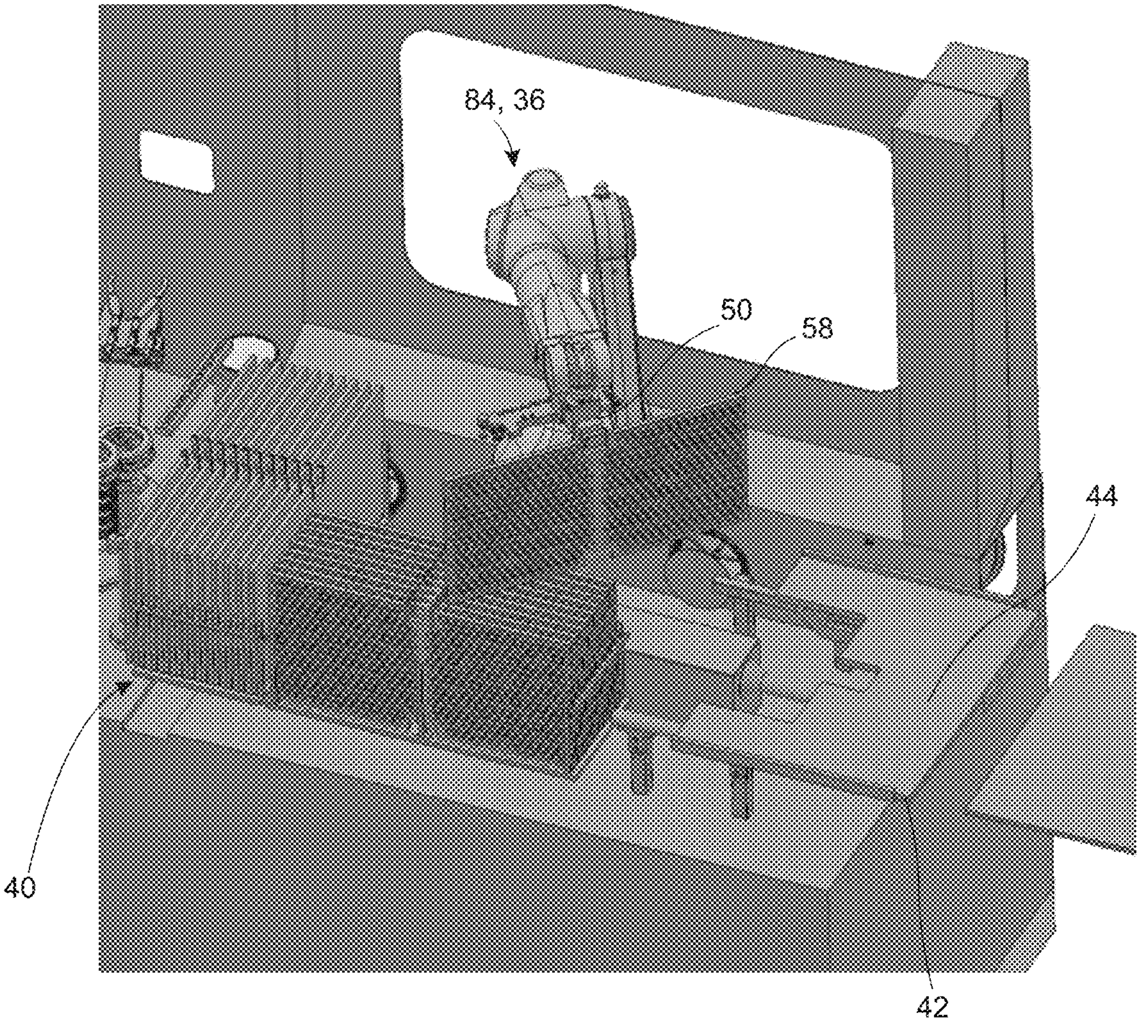
Figure 7:
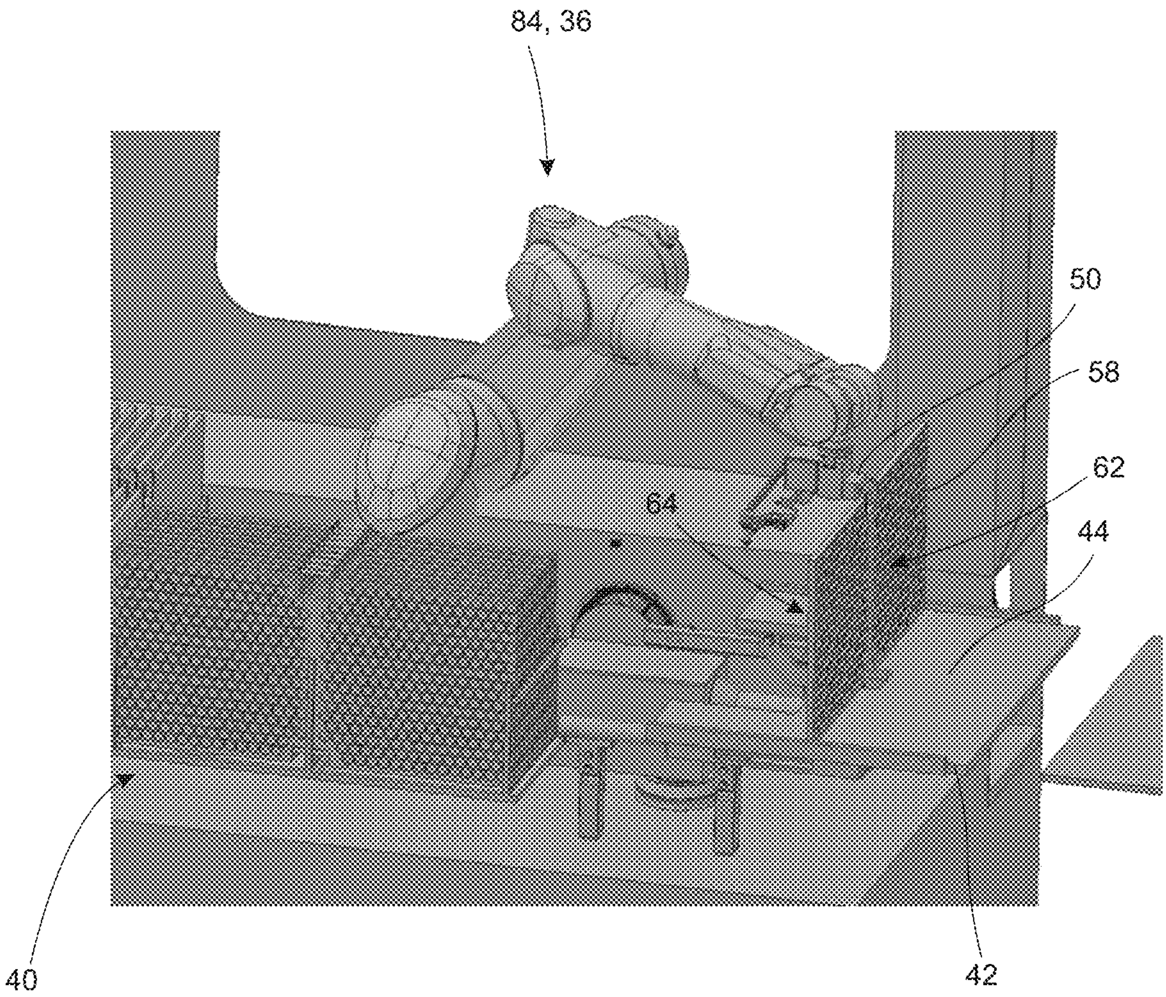
Figure 8:
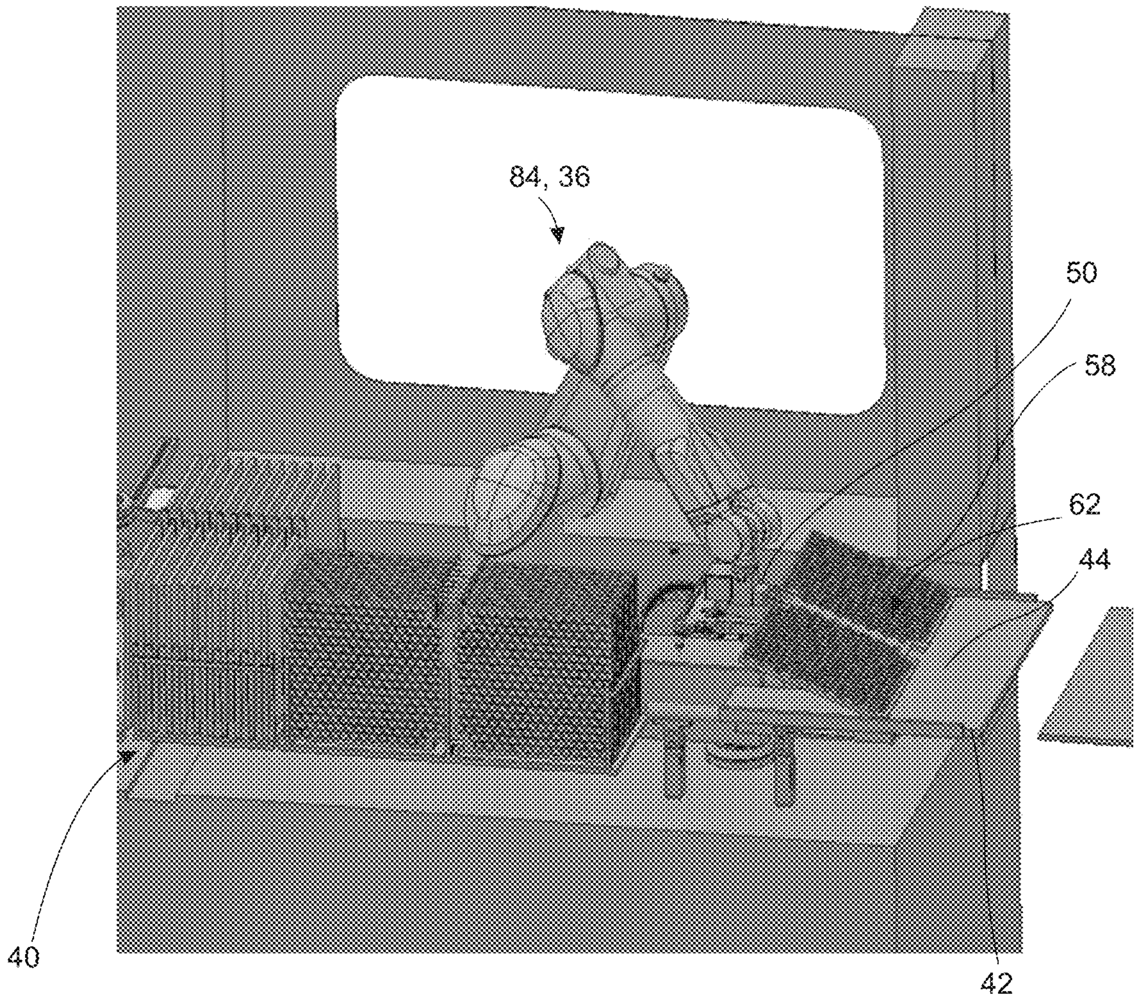
Figure 9:
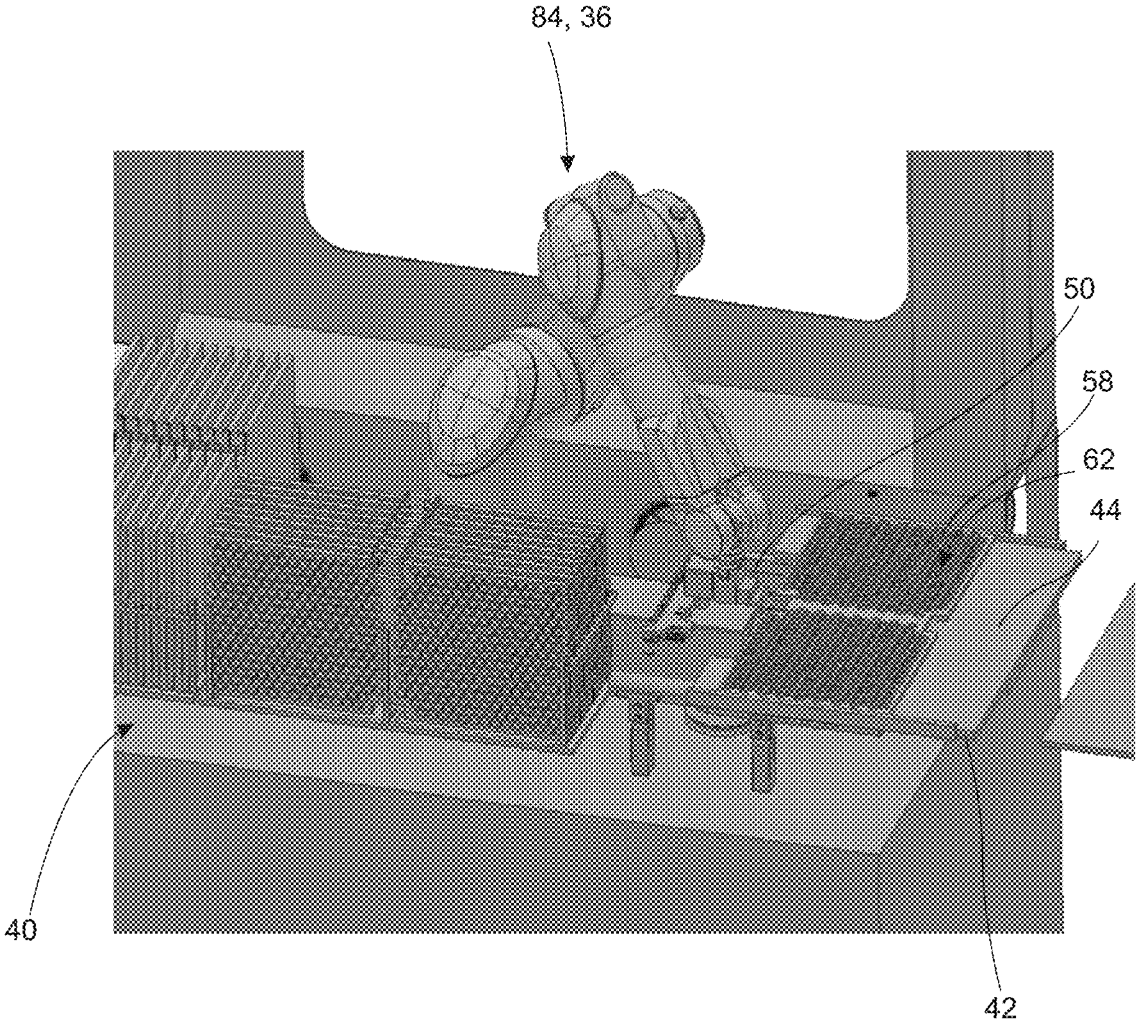

For this purpose, a placement plate 52 is arranged so that its placement surface 54 is arranged at the level of the transfer surface 44. Then, the receiving device 50 of the handling robot 84 is moved to a carrier plate 58 arranged in the carrier plate holder 40, as illustrated in FIG. 3. Since the first edge side 70 of each carrier plate 58 is arranged at the top, the first coupling portion 66 is accessible to the receiving device 50. Then, the receiving member 80 of the receiving device 50 is coupled with the holding member 74 of the carrier plate 58, as illustrated in FIG. 4. For this purpose, the receiving member 80 engages the recess 76 and the holding member 74 is received in the hook-shaped receptacle of the receiving member 80. As illustrated in FIG. 5, the receiving device 50 can be moved vertically upwardly. The carrier plate 58 coupled with the receiving device 50 is thereby also moved upwardly, in particular lifted, and lifted out of the receptacle 56. In this way, the carrier plate 58 is removed from the receptacle 56 of the carrier plate holder 40.

The carrier plate 58 is then transferred to the transfer plate 42, oriented, and placed on the transfer surface 44, as illustrated in FIGS. 6 to 9. For this purpose, the receiving device 50 is moved by means of the handling robot 84 correspondingly. During the transfer, the carrier plate 58 hangs at the receiving device 50. In particular, the carrier plate 58 is hung in the hook-shaped receptacle of the receiving member 80 by means of the holding member 74. Thereby, the side surfaces 62, 64 are oriented vertically. During placing of the carrier plate 58 on the transfer plate 42, the carrier plate is tilted, in particular by 90°, so that the carrier plate 58 rests with the second side surface 64 on the transfer surface 44. Thereby, the side surfaces 62, 64 are preferably oriented horizontally. The carrier plate 58 is tilted during placing such that the second edge side 72 faces the freeze dryer and the first edge side 70 faces away from the freeze dryer. With respect to the insertion direction into the freeze dryer 16, the first edge side 70 is thus arranged upstream and the second edge side 72 is arranged downstream. Thereby, the first edge side 70 of the linear unit 48 faces the second handling device 34 and the second edge side 72 faces away from the linear unit 48. The carrier plate is further placed such that the first coupling portion 66 is arranged above the recess 112. The receiving device 50 is moved downwardly through the recess 112 to decouple the receiving member 80 from the first coupling portion 66.

Figure 10:
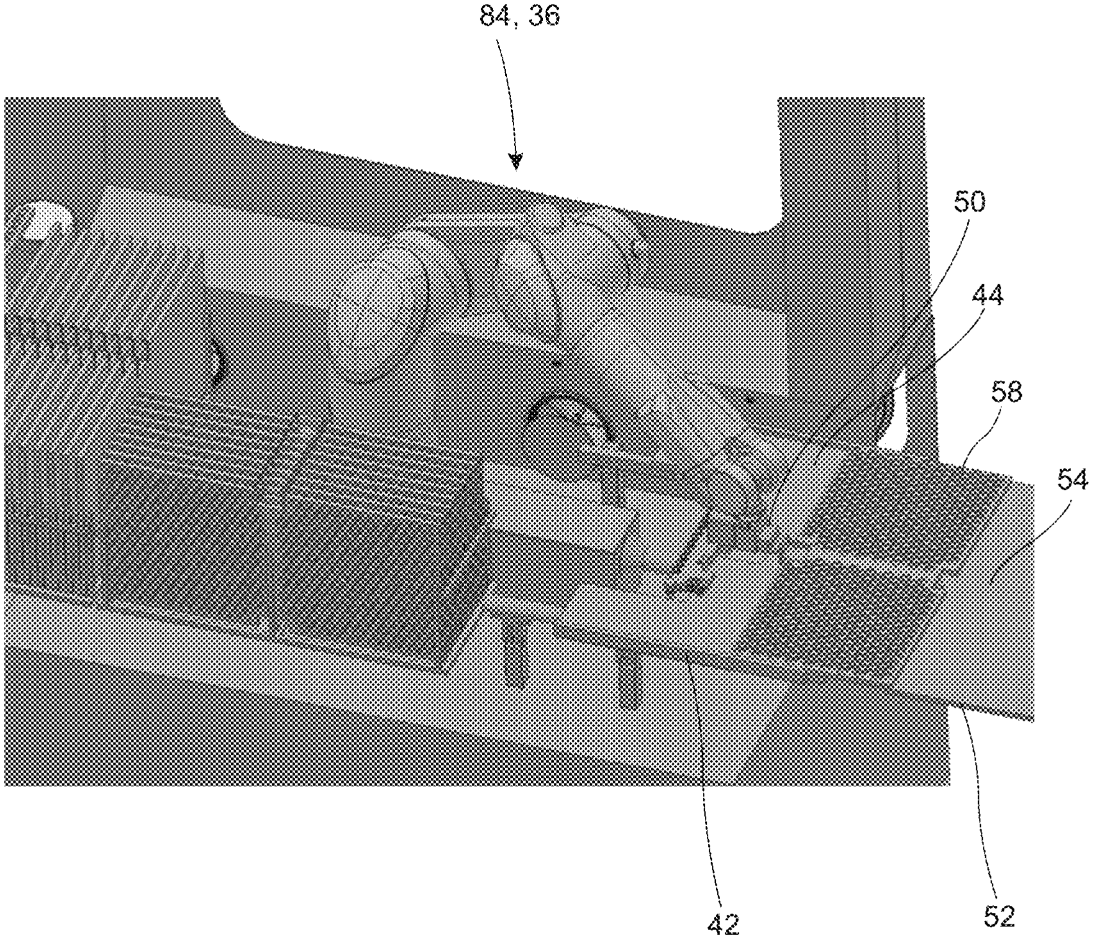

Then, the receiving device 50 is moved such that the receiving member 80 bears against the first edge side 70, in particular against the holding member 74 from the outside. By means of the receiving device 50, the carrier plate 58 is then pushed so far in the direction of the freeze dryer, in particular in the direction of the placement plate 52 arranged at the same level, until the first coupling portion 66 is at least no longer arranged above the recess 112 but above the transfer surface 44. The carrier plate 58 then projects over the edge of the transfer plate 42 in the direction of the placement plate 52. In other words, the carrier plate 58 is arranged partially above the gap between the transfer plate 42 and the placement plate 52. This is illustrated in FIG. 10. The carrier plate 58 can also be partially or fully inserted into the freeze dryer in this way by means of the receiving device 50, in particular by being displaced onto the placement plate 52.

Figure 11:
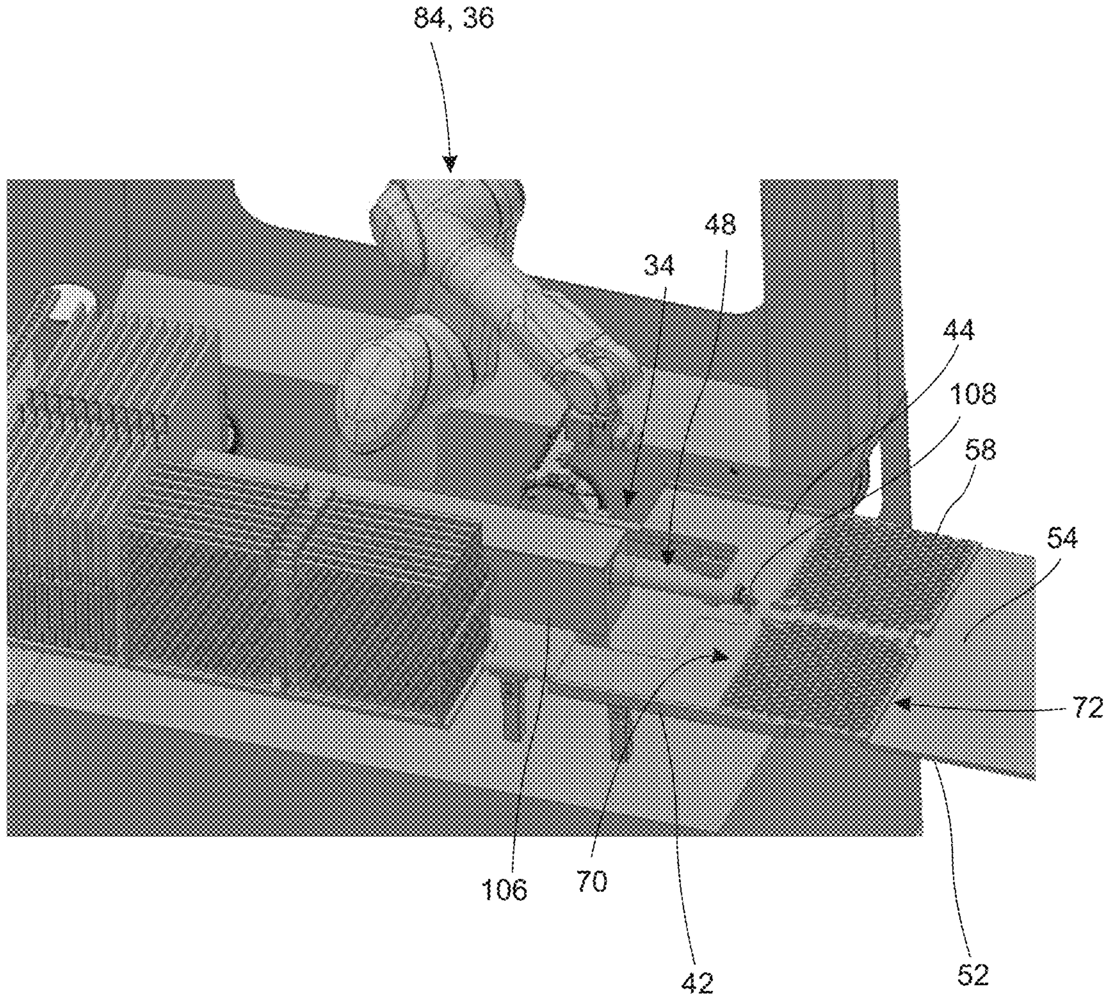

The receiving device 50 is then moved to the side and makes room for the second handling device 34. By means of the stroke unit 106, the linear unit 48 is moved through the recess 112 vertically upwardly until the linear unit 48 is arranged at the level of the carrier plate 58. This is illustrated in FIG. 11.

Figure 12:
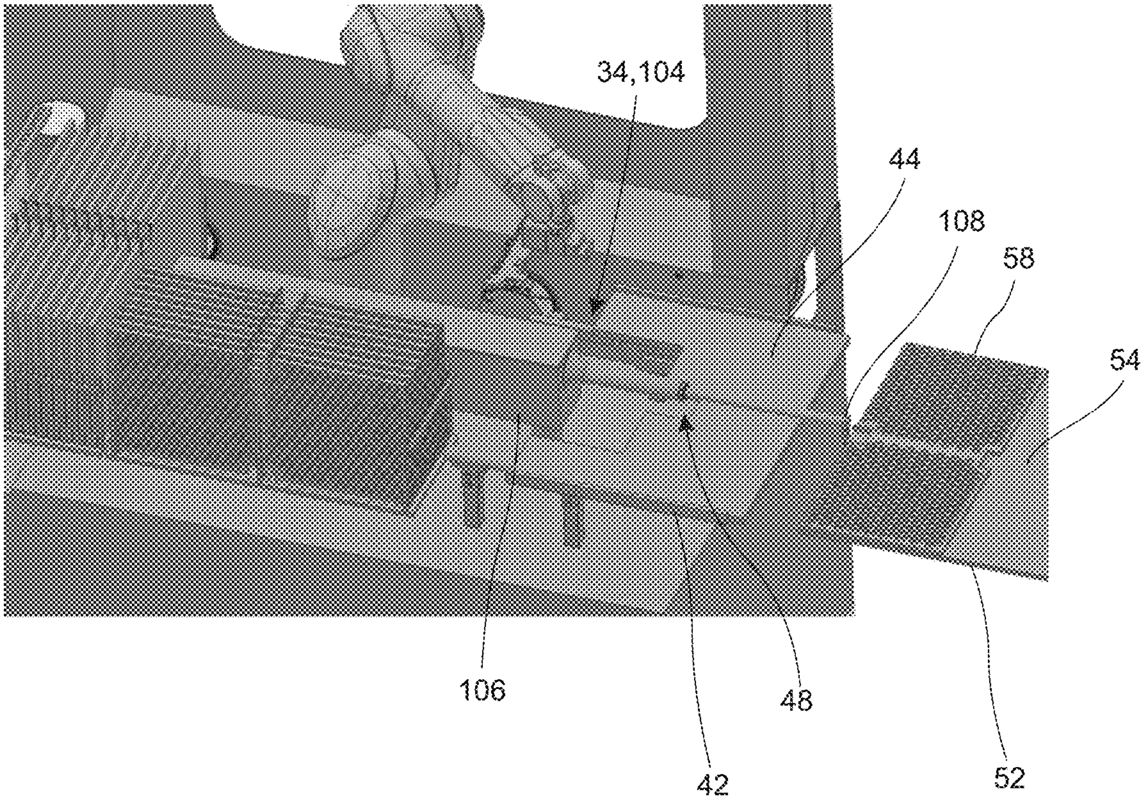

Then, the carrier plate 58 is pushed by means of the pushing member 108 of the linear unit 48 completely into the freeze dryer onto the placement surface 54, as illustrated in FIG. 12.

Subsequently, the pushing member 108 is moved back again. Then, the linear unit 48 is again moved through the recess 112 vertically downward by means of the stroke unit 106 to arrange the linear unit 48 below the transfer plate 42 again.

Figure 13:
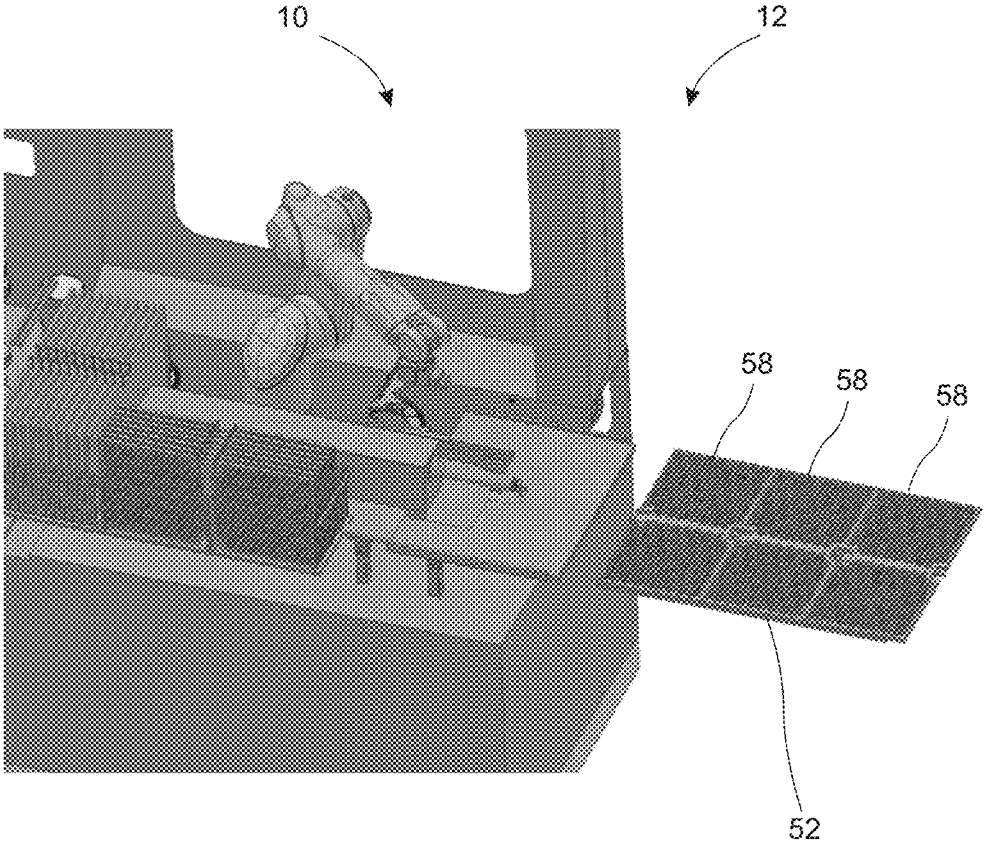
Figure 14:
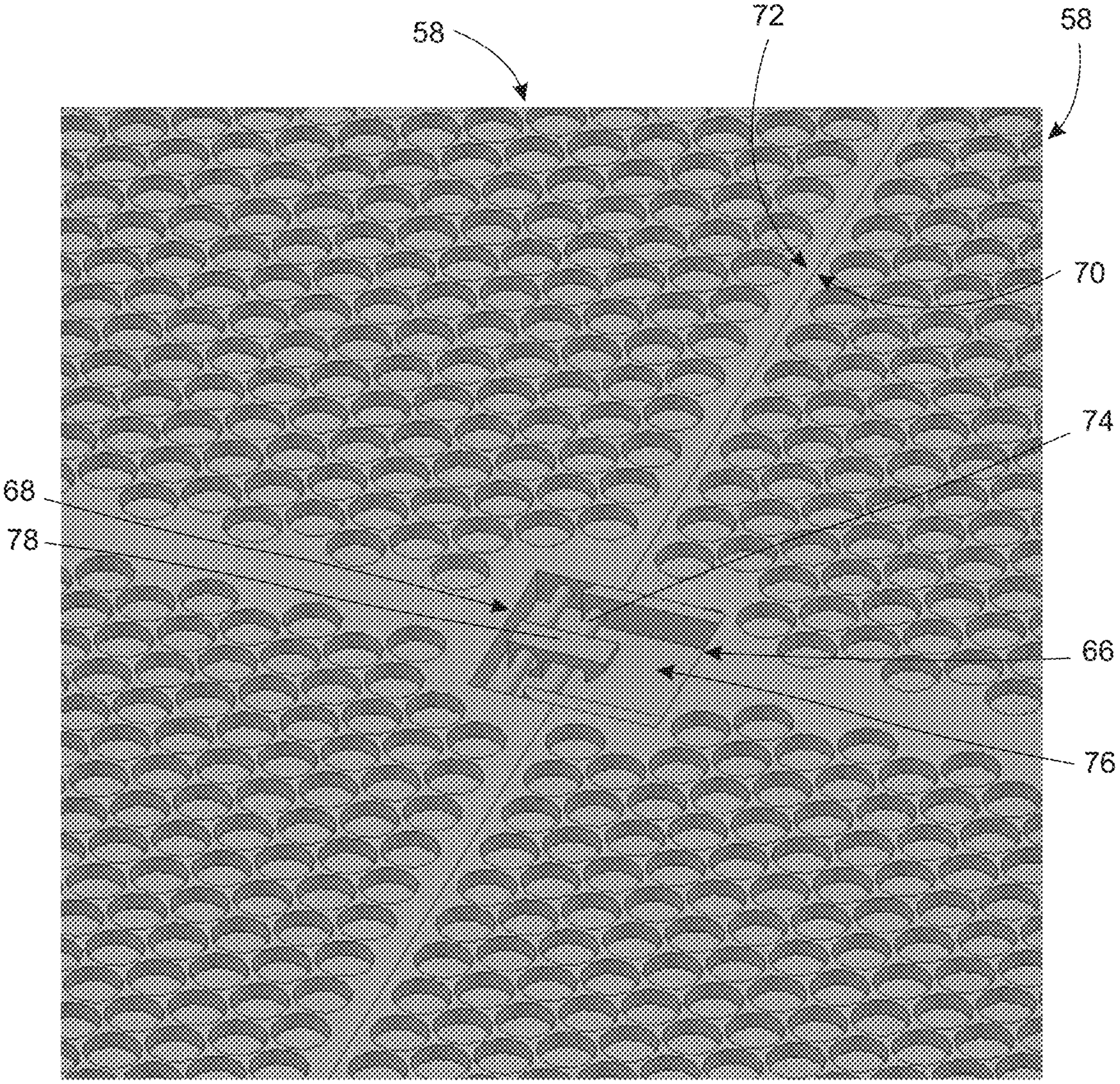

In the same way, two further carrier plates 58 are removed from the carrier plate holder 40 and pushed one behind the other onto the placement surface 54 of the placement plate 52. This is illustrated in FIG. 13. Each placement surface 54 is configured such that three carrier plates 58 can be arranged on it one behind the other. The three carrier plates 58 are thereby coupled with each other via their first and second coupling portions 66, 68. In other words, the middle carrier plate 58 is thereby coupled with the rear carrier plate 58 via its second coupling portion 68 and coupled with the front carrier plate 58 via its first coupling portion 66. The rear carrier plate 58 has been inserted first. The center carrier plate 58 has been inserted second. The front carrier plate 58 has been inserted third. During insertion of a carrier plate 58 onto the placement surface 54, the carrier plate is inserted with the second edge side 72 ahead. An inserted carrier plate 58 is oriented on the placement surface 54 such that the first edge side 70 is arranged on the side of the carrier plate 58 facing the transfer plate 42. If a first carrier plate 58 is arranged on the placement surface 54, during insertion of a second carrier plate 58, the second edge side 72 of the second carrier plate 58 is pushed onto the first edge side of the first carrier plate 58, wherein the first and second coupling portions couple together. The coupling occurs by pressing the locking member 78 of the second carrier plate 58 against the holding member 74 of the first carrier plate 58, whereby the locking member 78 couples with holding member 74 by means of the flank actuation. During the insertion of the carrier plates, each carrier plate 58 is inserted only up to a front area of the placement surface 54, respectively, since during the equally far insertion of a further carrier plate 58, the firstly inserted carrier plate 58 after the coupling is further inserted together with the further carrier plate. The coupling of two carrier plates 58 is illustrated in FIG. 14. The coupling is not strictly necessary for the joint insertion, since during the insertion, the following carrier plate 58 pushes the firstly inserted carrier plate further to the rear, as soon as the following carrier plate comes into abutment with the first carrier plate during the insertion. However, the coupling for the joint removing of the carrier plates from the freeze dryer 16 is of advantage, which will still be explained in the following.

Figure 15:
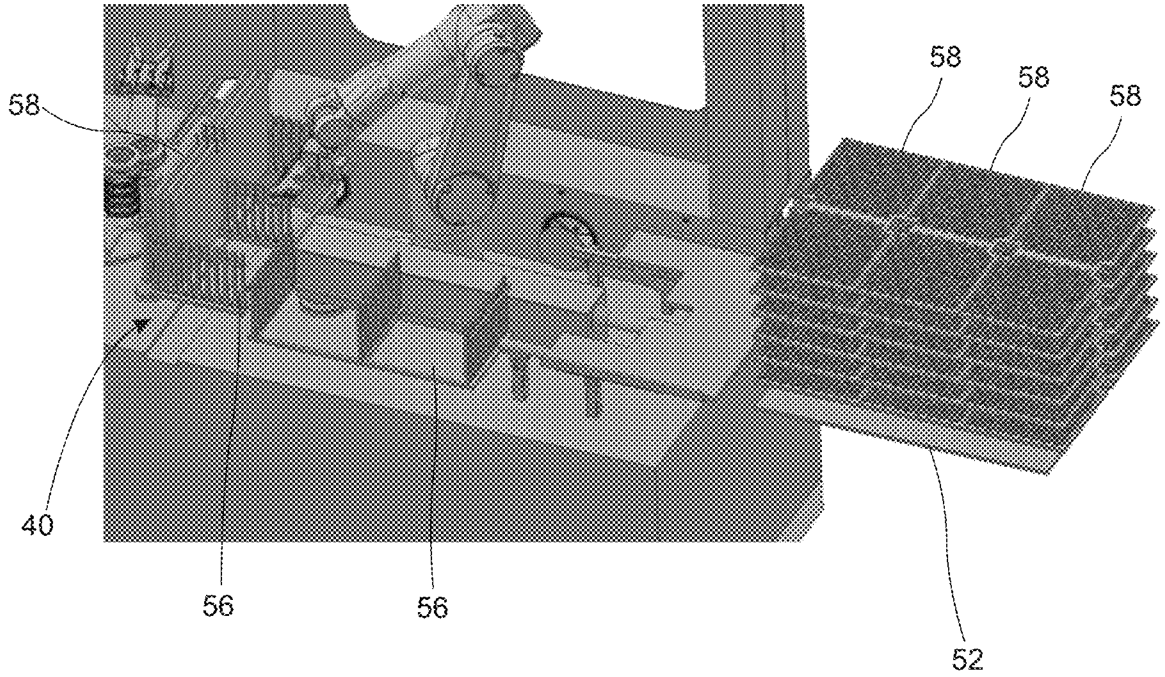

In the same way, then, also the further placement surfaces 54 of the freeze dryer are each loaded with three carrier plates from the carrier plate holder, until only one placement surface 54 remains to be loaded. This is illustrated in FIG. 15. For loading the placement surfaces 54, the placement surfaces 54 are moved one after the other to the level of the transfer surface 44 and loaded with three carrier plates each.

Figure 16:
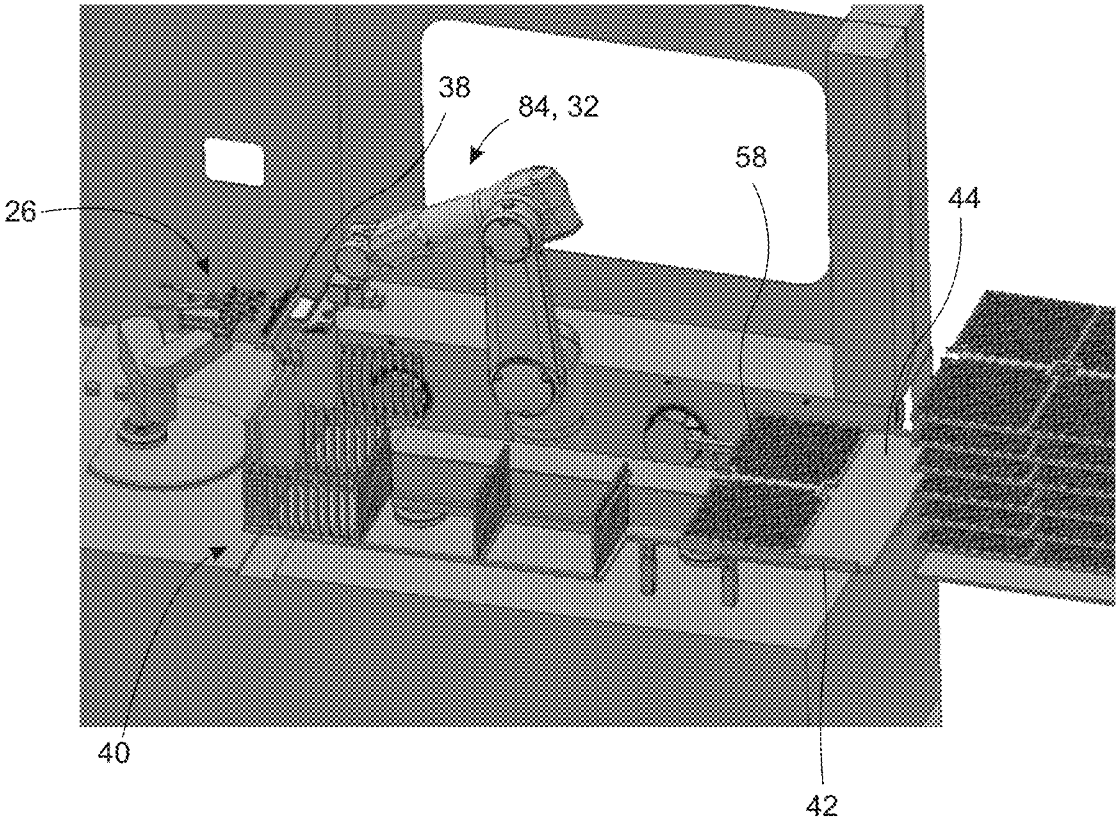

When only one placement surface 54 remains to be loaded, the receiving device 50 removes a carrier plate 58 from the carrier plate holder 40 and places it on the transfer plate 42. This is illustrated in FIG. 16.

Figure 17:
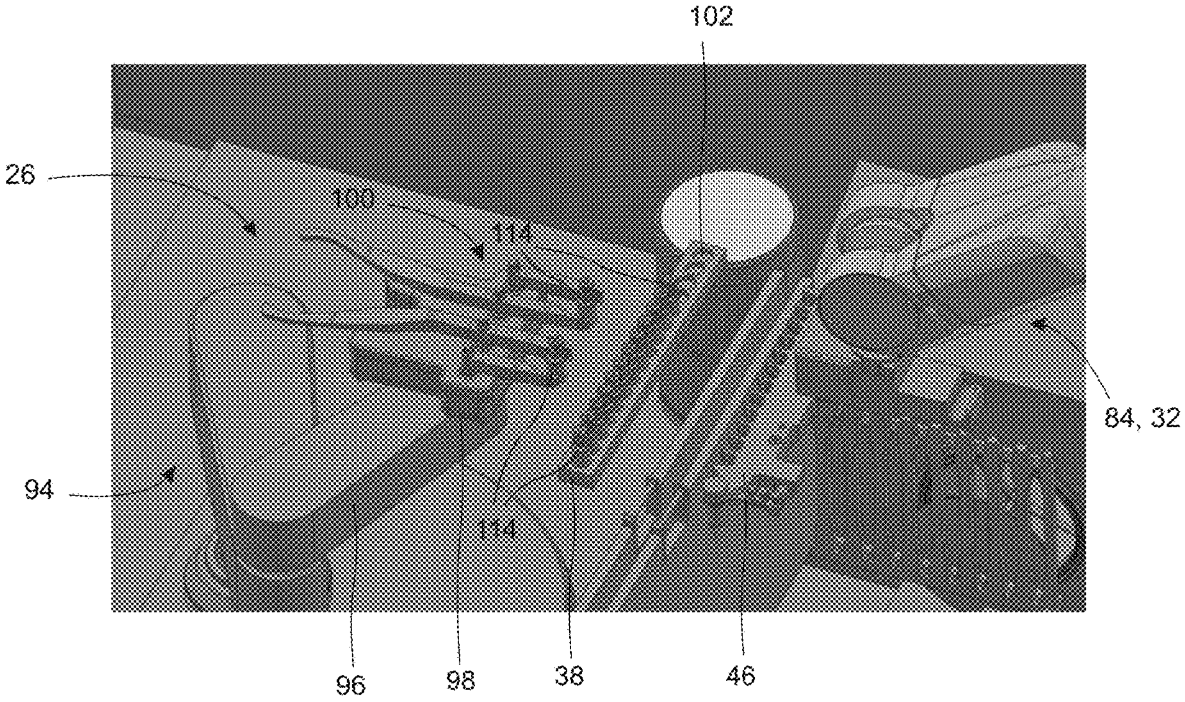

By means of the transport device 26, containers 114 are then fed to the handling station 14 and arranged in the receptacles 102 of the container holder 38. This is illustrated in FIG. 17.

Figure 18:
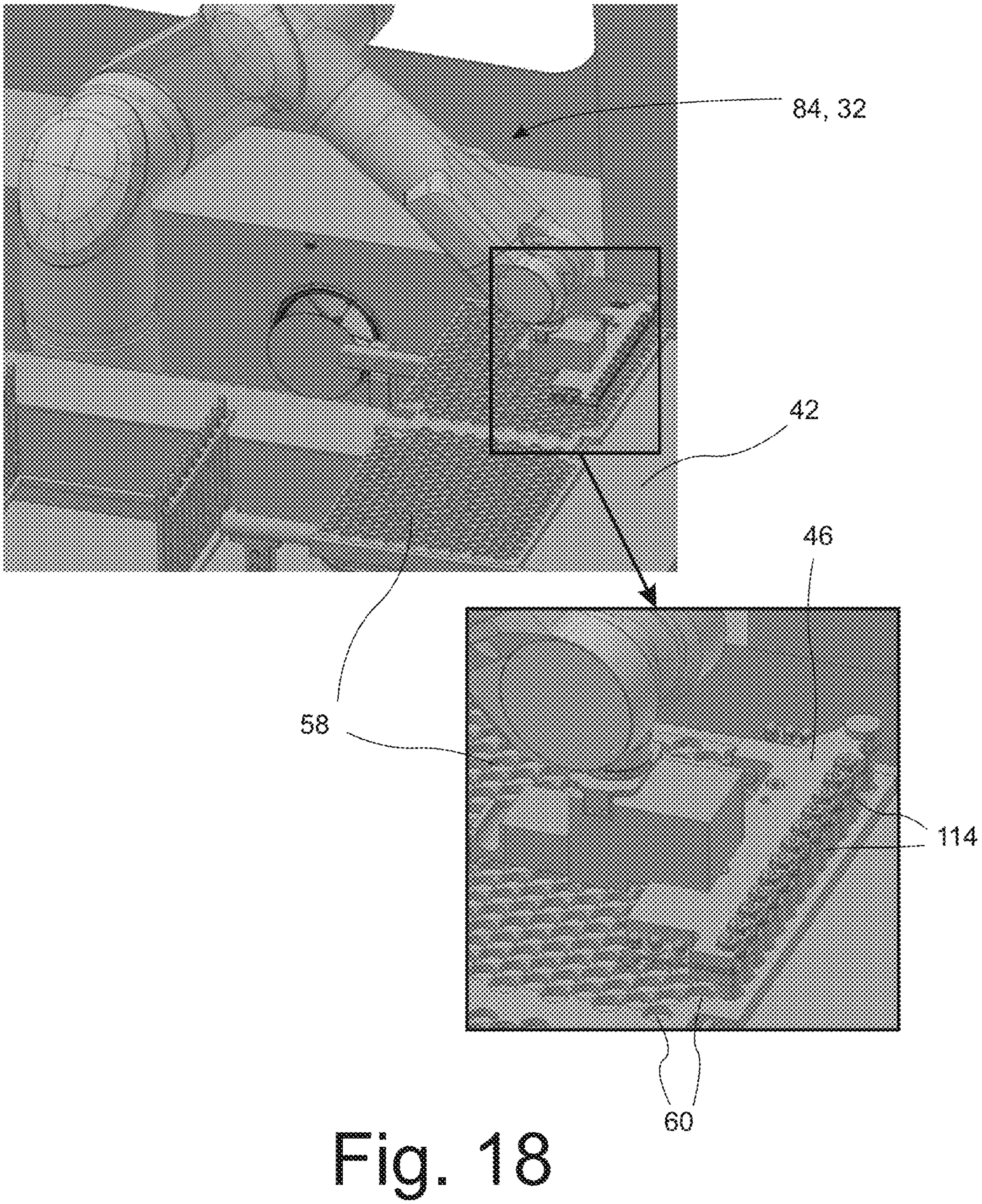

When all receptacles 102 of the container holder 38 are equipped with containers 114, the gripping device 46 is moved to the container holder 38 by means of the handling robot 84 and removes a row of containers 114. The gripping device 46 is then moved to the transfer plate 42, in particular to the carrier plate 58 arranged on the transfer plate 42, wherein the row of containers 114 is transferred thereto. The gripping device 46 then inserts the row of containers 114 into corresponding empty receptacles 60 of the carrier plate 58, which are arranged in a row. This is illustrated in FIG. 18.

Figure 19:
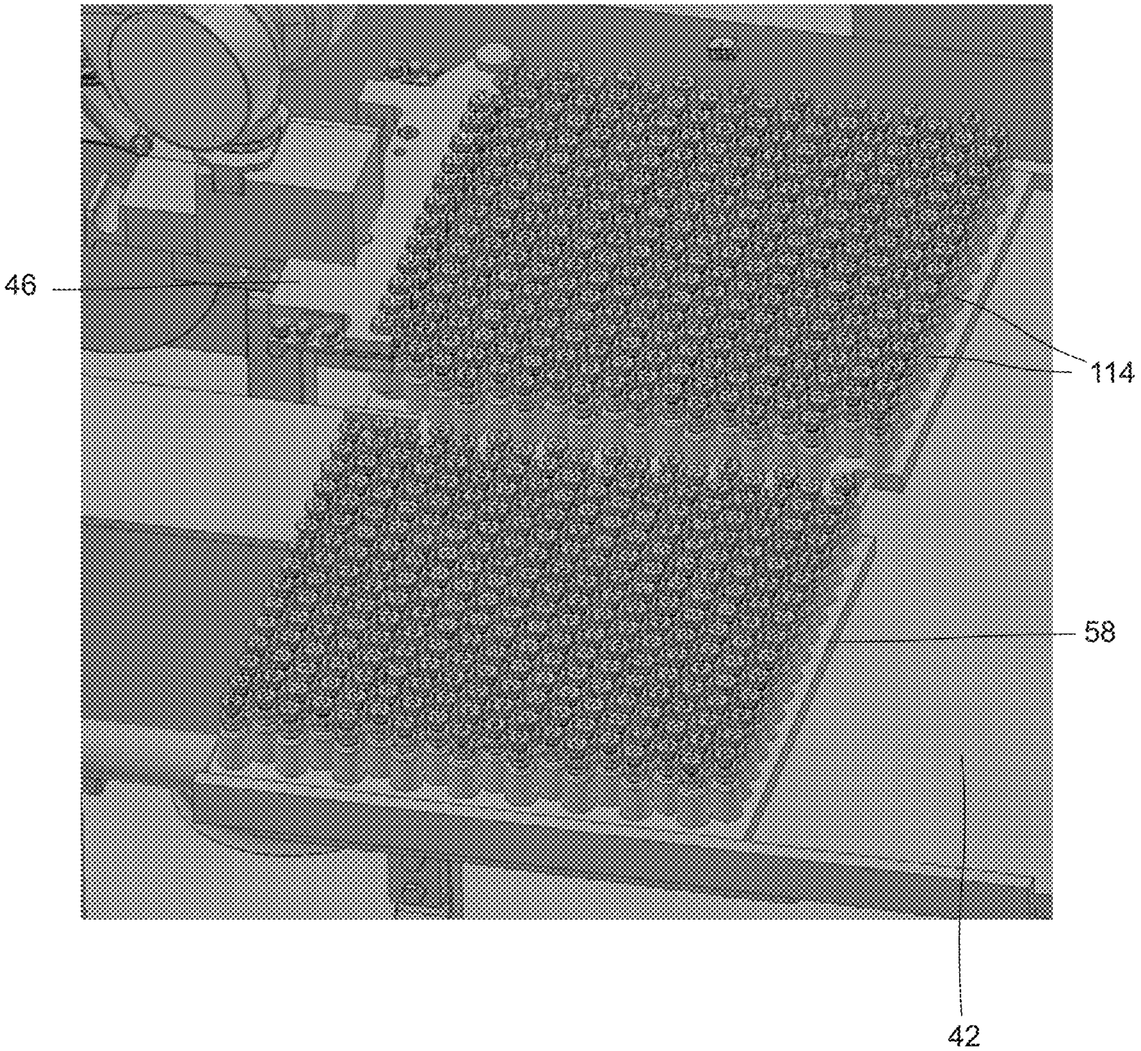

In this way, further containers 114 are fed to the container holder 38 one after the other and are inserted into the receptacles 60 of the carrier plate 58 by means of the gripping device 46 until in each receptacle 60 of the carrier plate 58 a container is inserted. This is illustrated in FIG. 19.

Figure 20:
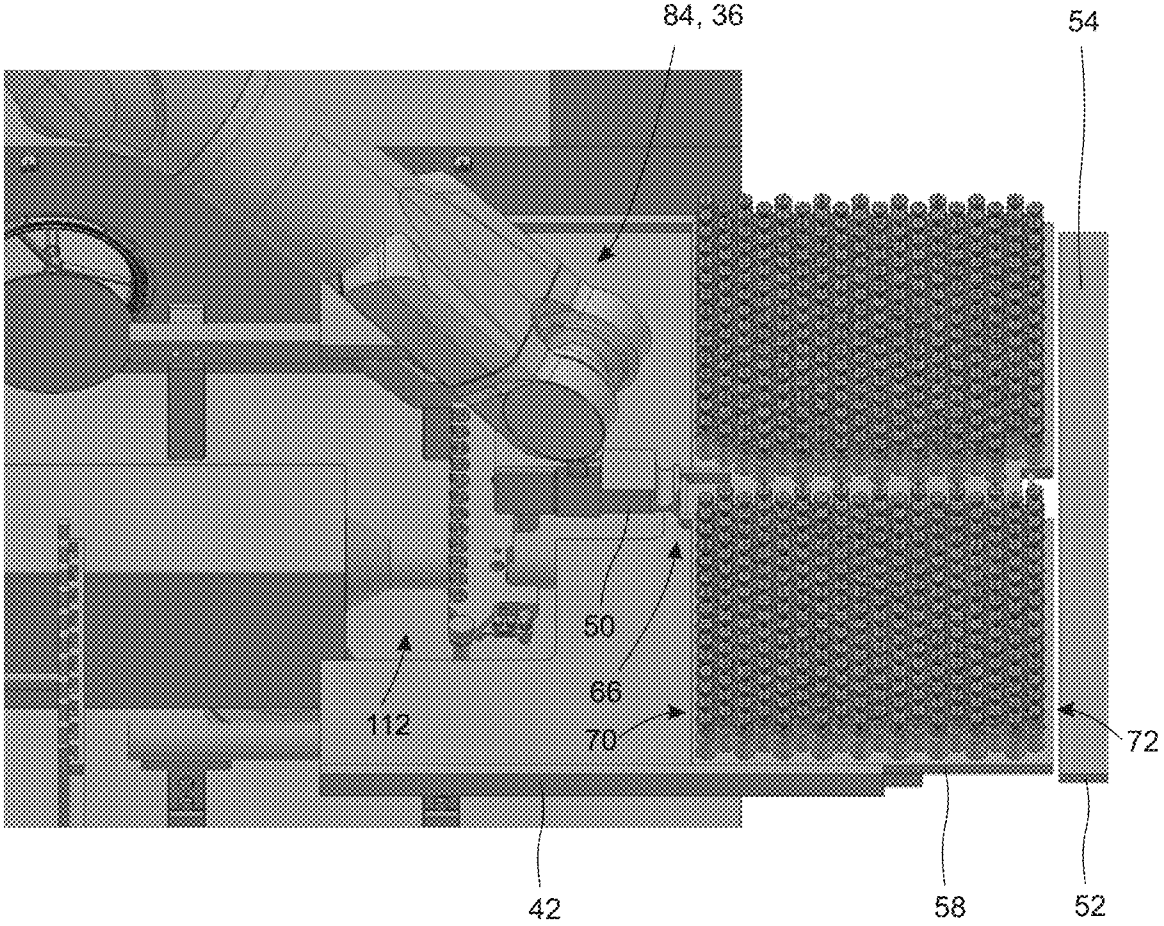

Then, the receiving device 50 is moved again such that the receiving member 80 bears against the first edge side 70, in particular against the holding member 74 from the outside. By means of the receiving device 50, the carrier plate 58 is then pushed so far in the direction of the freeze dryer, in particular in the direction of the placement plate 52 arranged at the same level, until the first coupling portion 66 is at least no longer arranged above the recess 112 but above the transfer surface 44. The carrier plate 58 then projects over the edge of the transfer plate 42 in the direction of the placement plate 52. In other words, the carrier plate 58 is partially arranged above the gap between the transfer plate 42 and the placement plate 52. This is illustrated in FIG. 20. The carrier plate 58 can also be partially or fully inserted into the freeze dryer in this way by means of the receiving device 50, in particular it can be displaced onto the placement plate 52.

Figure 21:
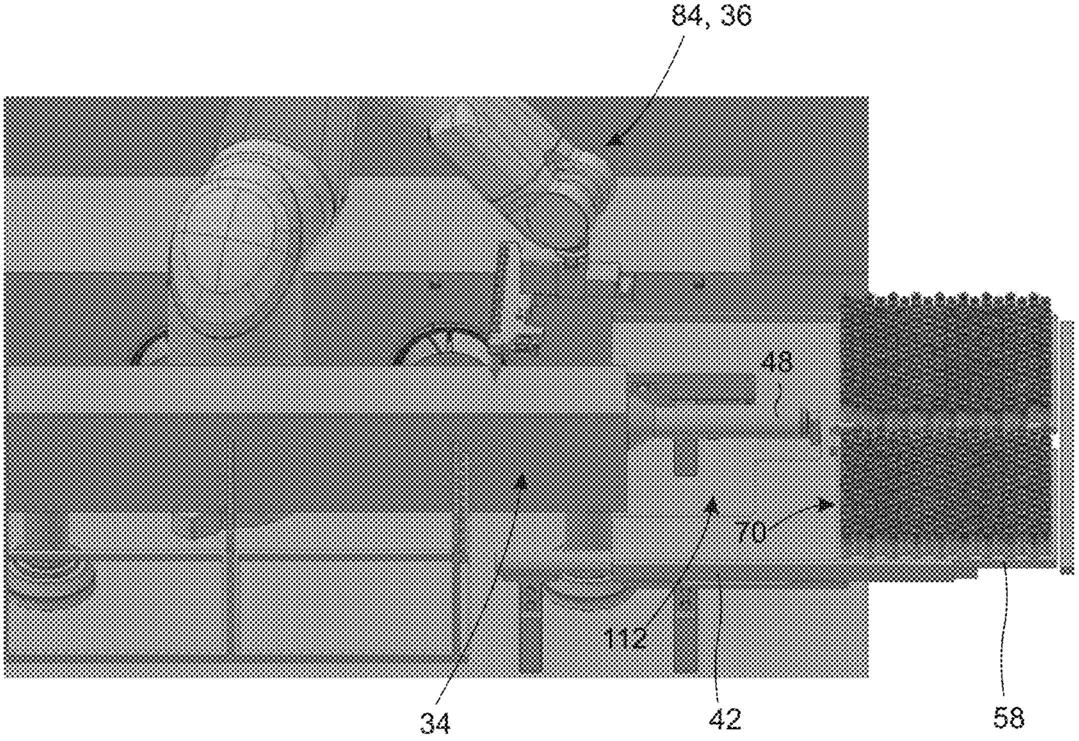

The receiving device 50 is then moved to the side and makes room for the second handling device 34. By means of the stroke unit 106, the linear unit 48 is moved through the recess 112 vertically upwardly until the linear unit 48 is arranged at the level of the carrier plate 58. This is illustrated in FIG. 21.

Figure 22:
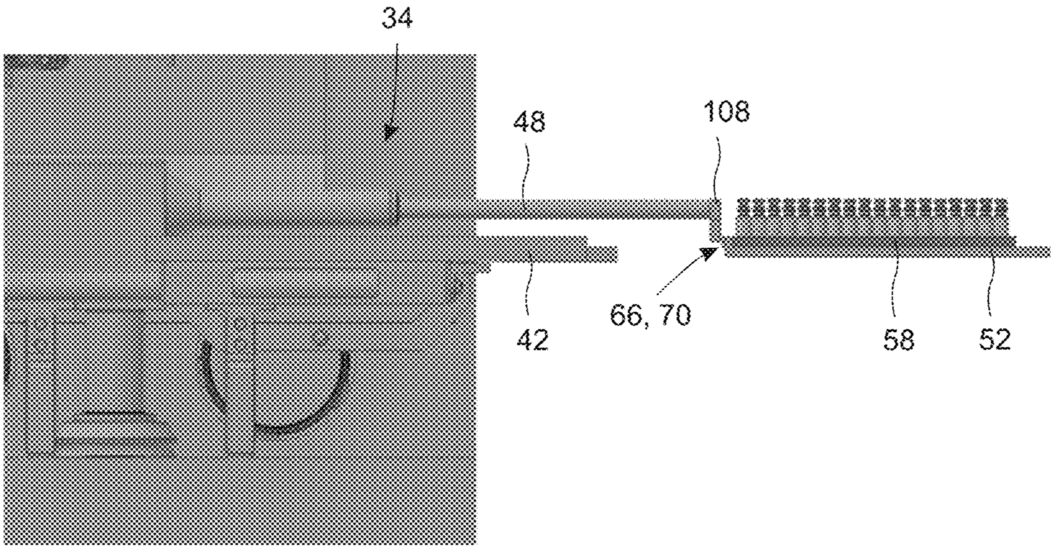

Then, the carrier plate 58 is pushed completely into the freeze dryer onto the placement surface 54 by means of the pushing member 108 of the linear unit 48. This is illustrated in FIG. 22. Subsequently, the pushing member 108 is moved back again.

Figure 23:
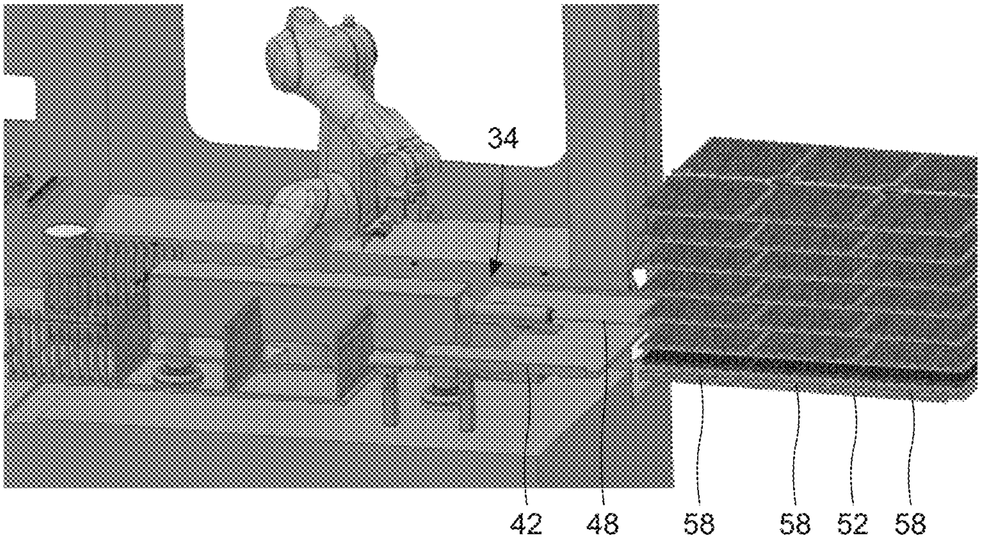

In the same way, two further carrier plates 58 are removed from the carrier plate holder 40, equipped with containers 114 and pushed one behind the other onto the placement surface 54 of the placement plate 52. This is illustrated in FIG. 23. During the insertion, the three carrier plates 58 are again coupled with each other correspondingly.

Figure 24:
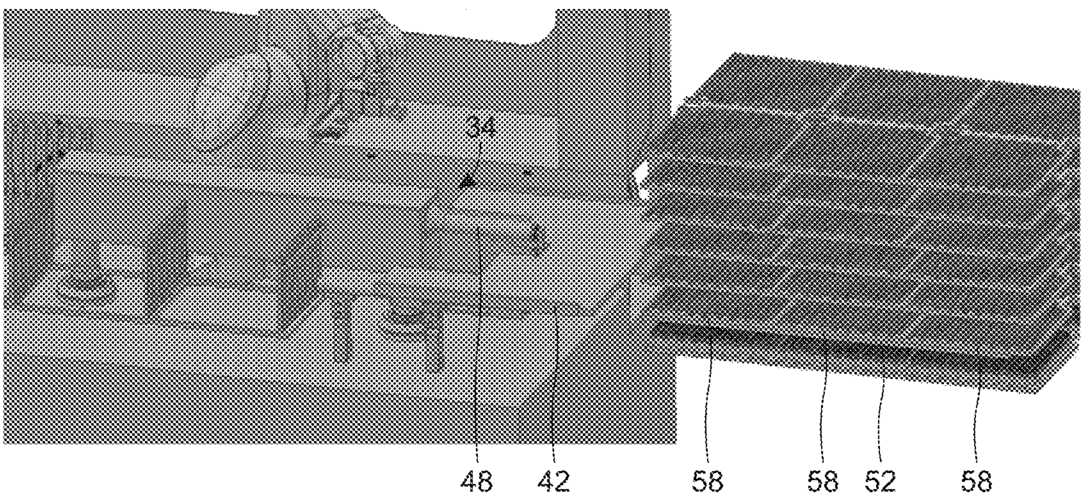

Thereafter, the placement surfaces 54 are moved vertically such that a placement surface 54 loaded with empty carrier plates 58 is arranged at the level of the transfer surface 44. This is illustrated in FIG. 24.

Figure 25:
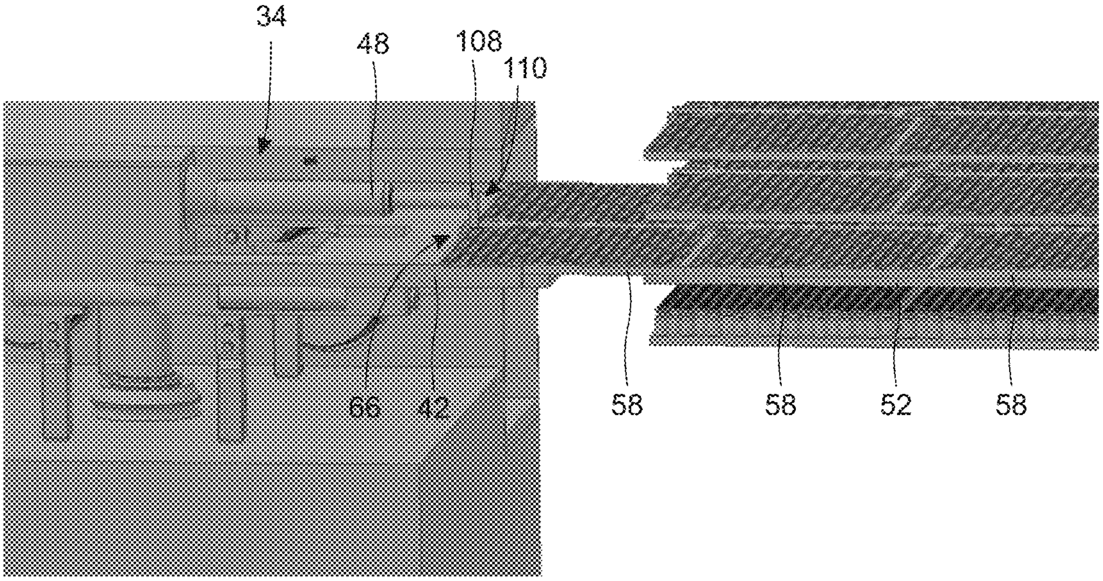

Then, the front carrier plate 58 is pulled from the placement plate 52 onto the transfer plate 42. Since the three carrier plates 58 arranged on the placement plate 52 are coupled with each other, the center carrier plate and the rear carrier plate are thereby also pulled to the front. For this purpose, the linear unit 48 and the stroke unit 106 are moved such that the protrusion of the pushing member 108 engages the recess 76 of the first coupling portion of the front carrier plate 58 so that it can be pulled. The front carrier plate 58 is pulled off the placement plate 52 so far until the center carrier plate 58 is arranged at the front edge of the placement plate 52. This is illustrated in FIG. 25.

Figure 26:
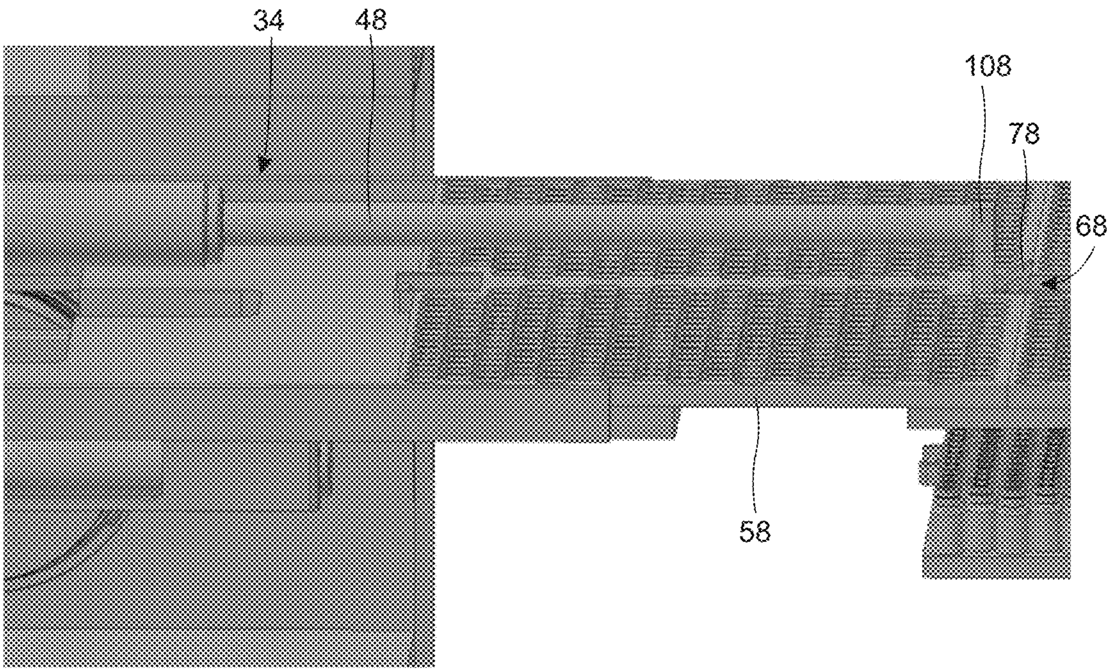

Then, the pushing member 108 is moved to the second coupling portion 68 of the front carrier plate 58, actuates the actuating portion of the locking member 78, wherein the front carrier plate 58 is decoupled from the center carrier plate 58. This is illustrated in FIG. 26.

Figure 27:
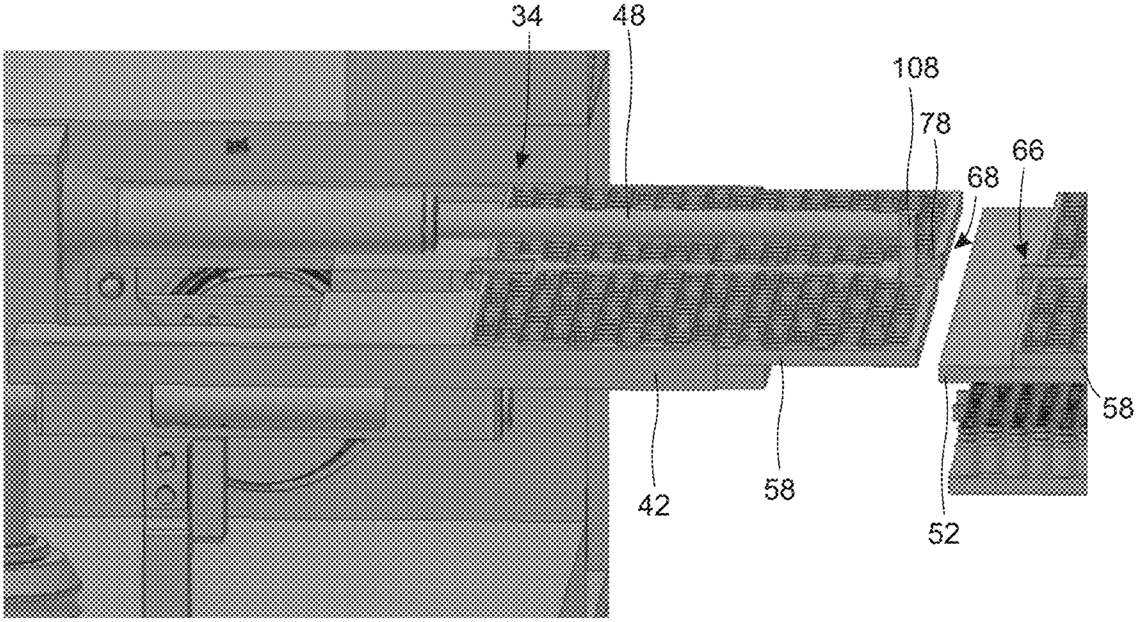

Then, the pushing member 108 pulls the front carrier plate 58, while the locking member 78 is actuated, so far onto the transfer plate 42 until the first coupling portion 66 is arranged over the recess 112. This is illustrated in FIG. 27. Thereafter, the pushing member 108 is again removed from the recess 76 and moved back. Then, the linear unit 48 is moved by means of the stroke unit 106 vertically downward through the recess 112 to arrange the linear unit 48 below the transfer plate 42 again.

Figure 28:
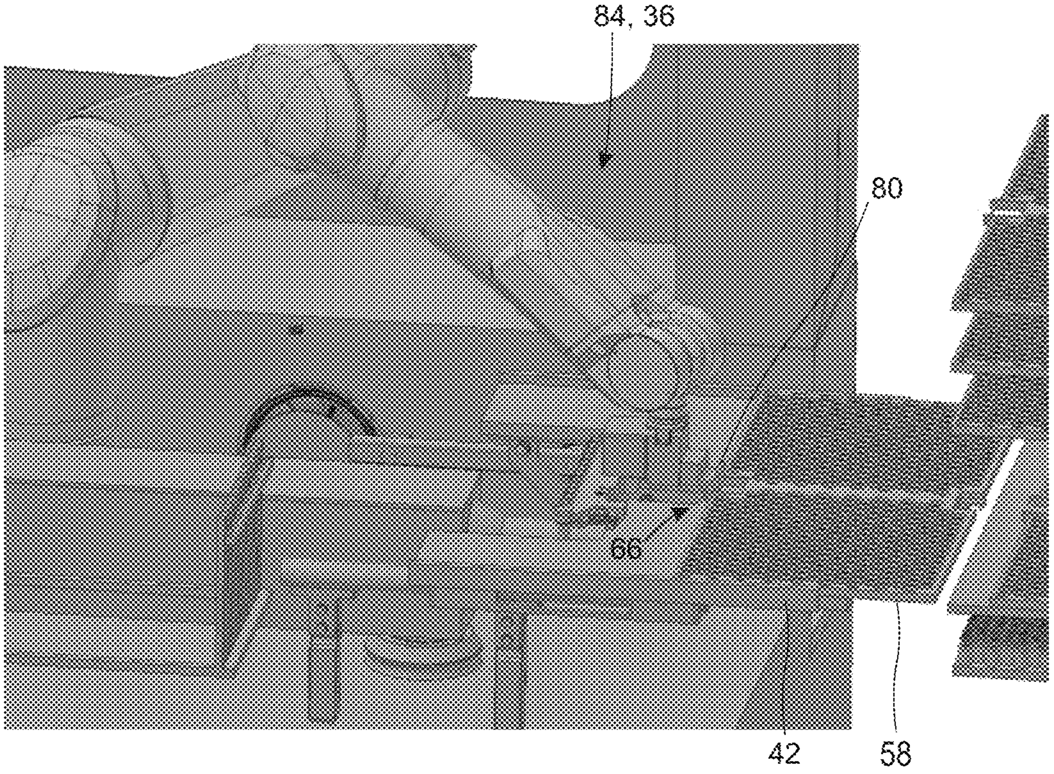

Then, the receiving device 50 is moved to the first coupling portion of the front carrier plate 58 and coupled therewith. For this purpose, the receiving member 80 is moved from below through or in the recess 112 upwardly, such that the holding member 74 is received in the hook-shaped receptacle of the receiving member 80. This is illustrated in FIG. 28.

Figure 29A:
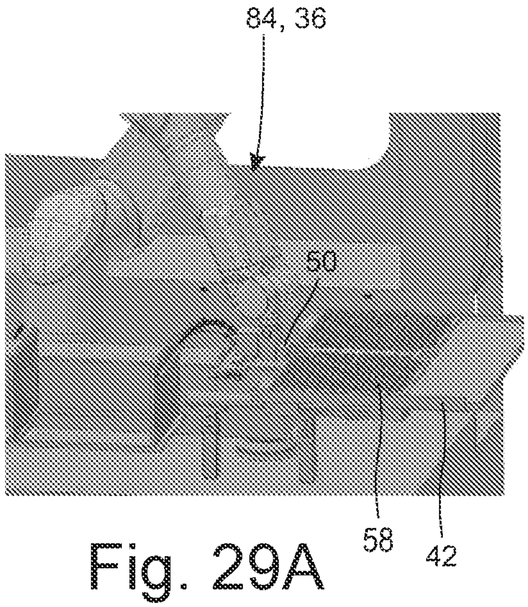
Figure 29B:
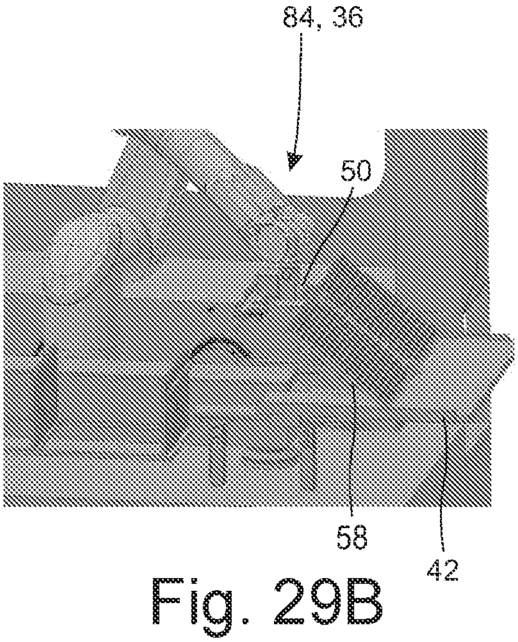
Figure 29C:
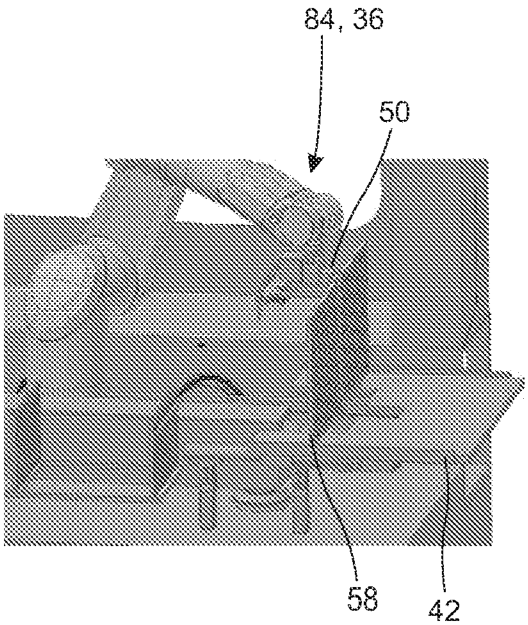

Then, the carrier plate 58 is lifted by means of the receiving device 50. This is illustrated in FIG. 29(A) to (C). During lifting, the carrier plate is pivoted such that the side surfaces are transferred from a horizontal orientation to a vertical orientation.

Figure 30A:
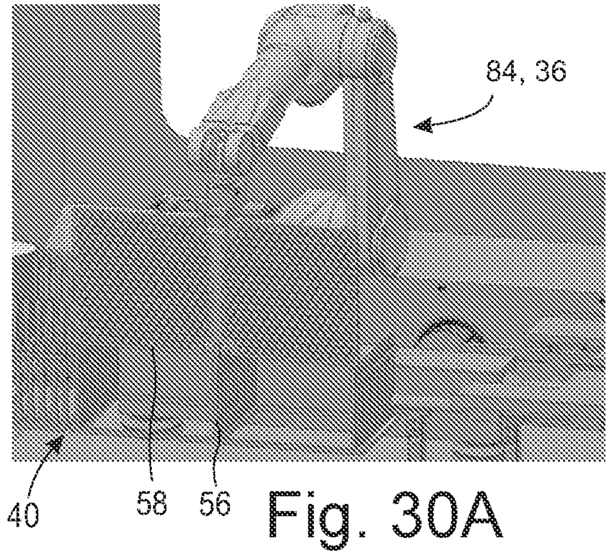
Figure 30B:
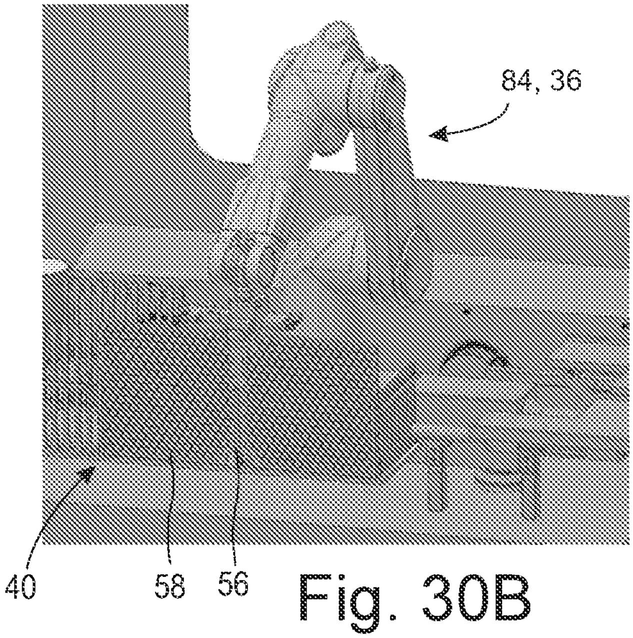

The carrier plate is then transferred to a receptacle 56 of the carrier plate holder 40 by means of the receiving device 50 and inserted therein. This is illustrated in FIGS. 30(A) and (B). After the insertion, the receiving member is again decoupled from the first coupling portion.

Figure 31:
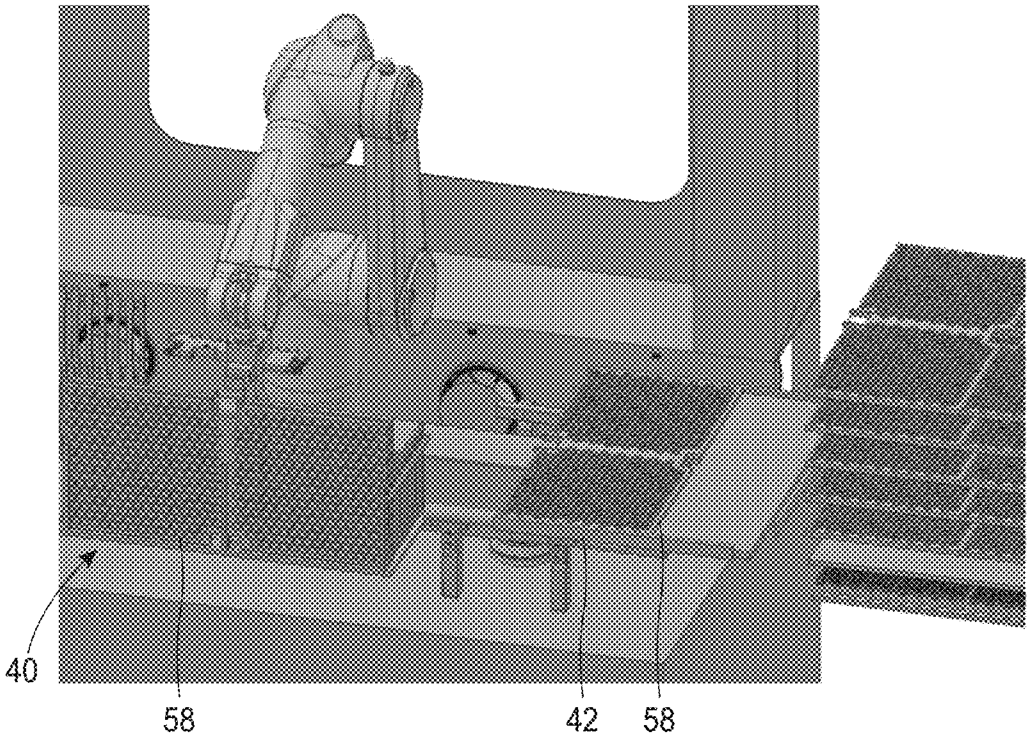

In the same way, the center carrier plate 58 is pulled out from the placement surface 54 onto the transfer plate 42, and from there is further transferred into the carrier plate holder 40. Then, the rear carrier plate is pulled out from the placement surface onto the transfer plate by means of the linear unit so far until the first coupling portion is arranged above the transfer surface 44 or above the recess. Then, the linear unit is again arranged below the transfer plate 42 and the receiving device 50 can pull the carrier plate 58 further to the front. This is illustrated in FIG. 31.

Then, the three carrier plates 58 are again equipped with containers 114 corresponding to the description of FIGS. 16 to 23 and pushed onto the placement surface 54 of the freeze dryer.

Figure 32:
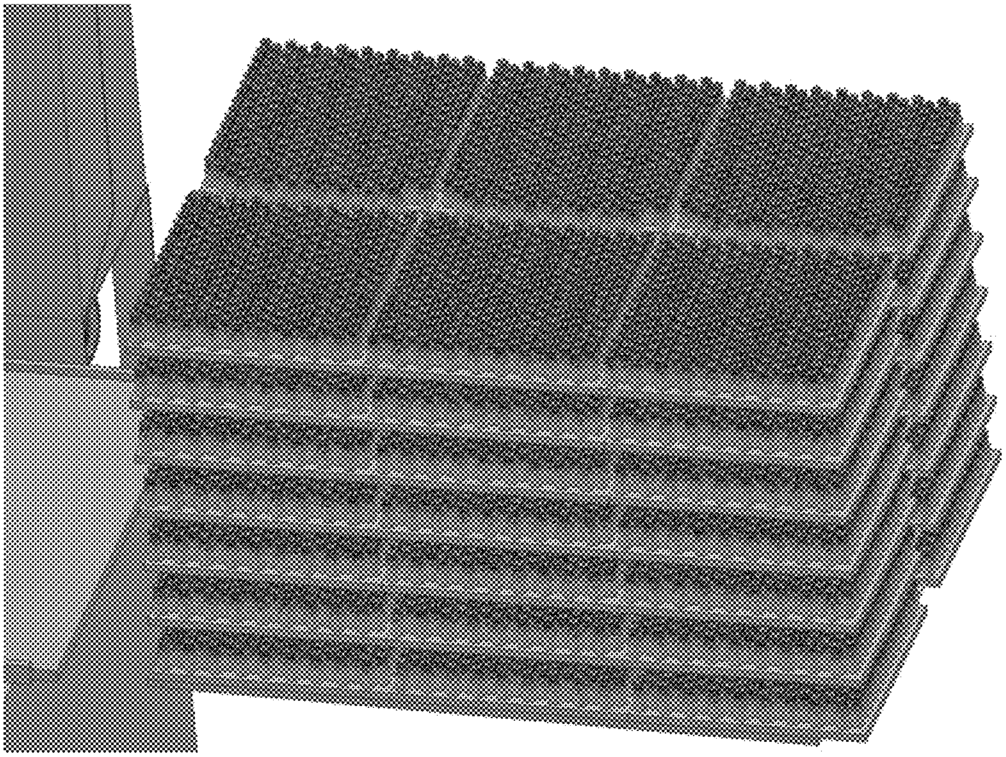

In this way, all placement surfaces 54 of the freeze dryer are loaded one after the other with equipped carrier plates 58. In FIG. 32, the state is illustrated in which all placement surfaces 54 are loaded with equipped carrier plates 58. In other words, the freeze dryer is thereby completely loaded.

After the freeze-drying, the carrier plates 58 are removed from the freeze dryer again and the containers 114 are removed from the receptacles 60 of the carrier plates 58 and removed.

Figure 33:
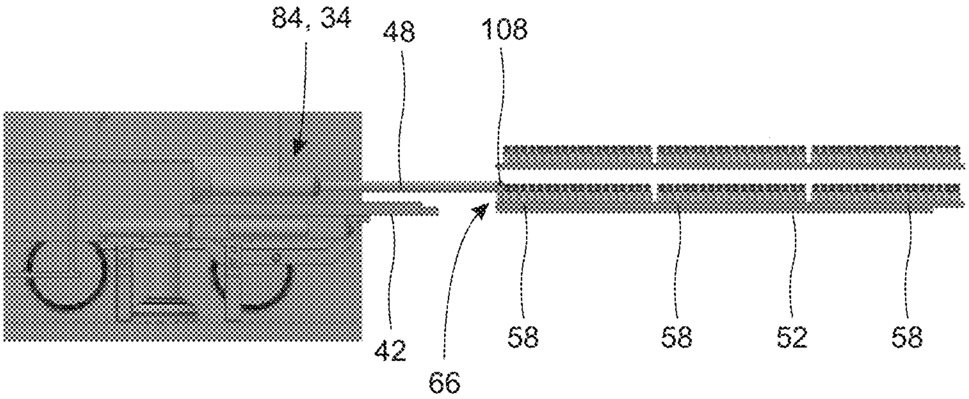
Figure 34:
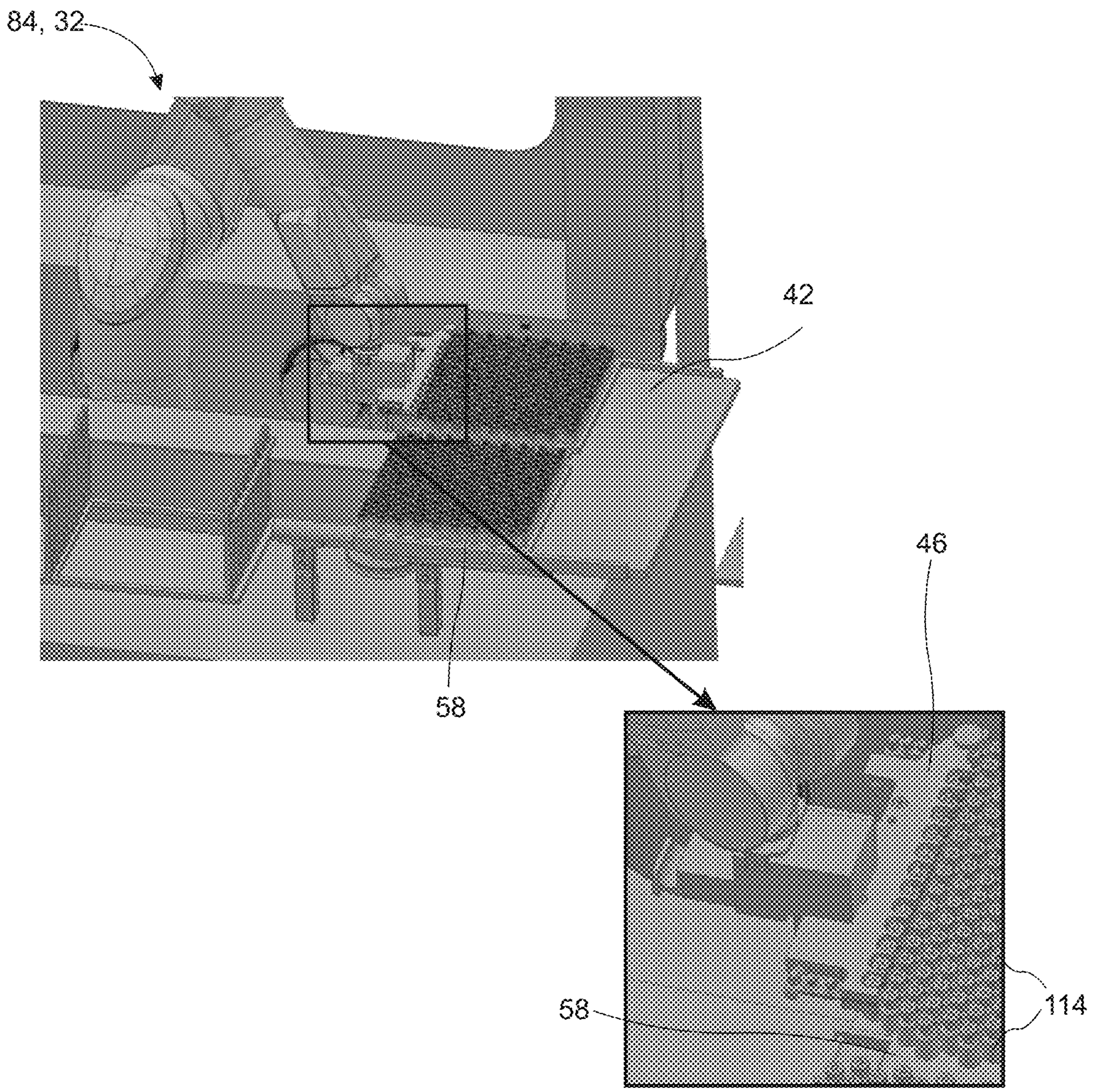
Figure 35A:
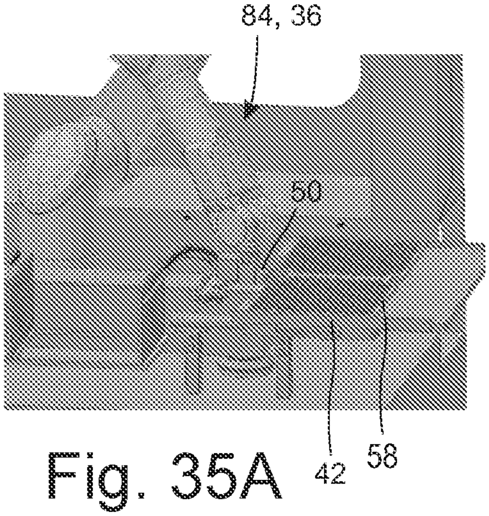
Figure 35B:
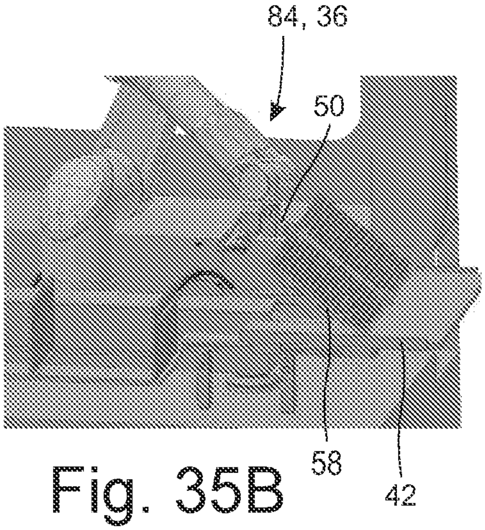
Figure 35C:
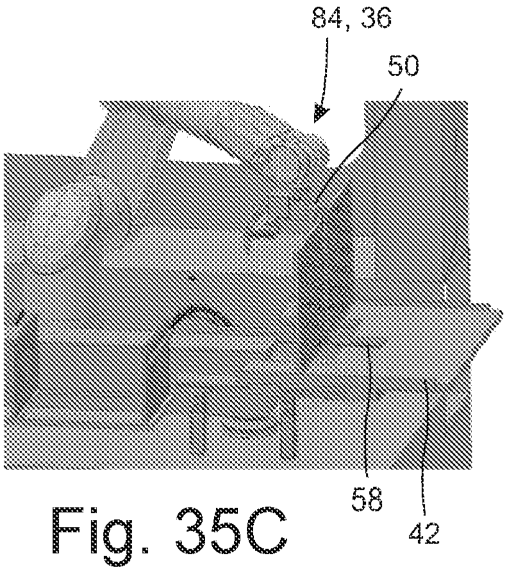
Figure 35D:
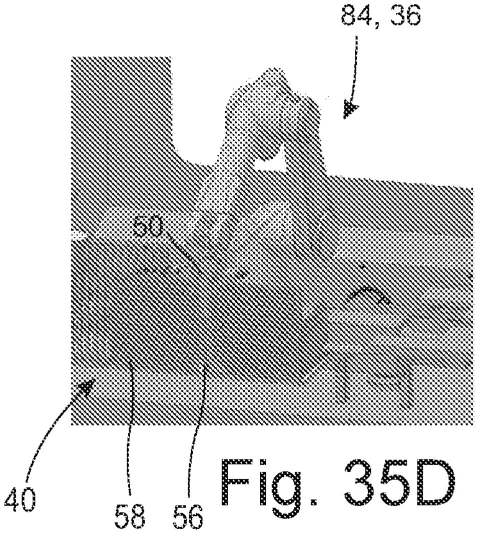

For this purpose, the carrier plates 58 are pulled from each placement surface 54 by means of the linear unit 48 one after the other onto the transfer plate 42. There, the containers 114 are then removed from the receptacles 60 by means of the gripping device 46, transferred to the container holder 38, and inserted into the receptacles 102 of the container holder 38. Thereby, the containers are again handled in rows. This is illustrated in FIGS. 33 and 34.

After the removing of the containers 114, each empty carrier plate 58 is inserted into an empty receptacle of the carrier plate holder 40. This is illustrated in FIG. 35(A) through (D). Thereby, the carrier plate is handled corresponding to the description of FIGS. 29 and 30.

Figure 36:
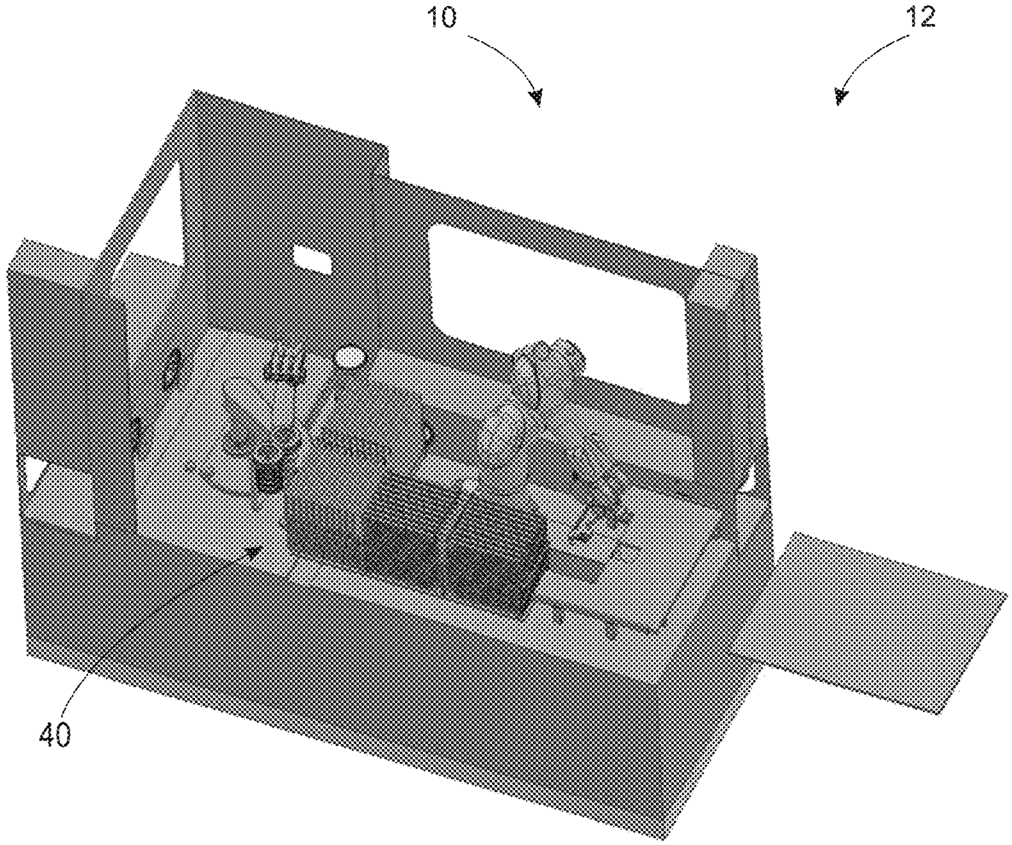

In this way, all carrier plates 58 are removed one after the other from the freeze dryer 16, the containers 114 are removed from the receptacles 60, and the carrier plates 58 are subsequently stored again in the carrier plate holder 40. This state is illustrated in FIG. 36. When the freeze dryer 16 is completely emptied and all carrier plates 58 are again arranged in the carrier plate holder 40, an automatic washing cycle can be performed by cleaning the carrier plates 58, in particular by means of a sprinkler system. The washing cycle can be performed in the complete interior of the isolator. After a filling cycle or batch, the interior is decontaminated with H2O2, if required, and cleaned manually or automatically (wash cycle).

Figure 37:
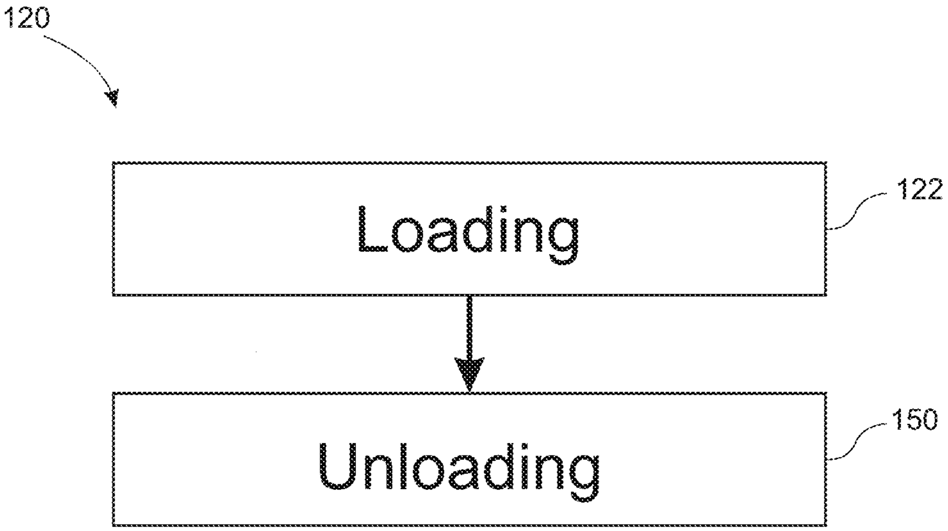
FIG. 37 is a schematic view of an embodiment of a method for handling containers in a loading system for a freeze dryer.

FIG. 37 shows an embodiment of a method 120 for handling containers filled with a medical, pharmaceutical, or cosmetic substance, in the loading system 10 for a freeze dryer. In particular, the containers 114 can be handled in the loading system 10 according to FIG. 1, or the loading system 10 according to FIGS. 2 to 36, or the loading system 10 according to FIGS. 46 to 63, corresponding to the method 120.

The handling of the containers 114 in the loading system 10 can comprise, on the one hand, the loading 122 of the freeze dryer 16. Thereby, the containers 114 are inserted into the freeze dryer 16 by means of the carrier plates 58.

The handling of the containers 114 in the loading system 10 can alternatively or additionally comprise the unloading 150 of the freeze dryer 16. Thereby, the containers 114 arranged in the carrier plates 58 are removed from the freeze dryer 16.

Figure 38:
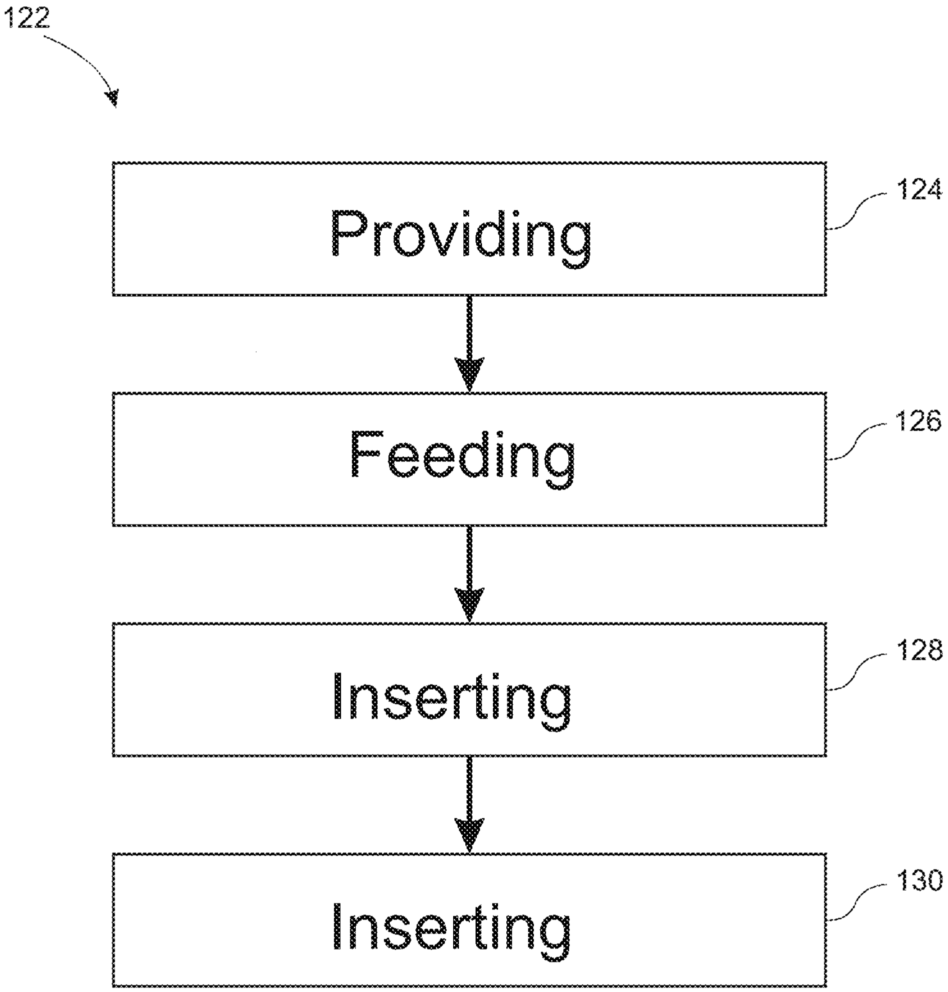
FIG. 38 is a schematic view of the loading of the freeze dryer in the method of FIG. 37.

FIG. 38 shows the loading 122 of the freeze dryer 16 of FIG. 37.

In a first step 124 of the loading 122, an empty carrier plate 58 is provided in a handling station 30, wherein the carrier plate 58 comprises a plurality of receptacles 60 each configured to receive one of the containers 114.

In a further step 126 of the loading 122, containers 114 are fed to the handling station 30.

In a further step 128 of the loading 122, the containers 114 are received in the receptacles 60 of the carrier plate 58 by means of the first handling device 32.

In a further step 130 of the loading 122, the carrier plate 58 is inserted into the freeze dryer 16 by means of the second handling device 34. Preferably, the carrier plate 58 is thereby inserted from the handling device 30 into the freeze dryer 16 by means of the second handling device 34, in particular wherein the carrier plate 58 is pushed from a transfer plate 42 of the handling device 30 onto a placement surface 54 of the freeze dryer 16.

Figure 39:
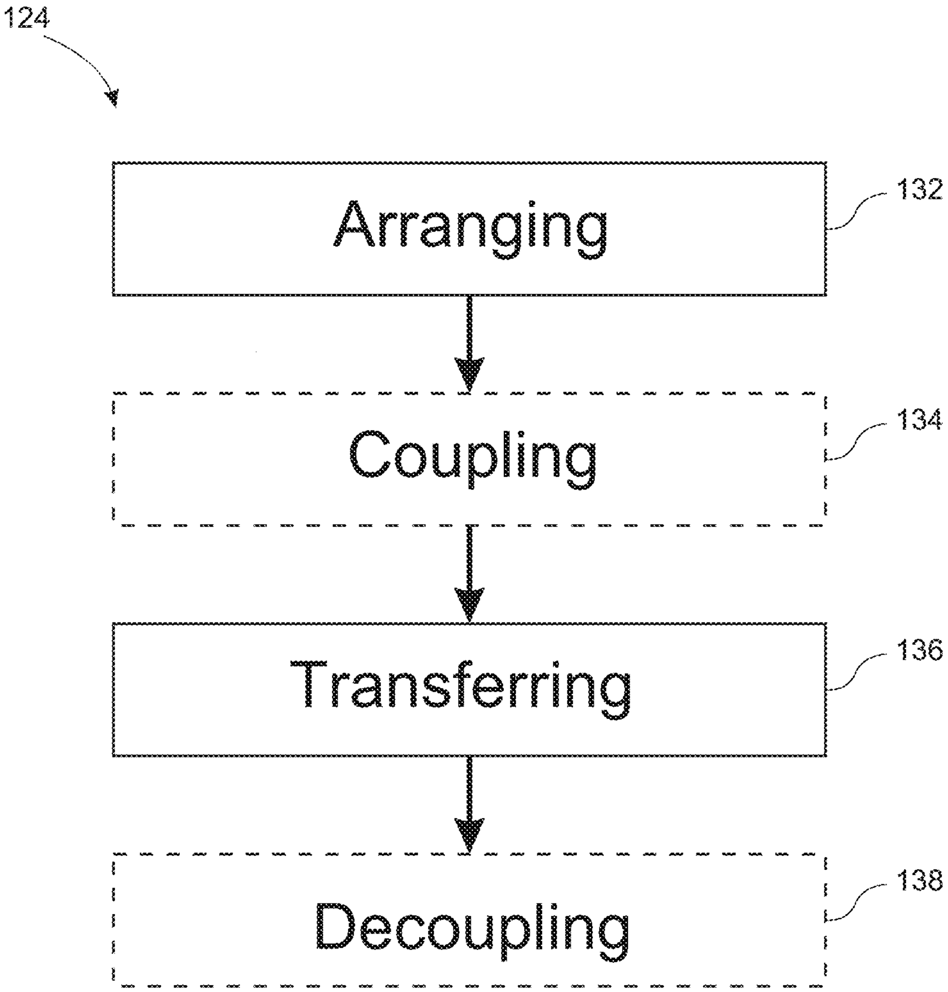
FIG. 39 is a detailed view of the providing step in FIG. 38.

In FIG. 39, steps are shown that can be performed for providing 124 the carrier plate 58.

In a first step 132 of the providing 124 of the carrier plate 58, a plurality of carrier plates 58 are arranged in a carrier plate holder 40 of the handling station 30.

In a further optional step 134 of the providing 124 of the carrier plate 58, the third handling device 36 is coupled with one of the carrier plates 58 arranged in the carrier plate holder 40 that shall be provided.

In a further step 136 of the providing 124 of the carrier plate 58, the carrier plate 58 is transferred from the carrier plate holder 40 to the transfer plate 42 by means of the third handling device 36.

In a further optional step 138 of the providing 124 of the carrier plate 58, the third handling device 36 is decoupled from the transferred carrier plate 58.

As an alternative to the steps illustrated in FIG. 39, for providing 124 the carrier plate 58, the carrier plate 58 can also be previously arranged in the freeze dryer 16, in particular on one of the placement surfaces 54 of the freeze dryer 16, and removed from the freeze dryer 16 by means of the second handling device 34, in particular wherein the carrier plate 58 is pulled from the placement surface 54 onto the transfer plate 42.

Figure 40:
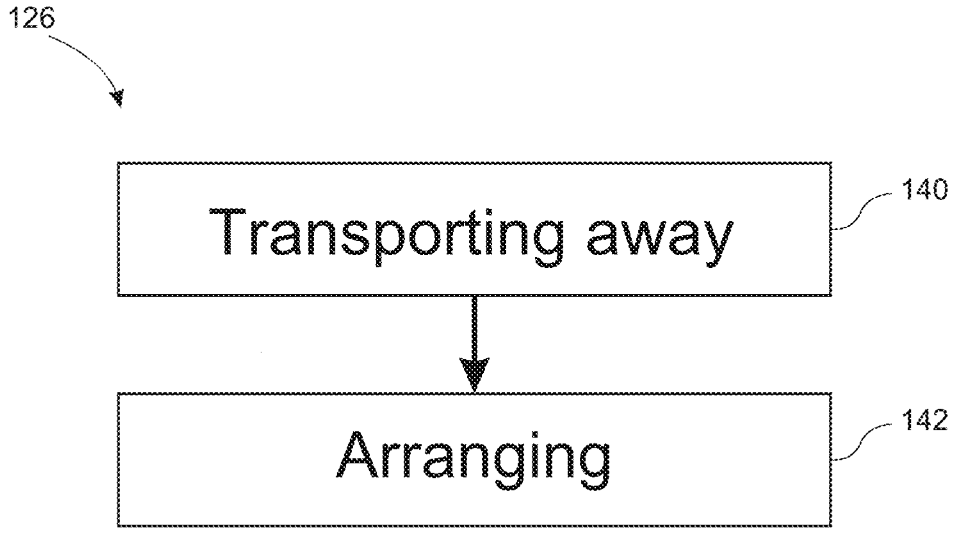
FIG. 40 is a detailed view of the feeding step in FIG. 38.

In FIG. 40, steps are shown that can be performed for feeding 126 the containers 114.

In a first step 140 of the feeding 126 of the containers 114, the containers 114 are transported to the container holder 38 of the handling station 30 by means of the transport device 26.

In a further step 142 of the feeding 126 of the containers 114, the fed containers 114 are arranged in the container holder 38. For arranging 142 the containers 114, the containers 114 are inserted into the receptacles 102 of the container holder 38. Thereby, the fed containers 114 can be collected in the container holder 38.

Figure 41:
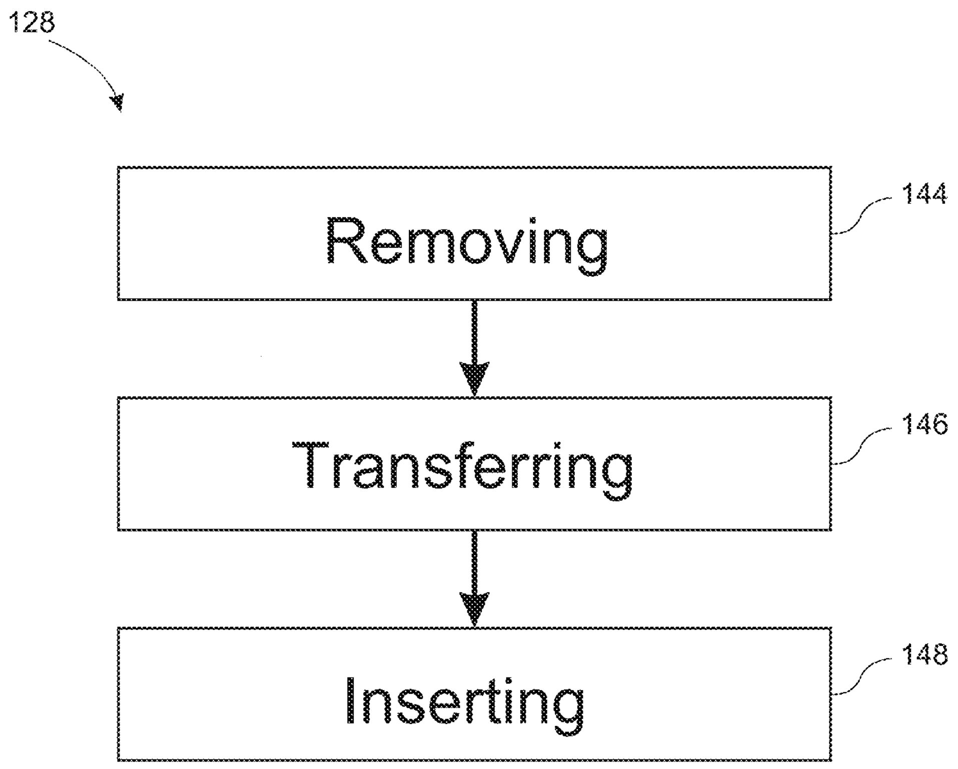
FIG. 41 is a detailed view of the inserting step in FIG. 38.

In FIG. 41, steps are shown that can be performed for inserting 128 the containers 114.

In a first step 144 of the inserting 128 of the containers 114, one or several containers 114, in particular a row of containers 114, are each removed from the container holder 38 by means of the first handling device 32.

In a further step 146 of the inserting 128 of the containers 114, the removed containers 114 are transferred by means of the first handling device 32 to the carrier plate 58 which is arranged on the transfer plate 42.

In a further step 148 of the inserting 128 of the containers 114, the transferred containers 114 are inserted into empty receptacles 60 of the carrier plate 58 by means of the first handling device 32.

Figure 42:
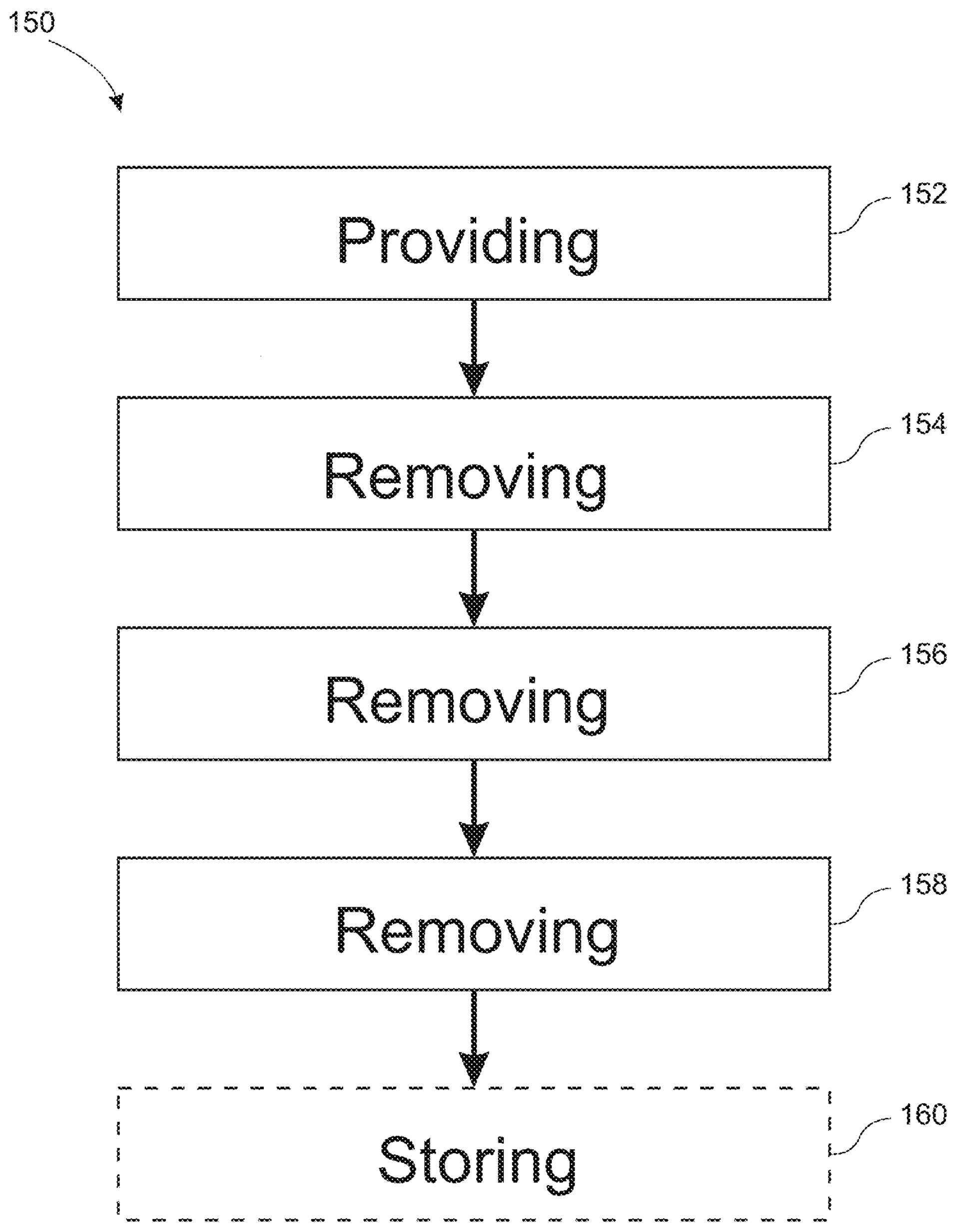
FIG. 42 is a schematic view of the unloading of the freeze dryer in the method of FIG. 37.

FIG. 42 shows the unloading 150 of the freeze dryer 16 of FIG. 37.

In a first step 152 of the unloading 150, a carrier plate 58 equipped with containers 114 is provided in the freeze dryer 16. The providing can be performed in the method 120 of FIG. 37 by the loading 122 of the freeze dryer 16.

In a further step 154 of the unloading 150, the carrier plate 58 is removed from the freeze dryer 16 by means of the second handling device 34.

In a further step 156 of the unloading 150, the containers 114 are removed in the handling station 30 from the receptacles 60 of the carrier plate 58 by means of the first handling device 32.

In a further step 158 of the unloading 150, the containers 114 are removed from the handling station by means of the transport device 26 or the transport device 28. Preferably, the carrier plate 58 is pulled out of the freeze dryer 16 by means of the second handling device 34, in particular wherein the carrier plate 58 is pulled from the placement surface 54 onto the transfer plate 42 of the handling station 30.

In a further optional step 160 of the unloading 150, the carrier plates are stored in the carrier plate holder 40.

Alternatively, the carrier plates 58 can also be stored in the freeze dryer 16. For this purpose, the emptied carrier plate 58 can be inserted into the freeze dryer 16 by means of the second handling device 34, in particular wherein the emptied carrier plate 58 is pushed from the transfer plate 42 onto the placement surface 54 of the freeze dryer 16 by means of the second handling device 34.

Figure 43:
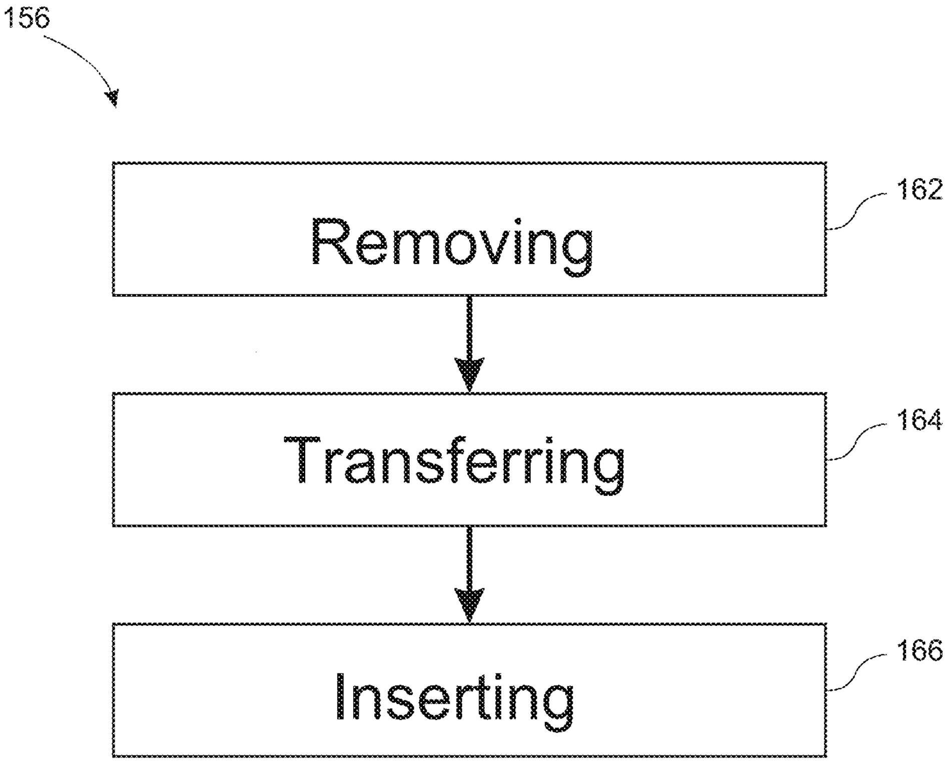
FIG. 43 is a detailed view of the unloading step of FIG. 42.

In FIG. 43, steps are shown that can be performed for removing 156 the containers 114.

In a first step 162 of the removing 156 of the containers 114, one or several containers 114, in particular a row of containers 114, are each removed from the receptacles 60 of the carrier plate 58 by means of the first handling device 32.

In a further step 164 of the removing 156 of the containers 114, the removed containers 114 are transferred to the container holder 38 by means of the first handling device 32.

In a further step 166 of the removing 156 of the containers 114, the transferred containers 114 are inserted into the container holder 38 by means of the first handling device 32. Thereby, the containers 114 are inserted into the receptacles 102 of the container holder 38. In the container holder 38, the containers 114 to be transported away can be collected.

Figure 44:
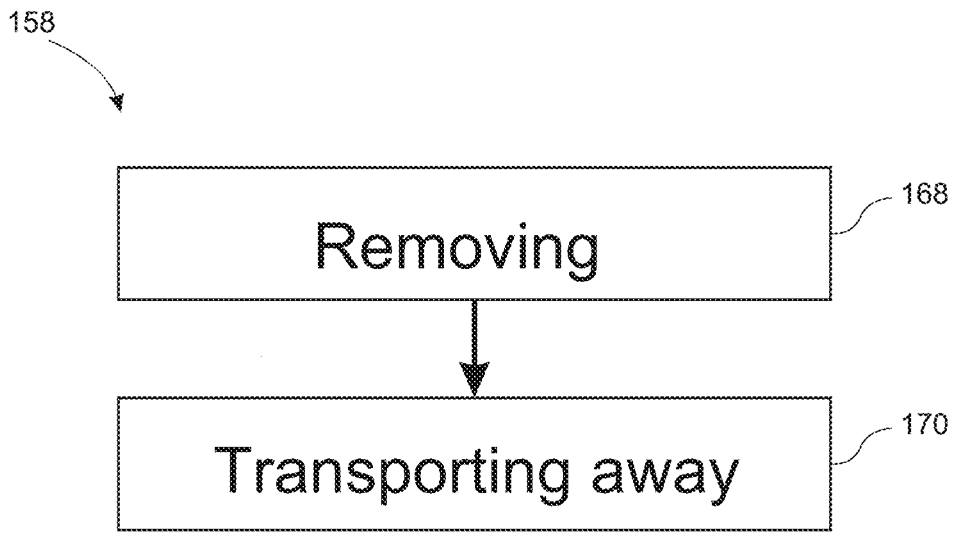
FIG. 44 is a detailed view of the removing step of FIG. 42.

In FIG. 44, steps are shown that can be performed for removing 158 the containers 114.

In a first step 168 of the removing 158 of the containers 114, the containers are removed from the container holder 38, in particular from the receptacles 102 of the container holder 38, by means of the transport device 26 or the transport device 28.

In a further step 170 of the removing 158 of the containers 114, the containers 114 are transported away by means of the transport device 26 or the transport device 28.

Figure 45:
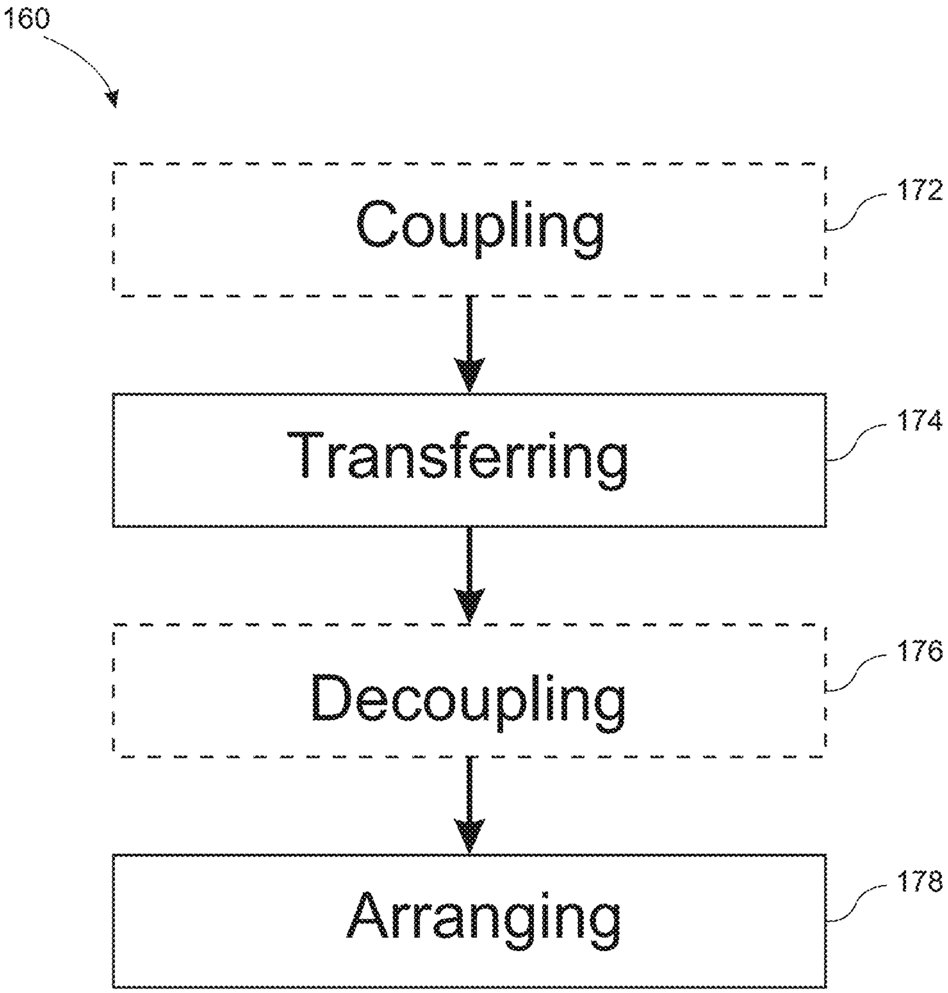
FIG. 45 is a detailed view of the storing step of FIG. 42.

In FIG. 45, steps are shown that can be performed for storing 160 the containers 114.

In a first optional step 172 of the storing 160 of the containers 114, the third handling device 36 is coupled with the carrier plate 58 arranged on the transfer plate 42.

In a further step 174 of the storing 160 of the containers 114, the carrier plate 58 is transferred by means of the third handling device 36 from the transfer plate 42 to the carrier plate holder 40.

In a further step 176 of the storing 160 of the containers 114, the third handling device 36 is decoupled from the transferred carrier plate 58.

In a further optional step 178 of the storing 160 of the containers 114, the transferred carrier plate 58 is arranged in the carrier plate holder 40, in particular in an empty receptacle 56 of the carrier plate holder 40.

In FIGS. 2 to 36, which illustrate the loading system 10 in different operating positions as previously explained in detail, carrier plates 58 with receptacles 60 are used, wherein the receptacles 60 are configured for receiving containers 114 of a particular container type. The receptacles 60 are all configured the same. The receptacles 60 have a cylindrical shape, wherein the cylindrical shape is adapted to the specific container type. In particular, a diameter of the receptacle substantially corresponds to the outer diameter of the containers 114. As a result, the cylindrical containers 114 can be held in the receptacle so that they abut the edge of the receptacle 60 over their full circumference.

The receptacles 60 are distributed at regular distances, in particular according to a regular pattern, on the first side surface 62. Each receptacle 60 is configured as a recess in the first side surface 62. Each receptacle 60 comprises the same distance to adjacent receptacles 60. The receptacles 60 are distributed in a pattern on the first side surface, wherein the pattern is configured such that the receptacles 60 are arranged adjacent to each other in three spatial directions, respectively, wherein the three spatial directions are arranged at an angle of 60° to each other. Alternatively, the receptacles 60 can each be arranged adjacent to each other in two spatial directions, wherein the spatial directions are arranged orthogonally to each other. In both patterns, the receptacles 60 are arranged in rows which extend in the respective spatial direction.

FIGS. 46 to 63 show a third embodiment of the loading system 10. The loading system 10 is illustrated in various operating positions in FIGS. 46 to 63. The loading system 10 of the third embodiment corresponds substantially to the loading systems 10 of the first and second embodiments of FIGS. 1 to 36. The same elements are identified by the same reference signs and are not explained in further detail.

The loading system 10 of the third embodiment differs in particular from the loading system 10 of the second embodiment in that the carrier plates, the carrier plate holder 40, the linear unit 48 of the second handling device 34, the receiving device 50 of the third handling device 36, and the transfer plate 42 are configured differently.

The carrier plates of the third embodiment are identified by the reference sign 200. The carrier plates 200 of the third embodiment correspond substantially to the carrier plates 58 of the second embodiment. The carrier plates 200 differ from the carrier plates 58 of the second embodiment in the shape of the base surface and in the arrangement and configuration of the coupling portions.

The carrier plates 200 substantially have a square base surface. In other words, the side surfaces 62, 64 each have a square shape. The rows of receptacles 60 are arranged in the width direction on the first side surface 62 one after the other. Each row extends in the length direction of the carrier plate 200.

The receptacles 56 of the carrier plate holder 40 of the third embodiment of the loading system 10 compared to the receptacles 56 of the second embodiment of the loading system 10 are adapted to the changed square shape of the carrier plates. In particular, instead of one wide receptacle 56, two narrow receptacles 56 are arranged next to each other, respectively.

The carrier plates 200 comprise substantially the same width as the carrier plates 58. Due to the square shape, however, the carrier plates 200 are only half as long as the carrier plates 58. As a result, in the carrier plate holder 40 two carrier plates 200 each can be arranged next to each other. Furthermore, also on the transfer surface 44 and on the placement surface 54, two carrier plates 200 can be arranged next to each other perpendicular to the insertion direction due to the halved space requirement.

Furthermore, the carrier plates 200 of the third embodiment of the loading system 10 as compared to the carrier plates 58 of the second embodiment of the loading system 10 are arranged oppositely in the receptacles 56, on the transfer surface 44 and on the placement surface 54, respectively. This means that the carrier plates 200 are oriented such that the first and second edge sides 70, 72 are reversed in contrast to the arrangement in FIGS. 2 through 36. The carrier plates 200 are arranged in the receptacles 56 such that the second edge side 72 is oriented upwardly and the first edge side 70 is oriented downwardly. On the transfer surface 44, the carrier plates 200 are arranged such that the second edge side 72 is arranged on the side facing away from the freeze dryer 16 and the first edge side 70 is arranged on the side facing the freeze dryer 16. On the placement surface 54, the carrier plates 200 are arranged such that the second edge side 72 is arranged on the side facing the transfer plate 42 and the first edge side 70 is arranged on the side facing away from the transfer plate 42. With respect to the insertion direction into the freeze dryer 16, the first edge side 70 is thus arranged downstream and the second edge side 72 is arranged upstream.

The carrier plates 200 of the loading system 10 of the third embodiment are couplable with each other by means of the first and second coupling portions 66, 68. In particular, the coupling portions 66, 68 in the loading system 10 of the third embodiment are configured substantially the same as the coupling portions 66, 68 in the loading system 10 of the second embodiment. The coupling portions 66, 68 in the loading system 10 of the third embodiment differ from the coupling portions 66, 68 in the loading system 10 of the second embodiment in that the locking member 78 is biased into the uncoupling state by means of spring force of a spring member, for example a spiral spring, or by means of gravity. The biasing by means of gravity is achieved, for example, in that the center of gravity of the locking member 78 lies with respect to the rotational axis on the side opposite to the hook portion.

Furthermore, the locking member 78 is configured so as to be arranged in the coupling state when the second coupling portion 68 is arranged on a surface, in particular the placement surface 54. In particular, the locking member 78 is configured such that it is displaced from the uncoupling state to the coupling state when the second coupling portion 68 is pushed onto a surface, in particular the placement surface 54. Correspondingly, the locking member 78 is also configured such that it is displaced from the coupling state to the uncoupling state when the second coupling portion 68 is pulled off a surface, in particular the placement surface 54. For this purpose, the locking member 78 can comprise, for example, on the side which is arranged opposite to the hook portion with respect to the rotational axis, a flank which is arranged on the bottom side of the locking member 78. During the pushing of the carrier plate 200 onto a surface, this flank comes into contact with the edge of the surface once the second coupling portion 68 has reached the edge. When the carrier plate is pushed further, the locking member 78 is displaced from the uncoupling state to the coupling state by the force exerted via the flank in a direction of rotation opposite to the biasing force. Correspondingly, the locking member 78 is again displaced from the coupling state to the uncoupling state by the biasing force as soon as the locking member 78 is no longer in contact with the surface when the carrier plate 200 is pulled off the surface.

The carrier plates 200 comprise two third coupling portions 202, 204 in addition to the first and second coupling portions 66, 68. The third coupling portions 202, 204 are arranged on the second edge side 72. The third coupling portions 202, 204 are arranged in the length direction on both sides of the second coupling portion 68. The third coupling portions 202, 204 comprise the same distance with respect to the longitudinal direction to the second coupling portion 68, in particular to a center of the second edge side 72. In other words, the third coupling portions 202, 204 are arranged symmetrically to the second coupling portion 68, in particular to a center of the second edge side 72. The third coupling portions 202, 204 are configured the same as the first coupling portion 66. For this purpose, each third coupling portion 202, 204 comprises a holding member 214 and a recess 216. The holding member 214 is configured as a web, in particular as a bar, which extends in the length direction of the carrier plate 200 from one side of the recess 216 to an opposite side of the recess 216. The web is preferably arranged parallel to the first and the second side surfaces 62, 64 and parallel to the first and the second edge sides 70, 72. The web is preferably arranged at an outer end of the recess 216.

The third coupling portions 202, 204 and the receiving device 50 are configured such that they are couplable with each other. For this purpose, the receiving device 50 comprises two receiving members 206, 208. The receiving members 206, 208 have the same distance from each other as the two third coupling portions 202, 204. The receiving members 206, 208 can each couple with a corresponding third coupling portion 202, 204 to move the carrier plate 200.

Each receiving member 206, 208 comprises an upper coupling portion 210 and a lower coupling portion 212. The upper coupling portion 210 is arranged on a top side of the corresponding receiving member 206, 208 in the operating state. The lower coupling portion 212 is arranged on a bottom side of the corresponding receiving member 206, 208 in the operating state. The upper and lower coupling portions 210, 212 are each configured hook-shaped. In other words, each receiving member 206, 208 comprises a hook-shaped receptacle in the area of each coupling portion 210, 212. In the operating state, the hook-shaped receptacle of each upper coupling portion 210 is upwardly open and the hook-shaped receptacle of each lower coupling portion 212 is downwardly open.

For coupling with the third coupling portions 202, 204 of a carrier plate 200, the hook-shaped receptacles of the upper coupling portions 210 can each receive a holding member 214 of the third coupling portions 202, 204 of the carrier plate 58. By means of this coupling, the carrier plate 200 can be moved vertically, in particular lifted and lowered, as well as moved or transferred horizontally. When the carrier plate 200 is fully lifted, the side surfaces 62, 64 of the carrier plate 200 are vertically oriented and the first and second edge sides 70, 72 are correspondingly horizontally oriented, wherein the second edge side 72 is oriented at the top and the first edge side 70 is oriented at the bottom.

For coupling with the third coupling portions 202, 204 of a carrier plate 200, furthermore, the hook-shaped receptacles of the lower coupling portions 212 can also each receive a holding member 214 of the third coupling portions 202, 204 of the carrier plate 58. By means of this coupling, the carrier plate 200 can be moved horizontally, in particular pulled and pushed, when the carrier plate 200 rests on a surface, in particular on the transfer surface 44 or on one of the placement surfaces 54, in the operating state.

The linear unit 48 can move, in particular push and pull, at least two carrier plates 200 horizontally at the same time. As previously described, two carrier plates 200 can be arranged next to each other on the transfer plate 42 and on the placement plate 52 perpendicular to the insertion direction. The linear unit 48 can push two carrier plates 200 arranged next to each other in the insertion direction from the transfer plate 42 onto one of the placement plates 52, and correspondingly pull them back from the placement plate 52 onto the transfer plate 42 against the insertion direction. For this purpose, the linear unit 48 comprises a pushing member 218. The linear unit 48 is configured to move the pushing member 218 back and forth in a, preferably horizontal, direction. The pushing member 218 comprises a rod that extends in the insertion direction, and pushing part that extends perpendicular to the insertion direction. One end of the rod is arranged centrally at the pushing part. As a result, the pushing member is configured T-shaped. The pushing member 218 is coupled with a base body of the linear unit 48, wherein the pushing member 218 is movable relative to the base body. Thereby, the pushing member 218 can be extended in the direction of the freeze dryer 16, that is, in the insertion direction, or retracted in the opposite direction. Thereby, the pushing member 218 is displaceable between a retracted state and an extended state. In other words, the pushing member 218 can push and pull the carrier plates 200 by means of this movement.

The pushing member 218 comprises four coupling portions 220. Each coupling portion 220 is arranged on the bottom side of the pushing member 218. Each coupling portion 220 is configured, for example, as a protrusion that extends downward from the bottom side of the pushing member 218. The coupling portions 220 are couplable with third coupling portions of the carrier plates 200. For coupling with a third coupling portion, the protrusion of a coupling portion 220 engages the recess 216 of the respective third coupling portion 202, 204. In other words, for coupling, the protrusion is brought into engagement with the recess 216, and for decoupling, the protrusion is brought out of engagement again. The coupling portions 220 comprise the same distance from each other as the third coupling portions 202, 204 of two carrier plates 200 arranged next to each other perpendicular to the insertion direction.

For moving two carrier plates 200 arranged next to each other, the pushing member 218 can be moved to the second edge side 72 of the two carrier plates 200. Then, the pushing member 218 is coupled with the two carrier plates 200 to be able to move the carrier plates 200 horizontally. For this purpose, the pushing member 218 is moved such that the coupling portions 220 couple with the third coupling portions 202, 204 of the two carrier plates 200. In this way, the two carrier plates 200 can be pulled and pushed.

For moving two carrier plates 200 arranged next to each other, the pushing member 218 can be moved to the second edge side 72 of the two carrier plates 200. Then, the pushing member 218 is coupled with the two carrier plates 200 to be able to move the carrier plates 200 horizontally. For this purpose, the pushing member 218 is moved such that the coupling portions 220 couple with the third coupling portions 202, 204 of the two carrier plates 200. In this way, the two carrier plates 200 can be pulled and pushed.

Furthermore, the transfer plate 42 of the loading system 10 of the third embodiment corresponds substantially to the transfer plate 42 of the loading system 10 of the second embodiment. These transfer plates 42 differ in the configuration of the recess 112. The recess 112 of the charging system of the third embodiment also extends from the bottom side to the top side of the transfer plate. However, the recess has a T-shaped cross-section. The recess 112 is configured such that the linear unit 48 can be moved vertically through the recess 112 when the pushing member 218 is in the retracted position. In other words, the recess 112 is adapted to the shape that the linear unit 48 has in the retracted position of the pushing member 218.

The sequence of the individual operating states of the charging system 10 of the third embodiment corresponds substantially to the sequence of the operating states of the charging system 10 of the second embodiment.

In FIG. 46, the initial and final states are thereby illustrated, in which all carrier plates 200 are arranged in the carrier plate holder 40. Prior to the start of a freeze-drying cycle, H2O2 decontamination of the freeze-drying module 14 is again performed in the initial state. After the freeze-drying cycle, a washing cycle can again be performed in the final state.

At the beginning of the freeze-drying cycle, carrier plates are again transferred from the carrier plate holder 40 into the freeze dryer. For this purpose, the carrier plates 200 are first transferred to the transfer plate 42 and then pushed from there onto a placement plate 52 of the freeze dryer 16.

Figure 49A:
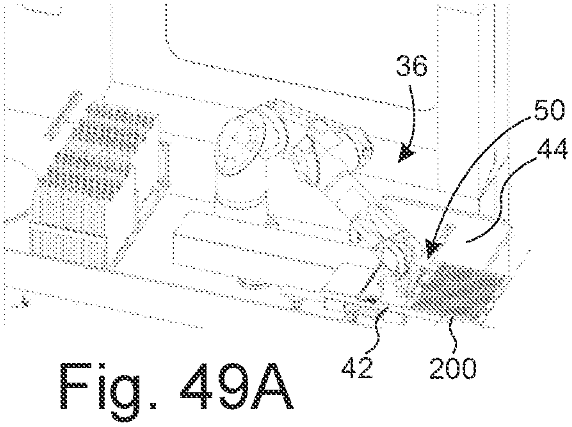
Figure 49B:
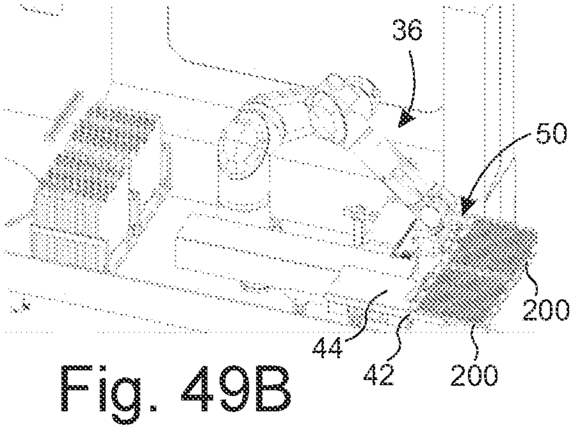
Figure 49C:
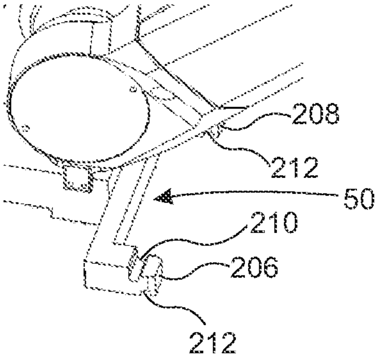

For transferring, by means of the third handling device 50, two carrier plates 200 are always removed one after the other from the carrier plate holder 40, transferred to the transfer plate 42, placed on it perpendicular to the insertion direction side by side, and positioned correspondingly on the transfer plate 42 for further handling. This is illustrated in FIGS. 47(A) to (D), 48(A) to (C) and 49(A) and (B). For transferring, the upper coupling portions 210 are thereby coupled with the third coupling portions 202, 204 of the carrier plate 200 to be transferred prior to the removing and decoupled after the placing. Then, the transferred carrier plate 200 is positioned such that the linear unit 48 can be moved through the recess by means of the stroke unit 106. For this purpose, the carrier plate 200 is pushed so far in the insertion direction until the third coupling portions 202, 204 are at least no longer arranged above the recess 112. For pushing the carrier plate 200, the lower coupling portions 212 are thereby coupled with the third coupling portions 202, 204 of the carrier plate 200 to be positioned and decoupled again after pushing. In this way, two carrier plates 200 are always arranged next to each other on the transfer plate 42 and at least partially pushed into the freeze dryer 16. The configuration of the lower coupling portions 212 is illustrated in FIG. 49(C).

Figure 50A:
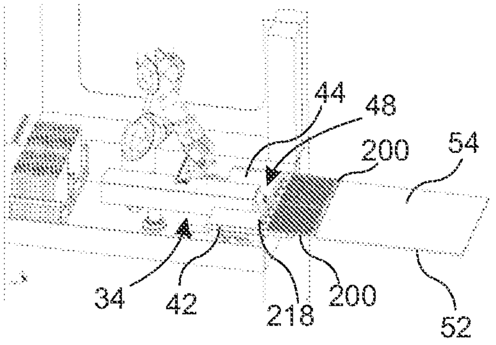
Figure 50B:
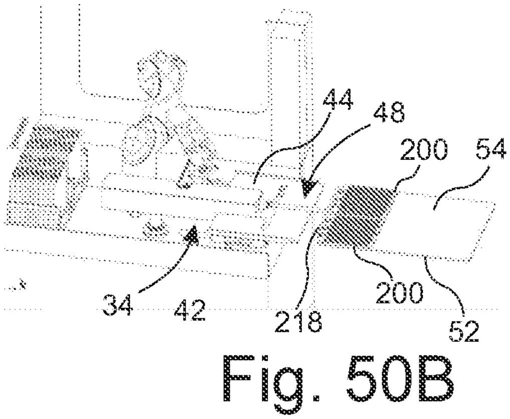
Figure 50C:
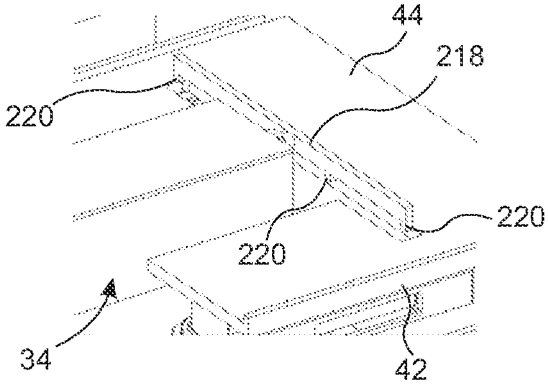

Then, the two carrier plates 200 arranged on the transfer plate 42 are pushed together in the insertion direction onto one of the placement plates 52. For this purpose, the linear unit 48, which is previously arranged below the transfer plate 42, is moved through the recess 112 of the transfer plate 42 in order to arrange the linear unit above the transfer plate 42, in particular at the level of the two carrier plates 200. The linear unit 48 is thereby arranged such that the pushing member 21 lies against both carrier plates 200. In particular, two coupling portions 220 of the pushing member 218, in particular the protrusions of the coupling portions 220, thereby each lie against a respective one of the two carrier plates 200 on the respective second edge side 72. In particular, these protrusions lie against the outer side of a corresponding holding member 214 of the third coupling portions 202, 204. Due to displacement of the pushing member 218 in the insertion direction, the two carrier plates 200 are then pushed together into the freeze dryer 16 onto the corresponding placement surface 54. This is illustrated in FIGS. 50(A) and (B). In FIG. 50(C), the configuration of the pushing member 218 is illustrated.

Figure 51A:
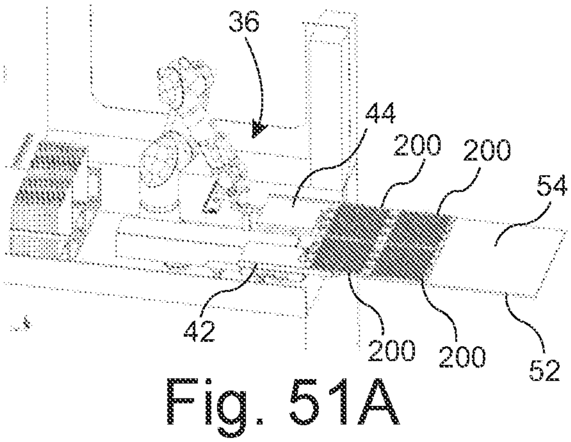
Figure 51B:
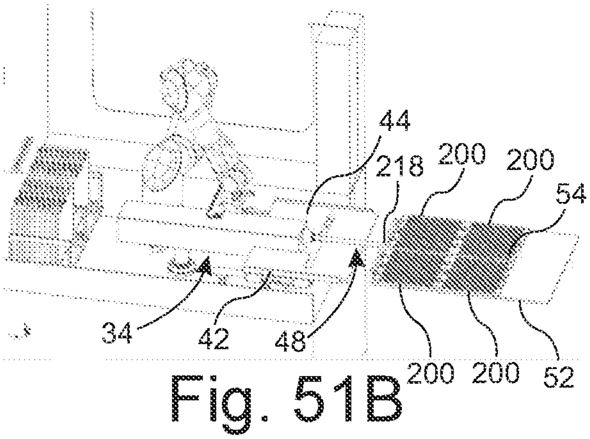
Figure 51C:
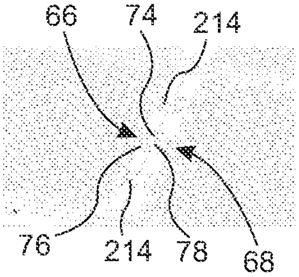

In this way, four further carrier plates 200 are removed from the carrier plate holder 40 and pushed onto the same placement surface 54 of the freeze dryer 16, so that six carrier plates 200 are arranged on the placement surface 54 of the freeze dryer 16. The carrier plates 200 are arranged such that three carrier plates 200 are each arranged one after the other in the insertion direction, and two carrier plates 200 are each arranged next to each other perpendicular to the insertion direction. The carrier plates 200 that are arranged one after the other in the insertion direction are coupled with each other. The coupling of the carrier plates 200 by means of the corresponding first and second coupling portions 66, 68 is performed automatically during the inserting. This is illustrated in FIG. 51(A) to (C). The coupling is performed by means of the hooking mechanism that is actuated by flank actuation.

Figure 52:
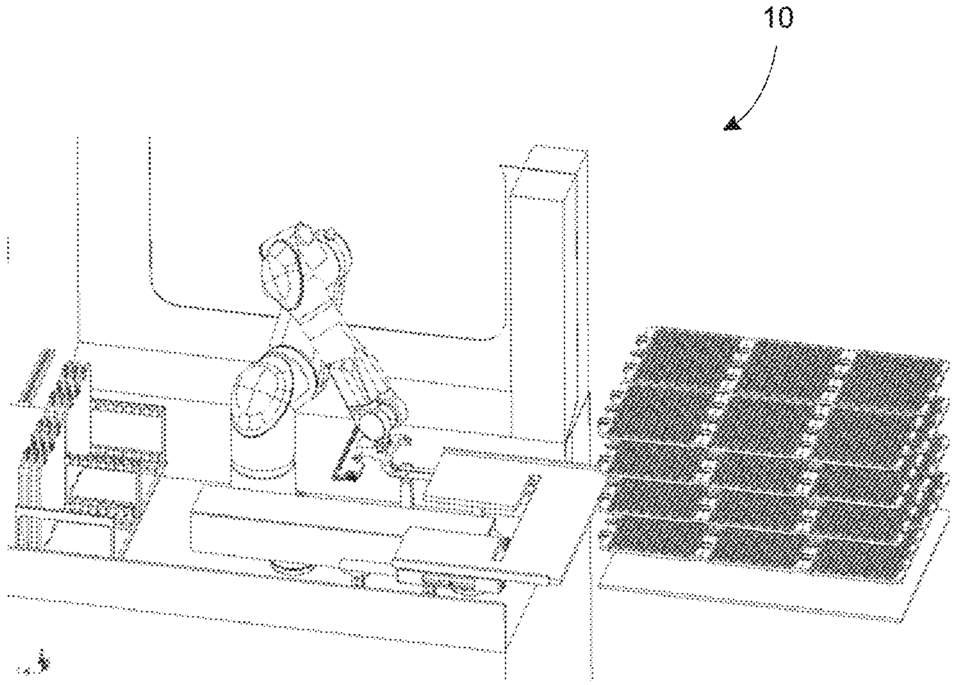
Figure 53A:
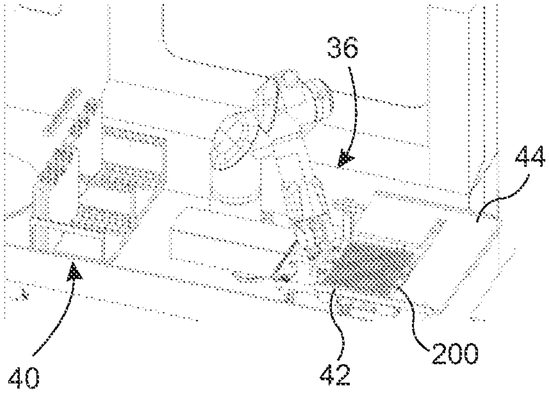
Figure 53B:
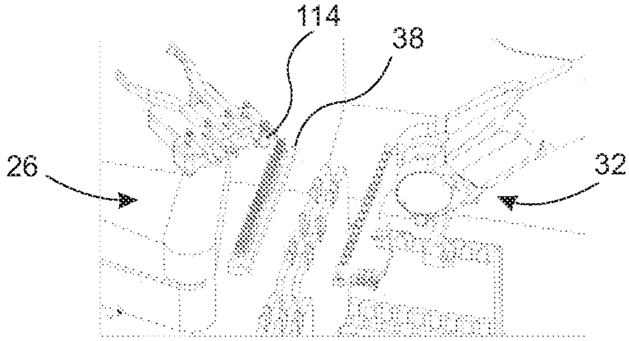
Figure 53C:
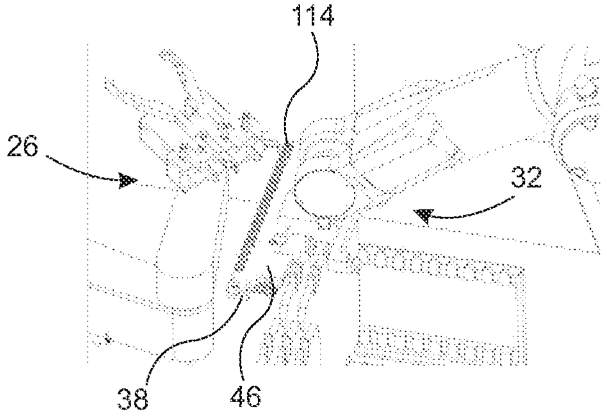
Figure 54A:
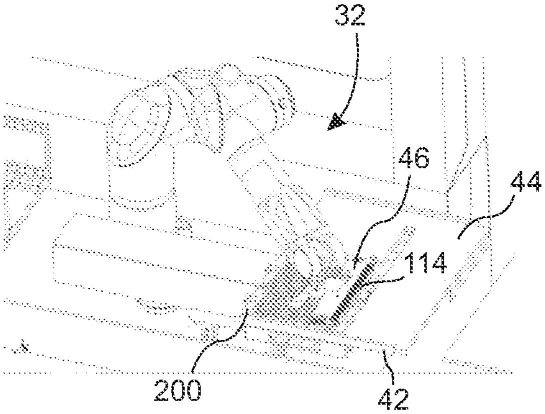
Figure 54B:
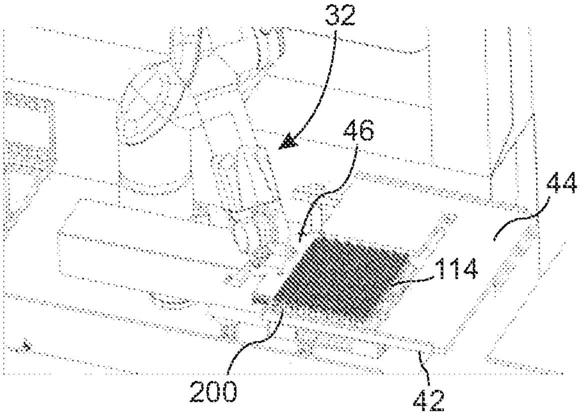
Figure 54C:
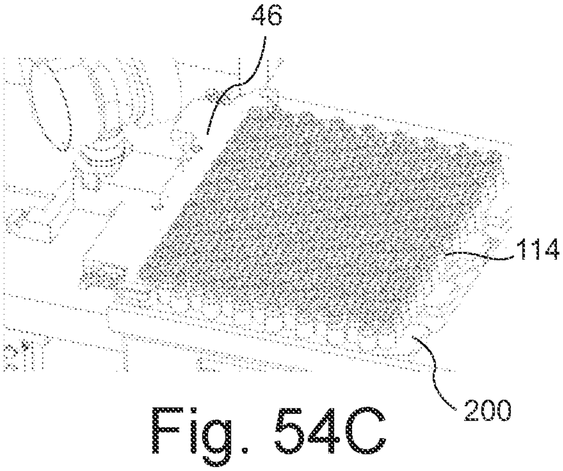

Corresponding to the procedure described in FIGS. 47 to 51, all placement surfaces 54 of the freeze dryer 16 except one are loaded with six carrier plates 200 each. In other words, as many carrier plates 200 are inserted into the freeze dryer until only six carrier plates 200 are still arranged in the carrier plate holder 40. This state is illustrated in FIG. 52.

Figure 55A:
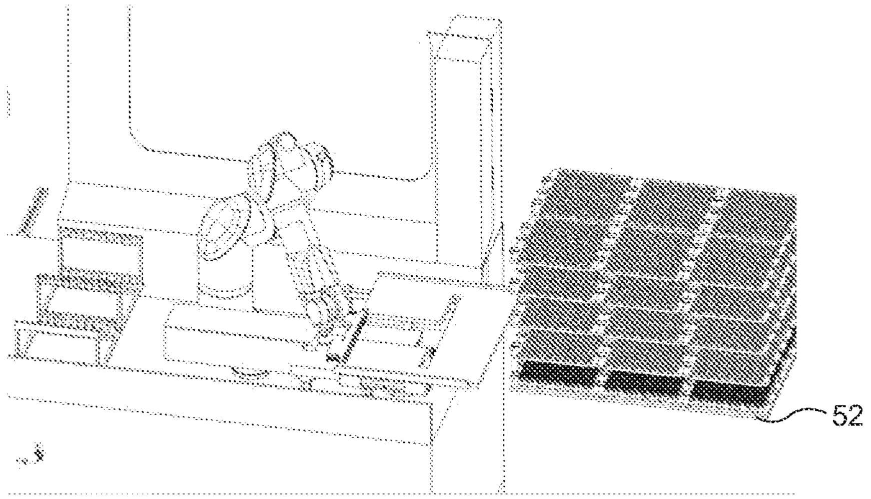

These six carrier plates 200 are then transferred one after the other corresponding to FIGS. 47 and 48 from the carrier plate holder 40 to the transfer plate 42, arranged on the transfer plate 42, and equipped with containers 114. This is illustrated in FIGS. 53(A) to (C) and 54(A) to (C). As soon as two carrier plates 200 are each equipped with containers 114, these carrier plates 200 are pushed together from the transfer plate 42 onto the placement plate 52 by means of the second handling device 34. The inserting of the equipped carrier plates 200 is performed corresponding to the inserting of empty carrier plates 200, as illustrated in FIGS. 49 to 51. In this way, six carrier plates 200 are removed from the carrier plate holder 40, equipped with containers 114 on the transfer plate 42 and pushed into the freeze dryer 16. This state is illustrated in FIG. 55(A).

Figure 55B:
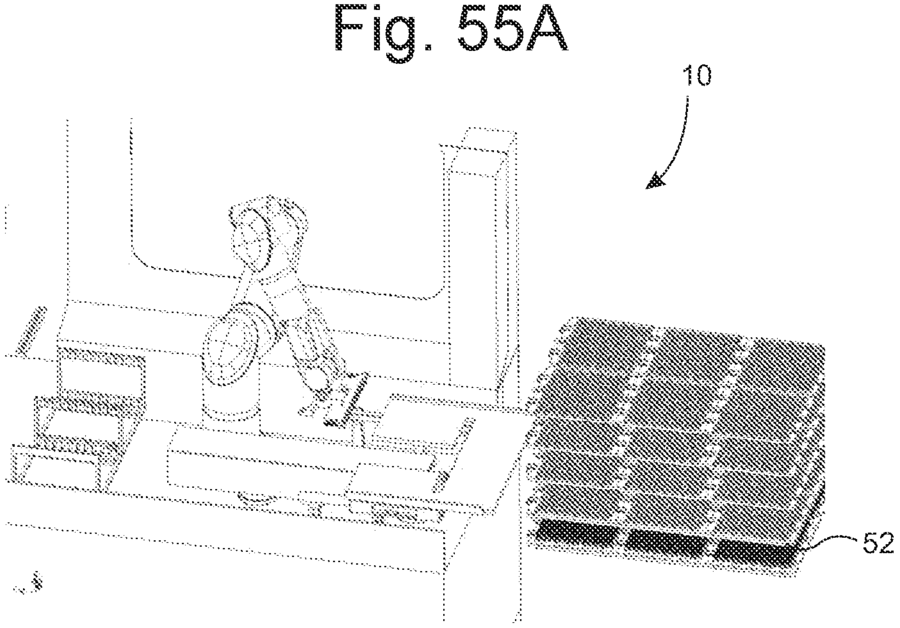

Then, the placement plates 52 of the freeze dryer are displaced vertically so that a placement plate 52 having empty carrier plates 200 is arranged in one plane with the transfer plate 42. This is illustrated in FIG. 55(B).

Then, the six empty carrier plates 200 that are arranged on this placement plate 52 are removed from the freeze dryer 16, and five of the six removed carrier plates 200 are then arranged in the carrier plate holder 40, wherein the sixth carrier plate 200 remains on the transfer plate 42 after the removing.

Figure 56A:
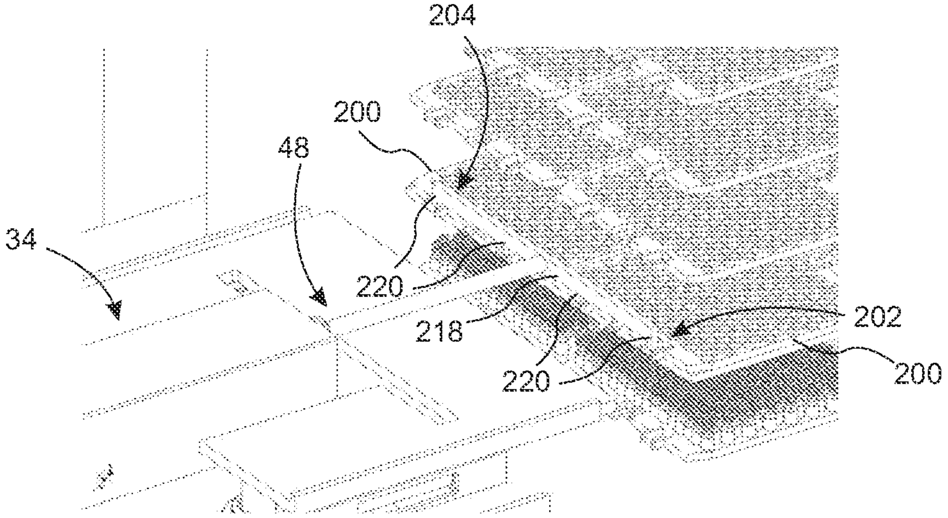
Figure 56B:
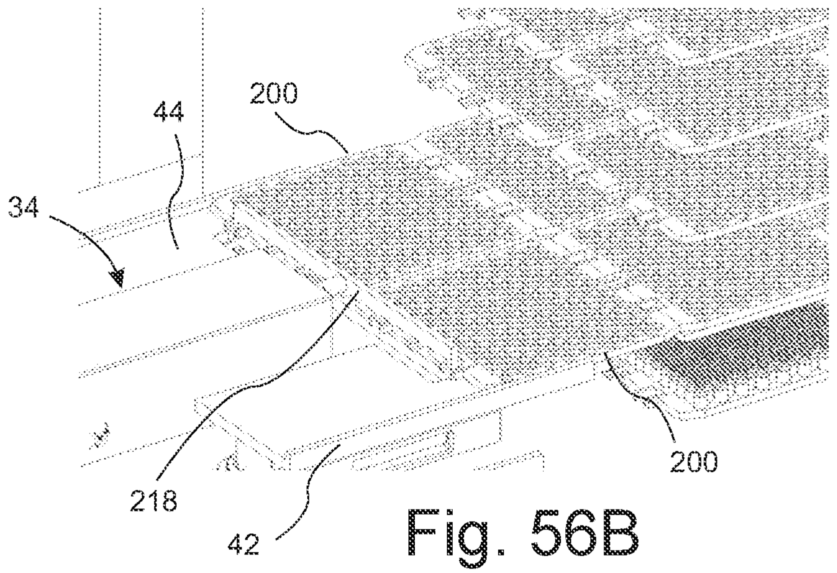
Figure 57A:
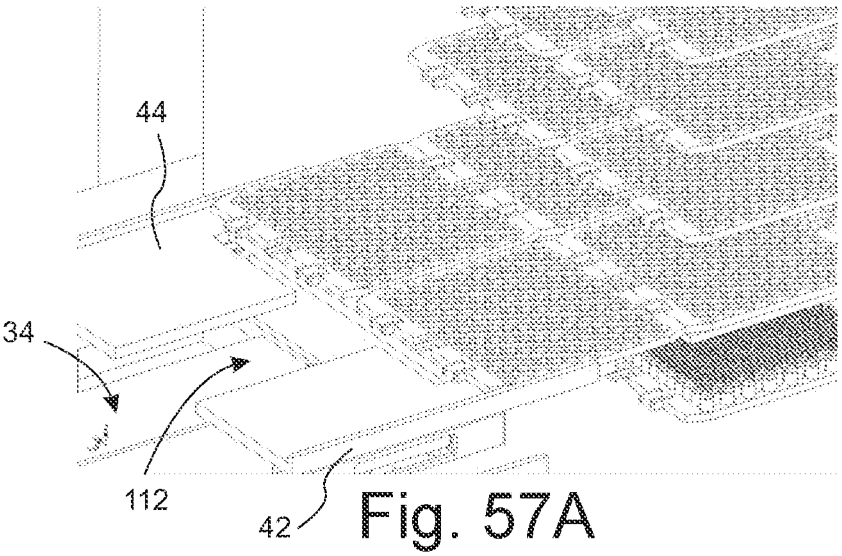
Figure 57B:
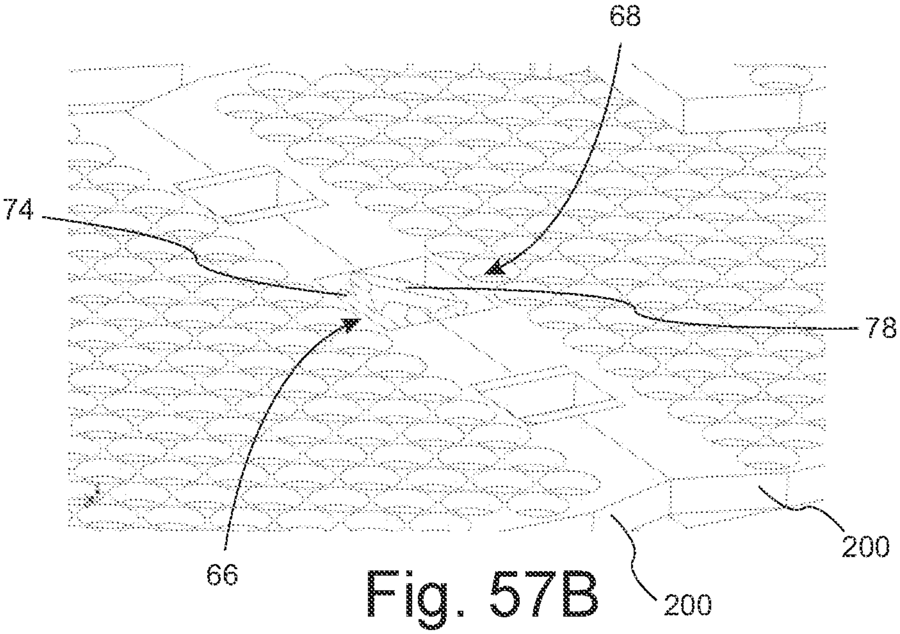

For this purpose, the carrier plates 200 are pulled in pairs one after the other against the insertion direction from the placement surface 54 onto the transfer plate 42 by means of the second handling device 34. This is illustrated in FIGS. 56(A) and (B). As previously described, each of the front carrier plates 200 is coupled with one of the middle carrier plates 200 via the corresponding coupling portions 66, 68, and each of the middle carrier plates 200 is coupled with one of the rear carrier plates 200 via the corresponding coupling portions 66, 68. For pulling out, the coupling portions 220 of the pushing member 218 of the linear unit 48 of the second handling device 34 are coupled with the corresponding third coupling portions 202, 204 of the two carrier plates 200 to be pulled out. The carrier plates 200 are then pulled out by means of the second handling device 34 so far that the second coupling portions 68 of the following carrier plates 200 are no longer arranged on the placement surface 54, so that the carrier plates 200 to be pulled out are automatically decoupled from the following carrier plates 200. Thereafter, the linear unit 48 is moved vertically downward by means of the stroke unit 106 so that the linear unit 48 is arranged below the transfer plate 42. This is illustrated in FIGS. 57(A) and (B).

Figure 58A:
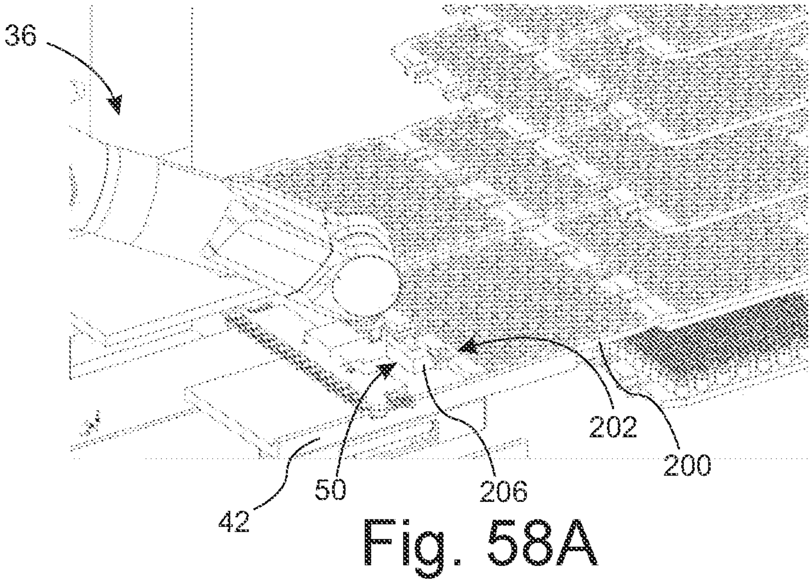
Figure 58B:
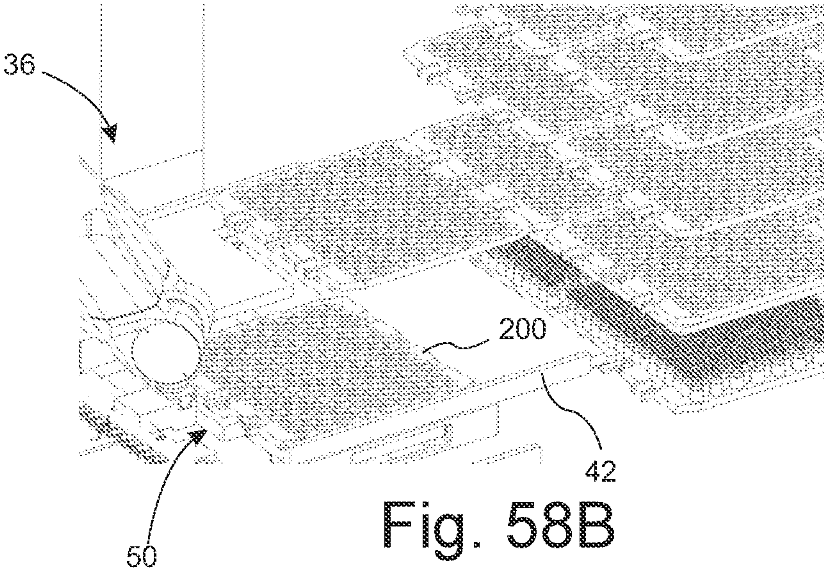
Figure 59A:
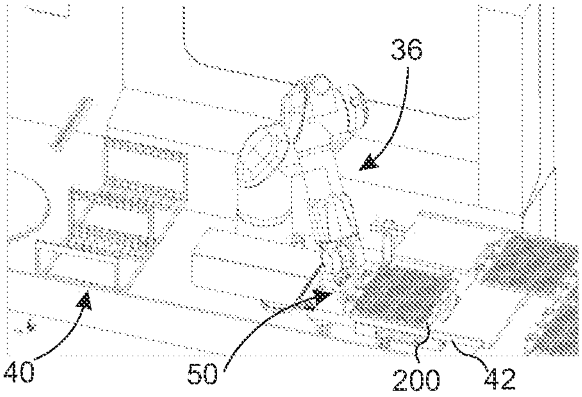
Figure 59B:
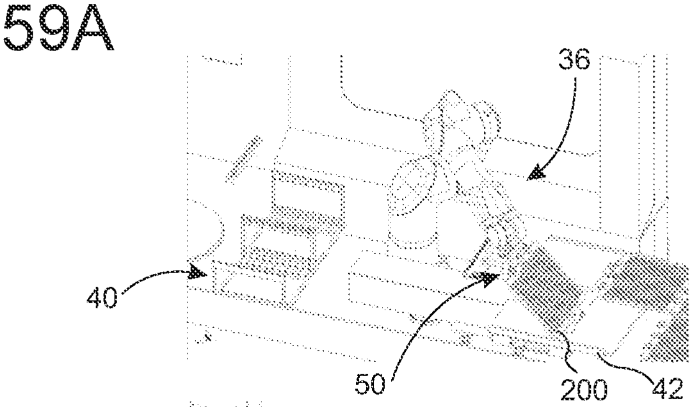
Figure 59C:
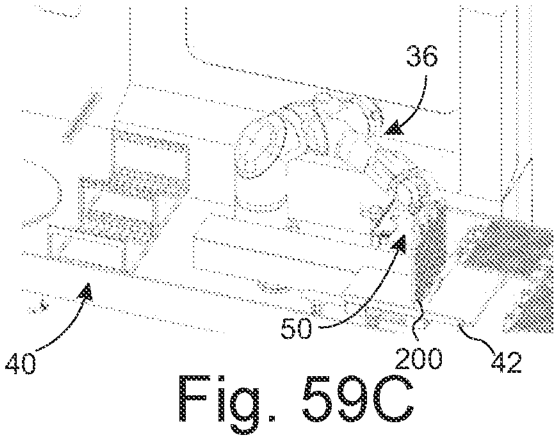
Figure 60A:
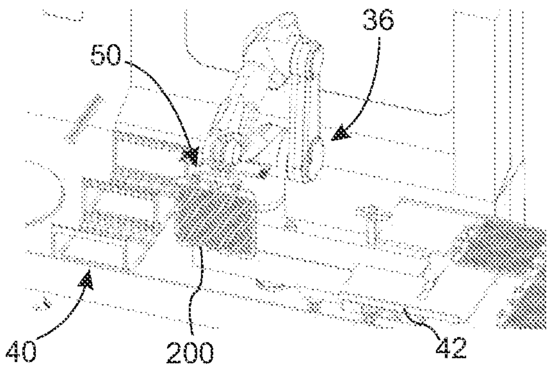
Figure 60B:
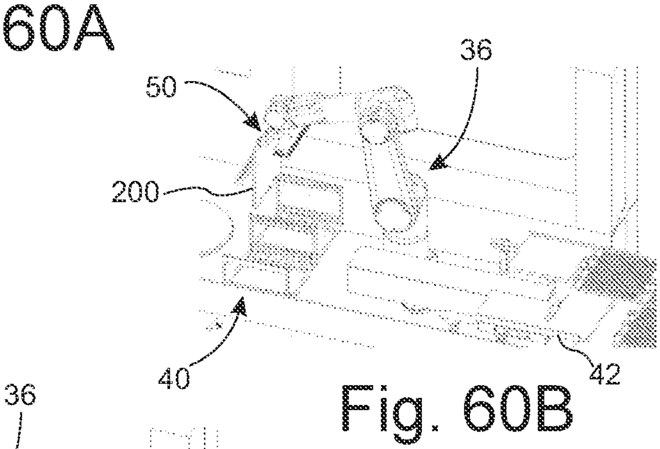
Figure 60C:
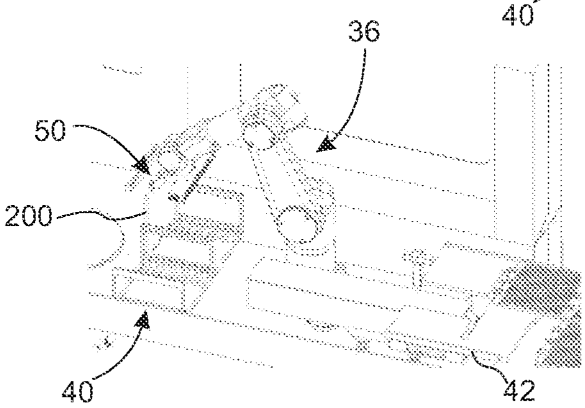

Then, the two pulled-out carrier plates 200 are pulled further onto the transfer plate 42 by means of the third handling device 36, one after the other against the insertion direction, and transferred to the carrier plate holder 40. For this purpose, the lower coupling portions 212 of the receiving device 50 are first coupled with the third coupling portions 202, 204 of the carrier plate 200 to further pull the carrier plate. The carrier plates 200 are thereby pulled onto the transfer plate so far until the third coupling portions 202, 204 project over the edge on the side of the transfer plate 42 facing away from the freeze dryer 16. This is illustrated in FIGS. 58(A) and (B). Then, by means of the third handling device 36, the carrier plate 200 is transferred from the transfer plate 42 to the carrier plate holder 40 and arranged therein. For transferring, the upper coupling portions 210 are coupled with the third coupling portions 202, 204 of the carrier plate 200. This is illustrated in FIGS. 59(A) to (C) and 60(A) to (C).

Figure 61:
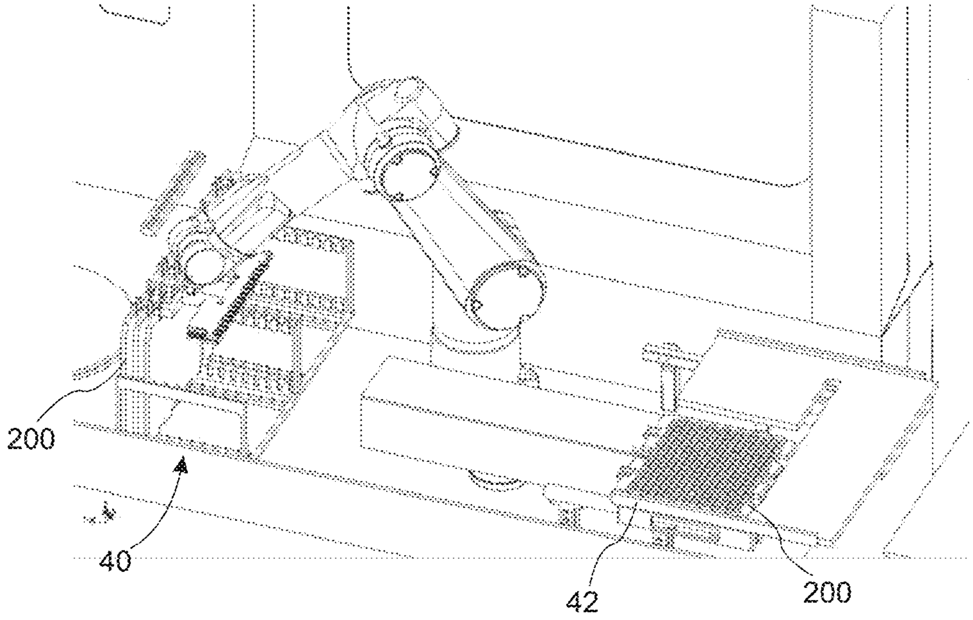

Corresponding to FIGS. 56 to 60, five of the six carrier plates 200 are arranged in the carrier plate holder 40. The sixth carrier plate 200 remains on the transfer plate 42, as illustrated in FIG. 61. Thereby, the carrier plate 200 is again arranged such that the third coupling portions 202, 204 project over the edge of the transfer plate 42 on the side facing away from the freeze dryer 16.

Corresponding to FIGS. 53 to 61, all placement plates 52 carrying empty carrier plates 200 are displaced one after the other to the level of the transfer plate 42, wherein the empty carrier plates 200 are then removed from this placement plate 52, equipped with containers 114 and pushed back onto the placement plate 52. In this way, all carrier plates 200 are equipped with containers 114 and inserted into the freeze dryer 16.

Figure 62A:
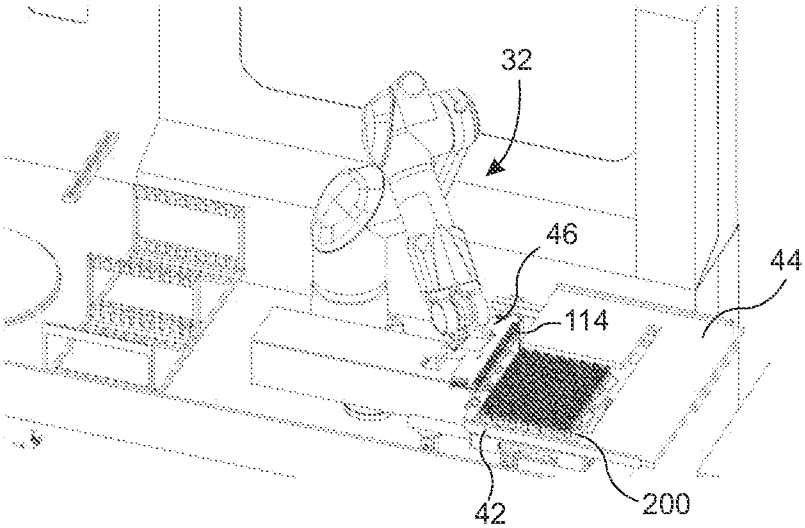
Figure 62B:
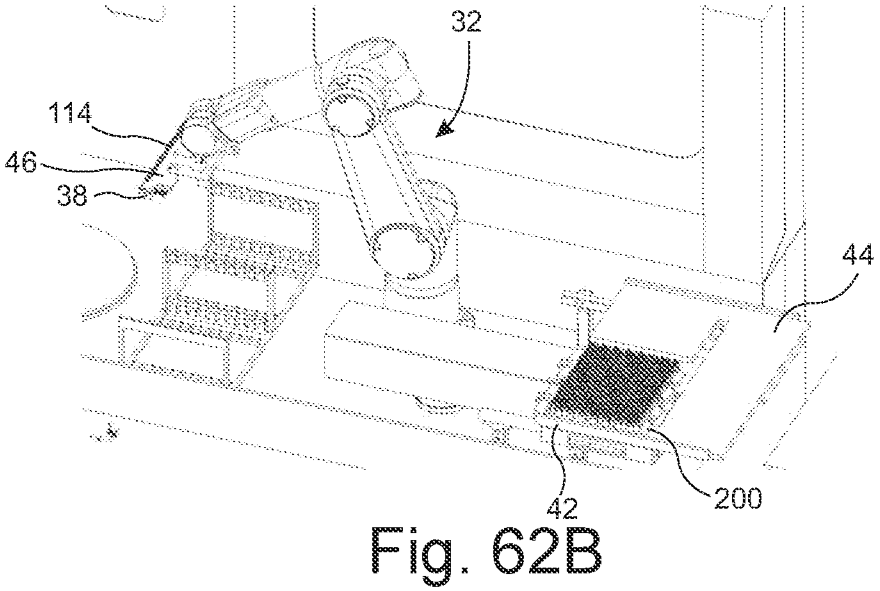

After the freeze-drying, the containers 114 can then be correspondingly removed from the freeze dryer 16 and discharged again. For this purpose, the carrier plates 200 are again pulled one after the other from the placement surfaces 54 onto the transfer plate 42 by means of the second handling device 34. Then, there the containers 114 are removed by means of the first handling device 32 and transferred to the container holder 38. This is illustrated in FIGS. 62(A) and (B).

Figure 63A:
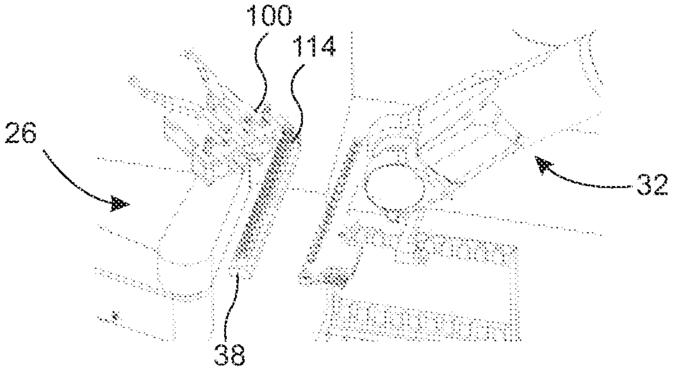
Figure 63B:
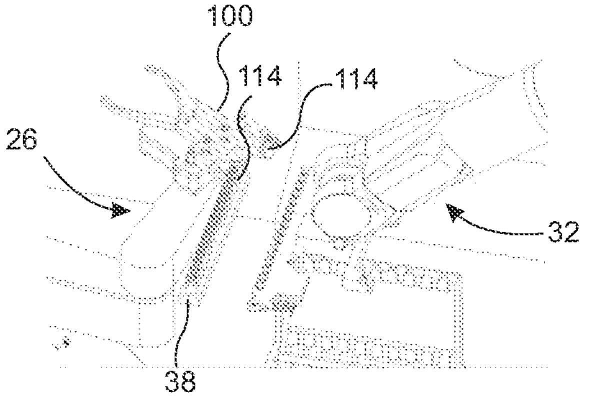
Figure 63C:
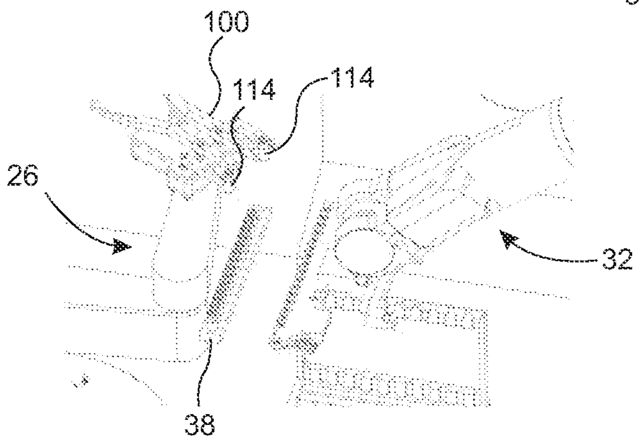

Then, the containers 114 are removed from the container holder 38 by means of the transport device 26 and transported away. This is illustrated in FIGS. 63(A) to (C). For this purpose, the gripping tool 100 grips two containers 114 each and transports them away. The gripping tool can receive the two containers 114 one after the other. Subsequently, the transport device 26 can transfer the containers 114 to the crimping module 20.

Each emptied carrier plate 200 is then transferred to the carrier plate holder 40 by means of the third handling device 36 and arranged in one of the receptacles 56. In this way, all carrier plates 200 are emptied and subsequently transferred back to the carrier plate holder 40.

After all of the carrier plates 200 are emptied and arranged in the carrier plate holder 40, a wash cycle can again be performed by cleaning the carrier plates 200, for example, by means of a sprinkler system.

FIG. 64(A) shows a first embodiment of a carrier plate 300. The carrier plate 300 essentially corresponds to the carrier plate 58 of FIGS. 2 to 36. The same elements are identified by the same reference signs and are not explained in further detail. The carrier plate 300 differs from the carrier plate 58 in that on the first side surface 62 two different types of receptacles 302, 304 are arranged.

The carrier plate 300 comprises on the first side surface 62 first receptacles 302 and second receptacles 304. The first receptacles 302 are configured for receiving first containers of a first container type. The second receptacles 304 are configured for receiving second containers of a second container type, wherein the first container type and the second container type are different. The first and second receptacles 302, 304 have a cylindrical shape. The diameter of the first receptacles 302 corresponds substantially to the diameter of the first containers of the first container type. The diameter of the second receptacles 304 corresponds substantially to the diameter of the second containers of the second container type. As a result, a diameter of the first and second receptacles 302, 304 substantially corresponds to the diameter of the respective container type. In other words, the diameters of the first and second receptacles 302, 304 are configured such that the corresponding containers of the first and second container types can be arranged in the respective receptacle with substantially no play. In the selection of the diameters, tolerances can be accounted for. For example, the diameter of the receptacles can be 10 μm to 1 mm larger than the diameter of the containers of the corresponding container type to account for manufacturing tolerances.

The diameter of the first receptacles 302 is smaller than a diameter of the second receptacles 304. Correspondingly, the diameter of the second containers is larger than a diameter of the first containers. For example, the first container type can be 2R or 4R and the second container type can be 6R or 8R. Alternatively, the first container type can be 6R or 8R and the second container type can be 10R or 15R. Alternatively, the first container type can be 10R or 15R and the second container type can be 20R, 25R, or 30R.

The first receptacles 302 and the second receptacles 304 are distributed at regular distances, in particular according to a regular pattern, on the first side surface. The first and second receptacles 302, 304 are each arranged in rows. Each row of second receptacles 304 is followed by two rows of first receptacles 302. Preferably, two successive rows of first receptacles 302 comprise an offset from each other that corresponds to half the distance between two adjacent first receptacles 302. Furthermore, two successive rows of second receptacles 304 also comprise an offset from each other that corresponds to half the distance between two adjacent second receptacles 304.

Each first receptacle 302 comprises the same distance to adjacent first receptacles 302. Each second receptacle 304 comprises the same distance from adjacent second receptacles 304. The first and second receptacles 302, 304 are distributed in a pattern on the first side surface, wherein the pattern is configured such that the first receptacles 302 and the second receptacles 304 are arranged adjacent each other in three spatial directions, respectively, wherein the three spatial directions are arranged at an angle of 60° with respect to each other. Alternatively, the first receptacles 302 or the second receptacles 304 can each be arranged adjacent to each other in two spatial directions, wherein the spatial directions are arranged orthogonally to each other. In both patterns, the receptacles 302 and 304 are each arranged in rows which extend in the respective spatial direction.

A distance between adjacent first receptacles 302 is half as great as a distance between adjacent second receptacles 304. As a result, the distribution ratio of the first receptacles 302 to the second receptacles 304 is four to one.

A second receptacle 304 is arranged between each of three adjacent first receptacles 302. In other words, each second receptacle 304 has three adjacent first receptacles 302. The first receptacles 302 partially overlap with the second receptacles. This arrangement is illustrated in detail in FIG. 64(B) and schematically in FIG. 64(C).

The overlap is in particular such that each first and second receptacle 302, 304 for the corresponding first or second container forms at least three abutment points that are arranged about the circumference of the receptacle such that the corresponding first or second container is held in the respective receptacle 302, 304. For this purpose, the abutment points must be distributed over more than half of the circumference of the respective receptacle 302, 304. Each second receptacle 304 comprises for this purpose three abutment points 306, each spaced 120° apart from one another about the circumference. An edge of each first receptacle 302 extends over at least more than half of the circumference of the first receptacle 302.

A plurality of carrier plates 300 can be used in the loading system 10 of FIG. 1 or in the loading system of FIGS. 2 to 36, alternatively or in addition to the carrier plates 58, to load and/or unload the freeze dryer 16 with containers 114 of a corresponding container type. In particular, for freeze-drying of first containers of the first container type and for freeze-drying of second containers of the second container type, the same carrier plates can be used. For example, in a first packaging cycle, first containers of a first container type can be filled, freeze-dried, and closed, and in a second packaging cycle, second containers of a second container type can be filled, freeze-dried, and closed. For handling the first and second containers, the same carrier plates 300 can then be used in the loading system 10.

FIGS. 65 and 66 show a second embodiment of a carrier plate 300'. The carrier plate 300' corresponds substantially to the carrier plate 300 of FIGS. 64(A) to (C). The same members are identified by the same reference signs and are not explained in further detail. The carrier plate 300', like the carrier plate 300, comprises on the first side surface 62 first and second receptacles 302, 304, wherein the first and second receptacles are distributed on the first side surface 62 according to the same pattern as for the carrier plate 300. The carrier plate 300' differs from the carrier plate 300 in that the carrier plate 300' comprises on the second side surface 64 third receptacles 308 and fourth receptacles 310.

The third receptacles 308 are configured for receiving third containers of a third container type. The fourth receptacles 310 are configured for receiving fourth containers of a fourth container type, wherein the third container type and the fourth container type are different. The third and fourth receptacles 308, 310 have a cylindrical shape. The diameter of the third receptacles 308 corresponds substantially to the diameter of the third containers of the third container type. The diameter of the fourth receptacles 310 corresponds substantially to the diameter of the fourth containers of the fourth container type. As a result, the diameters of the third and fourth receptacles 308, 310 are configured such that the corresponding containers of the third and fourth container types can be arranged in the respective receptacle with substantially no play. When selecting the diameters, tolerances can be taken into account. For example, the diameter of the receptacles can be 10 μm to 1 mm larger than the diameter of the containers of the corresponding container type to account for manufacturing tolerances.

The diameter of the third receptacles 308 is smaller than a diameter of the fourth receptacles 310. Correspondingly, the diameter of the fourth containers is larger than a diameter of the third containers. For example, the third container type can be 2R or 4R and the fourth container type can be 6R or 8R. Alternatively, the third container type can be 6R or 8R and the fourth container type can be 10R or 15R. Alternatively, the third container type can be 10R or 15R and the fourth container type can be 20R, 25R, or 30R.

Furthermore, the third and fourth container types also differ from the first and second container types. In particular, the diameters of the third and fourth receptacles 308, 310 can be larger than the diameters of the first and second receptacles 302, 304. For example, the first container type is 2R or 4R, the second container type is 6R or 8R, the third container type is 10R or 15R, and the fourth container type is 30R.

Alternatively, also the diameter of the fourth receptacle 310 can be larger than the diameters of the other receptacles 302, 304, 308, wherein the diameter of the third receptacle 308 is larger than the diameter of the first receptacle 302 and smaller than the diameter of the second receptacle 304. For example, the first container type is 2R or 4R, the third container type is 6R or 8R, the second container type is 10R or 15R, and the fourth container type is 30R.

The third and fourth receptacles 308, 310 are distributed at regular distances, in particular according to a regular pattern, on the second side surface 64. The pattern of the distribution thereby corresponds to the pattern of the distribution of the first and second receptacles on the first side surface 62.

The carrier plate 300' can take a first operating position and a second operating position. In each operating position, the side surfaces are oriented horizontally. In the first operating position, the first side surface 62 is the top side of the carrier plate 300' and the second side surface 64 is the bottom side of the carrier plate 300'. In the second operating position, the second side surface 64 is the top side of the carrier plate 300' and the first side surface 62 is the bottom side of the carrier plate 300'. Containers can only be inserted into the receptacles of the top side. As a result, in the first operating position, containers can be received in the first receptacles and/or the second receptacles. Correspondingly, in the second operating position, containers can be received in the third and/or fourth receptacles. As a result, the first operating position is suitable for handling the first and second containers and the second operating position is suitable for handling the third and fourth containers.

A plurality of carrier plates 300' can also be used in the loading system 10 of FIG. 1 or in the loading system of FIGS. 2 to 36 to load and/or unload the freeze dryer 16 with containers 114 of a corresponding container type. For handling the first and second containers, the carrier plates 300' in the first operating position are arranged on the transfer plate 42 and the placement plates 52. For handling the third and fourth containers, the carrier plates 300' are arranged in the second operating position on the transfer plate 42 and the placement plates 52. Thereby, the bottom side of the respective carrier plate 300' lies on the respective transfer plate 42 or placement plate 52, while the containers can be received in the receptacles on the top side of the respective carrier plate 300'.

In this way, for freeze-drying first containers of the first container type, for freeze-drying second containers of the second container type, for freeze-drying third containers of the third container type, and for freeze-drying fourth containers of the fourth container type, the same carrier plates 300' can be used. For example, in a first packaging cycle, first containers of the first container type can be filled, freeze-dried and closed, in a second packaging cycle, second containers of the second container type can be filled, freeze-dried and closed, in a third packaging cycle, third containers of the third container type can be filled, freeze-dried and closed, and in a fourth packaging cycle, fourth containers of the fourth container type can be filled, freeze-dried and closed. For handling the first, second, third and fourth containers, the same carrier plates 300' can then be used in the loading system 10.

FIG. 67 shows an arrangement of three plates 312, 314, 316. These three plates can be used to manufacture a carrier plate 300'. Preferably, each plate 312, 314, 316 is a stainless steel sheet. The first plate 312 thereby comprises recesses that correspond to the shape of the first and second receptacles 302, 304. The recesses extend throughout the plate 312. The third plate 316 also comprises recesses that correspond to the shape of the third and fourth receptacles 308, 310. The recesses extend throughout the plate 316. The second plate 314 comprises recesses that are substantially smaller than the recesses of the first and third plates 312, 316. The recesses of the second plate are cylindrical in shape and also extend throughout the second plate 314. The recesses of the second plate 314 are all the same size and are spaced at regular distances in two spatial directions across the plate 314. A diameter of the recesses of the second plate is less than half the diameter of the first receptacle 302.

The second plate 314 is arranged between the first plate 312 and the third plate 316. The carrier plate 300' is manufactured by connecting the three plates 312, 314, 316 with each other to form, the carrier plate 300'. For example, the three plates can be pressed or bonded together to form the carrier plate 300'.

The carrier plates 58, 200, 300, 300' of the embodiments of FIGS. 1 to 67 can be manufactured from a material or a single material. In principle, any material that is also suitable for use in a clean room is suitable as a material for the carrier plates 58, 200, 300, 300'. For example, the carrier plates 58, 200, 300, 300' can be manufactured from stainless steel or plastic. Materials with a good thermal conductivity are thereby preferred, as this improves the cooling of the containers during the freeze-drying process. In particular, a material can be provided that comprises a coefficient of thermal conductivity that is greater than or equal to 5 W/(m×K), in particular greater than or equal to 8 W/(m×K), in particular greater than or equal to 10 W/(m×K), in particular greater than or equal to 15 W/(m×K). Stainless steel is particularly suitable as a material for the carrier plates.

Alternatively to the production of the carrier plates described in FIG. 67, the carrier plates 58, 200, 300, 300' can also be manufactured by casting, injection molding and/or by processing a block of material, for example by means of drilling or milling.

FIGS. 68 and 69 show a further embodiment of a carrier plate 400. The carrier plate 400 corresponds substantially to the carrier plate 200 of FIGS. 46 to 63. The same elements are identified by the same reference signs and are not explained in further detail. The carrier plate 400 differs from the carrier plate 200 in that the carrier plate 400 is manufactured from two plates.

The carrier plate 400 comprises a first plate 402 and a second plate 404 for this purpose. The plates 402, 404 are connected with each other. For this purpose, the plates 402, 44 can be fixed to each other by means of one or more fastening means. For example, the plates 402, 404 can be screwed and/or glued together. The first plate 402 thereby forms the first side surface 62 and the second plate 404 forms the second side surface 64. In the operating position of the carrier plate 400, the first plate 402 is thus arranged on the top side and the second plate 404 is arranged on the bottom side of the carrier plate 400. At the edge sides 70, 72, the first plate 402 comprises the first, second and third coupling portions 66, 68, 202 and 204.

The carrier plate 400 furthermore comprises a plurality of receptacles 406. The first plate 402 forms the wall of each receptacle 406. The second plate 404 forms the bottom of each receptacle 406. For this purpose, the first plate 402 can comprise a plurality of holes corresponding to the plurality of receptacles 406, which form the walls of the receptacles 406. Correspondingly, the first plate 402 can also be called a reception plate. The second plate 404 can be a substantially planar plate to cover the bottom of the holes and thereby form the bottom of the receptacles 406. Correspondingly, the second plate 404 can also be called a bottom plate.

The second plate 404 can be formed of a material that comprises a thermal conductivity coefficient that is greater than or equal to 5 W/(m×K), in particular greater than or equal to 8 W/(m×K), in particular greater than or equal to 10 W/(m×K), in particular greater than or equal to 15 W/(m×K). In this way, the cooling of the containers during the freeze-drying is improved. The coefficient of thermal conductivity of the material of the first plate 402 can be arbitrary. For example, the second plate (404, 504) can be made of a metal, in particular a stainless steel. The first plate 402 can be made of a plastic, for example.

FIG. 70 shows a further embodiment of a carrier plate 500. The carrier plate 500 corresponds substantially to the carrier plate 400 of FIGS. 68 and 69. The same elements are identified by the same reference signs and are not explained in further detail. The carrier plate 500 differs from the carrier plate 400 in that the carrier plate 400 comprises two different types of receptacles on the first side surface 62.

For this purpose, the carrier plate 500 comprises on the first side surface 62 a plurality of first receptacles 506 and a plurality of second receptacles 508. The first and second receptacles are configured substantially like the receptacles 302, 304 of the carrier plate 300 of FIG. 64 and are arranged on the first side surface 62.

Like the carrier plate 400, also the carrier plate 500 comprises a first plate 502 and a second plate 504. The plates 502 and 504 correspond substantially to the plates 402 and 404. Moreover, the first plate 502 forms the walls of the first receptacles 506 and the walls of the second receptacles 508. For this purpose, the first plate 502 comprises a corresponding number of holes with the respective diameter of the corresponding container type. The second plate 504 then forms the bottom of the first and second receptacles 506, 508.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms “for example,” “e.g.,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A carrier plate for inserting containers filled with a medical, pharmaceutical or cosmetic substance into a freeze dryer, the carrier plate comprises a plurality of receptacles that are each configured to receive a container and a first coupling portion configured to couple the carrier plate with a second coupling portion of another object, wherein the second coupling portion comprises a locking member, and the first coupling portion is engageable with the locking member for coupling.

2. The carrier plate as claimed in claim 1, wherein the receptacles are configured by recesses in a surface of the carrier plate.

3. The carrier plate as claimed in claim 1, wherein the receptacles comprise a cylindrical shape.

4. The carrier plate as claimed in claim 1, wherein the plurality of receptacles comprises first receptacles for receiving first containers of a first container type and second receptacles for receiving second containers of a second container type.

5. The carrier plate as claimed in claim 4, wherein a diameter of the first receptacles substantially corresponds to a diameter of the first container type, and a diameter of the second receptacles substantially corresponds to a diameter of the second container type.

6. The carrier plate as claimed in claim 4, wherein the first receptacles are smaller than the second receptacles.

7. The carrier plate as claimed in claim 4, wherein the first receptacles and the second receptacles are arranged on a first side surface of the carrier plate.

8. The carrier plate as claimed in claim 7, wherein the first side surface in an operating position is a top side of the carrier plate.

9. The carrier plate as claimed in claim 8, wherein in the operating position the first containers are arrangeable in the first receptacles and/or the second containers are arrangeable in the second receptacles.

10. The carrier plate as claimed in claim 7, wherein the first receptacles and the second receptacles are distributed at regular distances on the first side surface.

11. The carrier plate as claimed in claim 10, wherein each of the first receptacles has a same distance to each adjacent first receptacle and each of the second receptacles has a same distance to each adjacent second receptacle.

12. A carrier plate for inserting containers filled with a medical, pharmaceutical or cosmetic substance into a freeze dryer, the carrier plate comprises a plurality of receptacles that are each configured to receive a container, the plurality of receptacles comprises first receptacles for receiving first containers of a first container type and second receptacles for receiving second containers of a second container type, the first receptacles and the second receptacles are arranged on a first side surface of the carrier plate, and the first receptacles and the second receptacles are distributed at regular distances on the first side surface, wherein a distance between adjacent first receptacles is half as great as a distance between adjacent second receptacles.

13. The carrier plate as claimed in claim 10, wherein a respective second receptacle is arranged between three or four adjacent first receptacles.

14. The carrier plate as claimed in claim 10, wherein the first and second receptacles partially overlap.

15. A carrier plate for inserting containers filled with a medical, pharmaceutical or cosmetic substance into a freeze dryer, the carrier plate comprises a plurality of receptacles that are each configured to receive a container and a first plate and a second plate that are connected to each other, wherein the first plate forms a wall of the plurality of receptacles, and the second plate forms a bottom of the plurality of receptacles.

16. The carrier plate as claimed in claim 15, wherein the second plate is formed of a material that comprises a coefficient of thermal conductivity that is greater than or equal to 5 W/(m×K).

17. The carrier plate as claimed in claim 15, wherein the second plate is manufactured from a metal, wherein the first plate is manufactured from a plastic.

18. A carrier plate for inserting containers filled with a medical, pharmaceutical or cosmetic substance into a freeze dryer, the carrier plate comprises a plurality of receptacles that are each configured to receive a container, the plurality of receptacles comprises first receptacles for receiving first containers of a first container type and second receptacles for receiving second containers of a second container type, and the first receptacles and the second receptacles are arranged on a first side surface of the carrier plate, wherein the plurality of receptacles furthermore comprises, on a second side surface, third receptacles for receiving third containers of a third container type and/or fourth receptacles for receiving fourth containers of a fourth container type, and the second side surface opposes the first side surface.

19. The carrier plate as claimed in claim 18, wherein in a first operating position the first side surface is a top side of the carrier plate and the second side surface is a bottom side of the carrier plate, wherein in a second operating position the second side surface is a top side of the carrier plate and the first side surface is a bottom side of the carrier plate.

20. The carrier plate as claimed in claim 1, wherein the first coupling portion is arranged on a first edge side of the carrier plate.

21. The carrier plate as claimed in claim 1, wherein the first coupling portion comprises a holding member, and the second coupling portion is engageable with the holding member for coupling.

22. The carrier plate as claimed in claim 21, wherein the first coupling portion comprises a recess, the holding member is arranged in the recess, and the recess is configured such that the second coupling portion of the other object can engage the recess to couple the carrier plate with the other object.

23. The carrier plate as claimed in claim 1, wherein the other object is a first adjacent carrier plate, and a coupling portion of the first adjacent carrier plate is the second coupling portion.

24. The carrier plate as claimed in claim 1, wherein the carrier plate comprises a second coupling portion configured to couple the carrier plate with a corresponding first coupling portion of a second adjacent carrier plate.

25. The carrier plate as claimed in claim 24, wherein the second coupling portion of the carrier plate is arranged on a second edge side of the carrier plate that opposes a first edge side.

26. The carrier plate as claimed in claim 1, wherein a holding member of the first coupling portion of the carrier plate is configured such that the locking member of the second coupling portion of a first adjacent carrier plate can be engaged with the holding member of the first coupling portion of the carrier plate to couple the carrier plate with the first adjacent carrier plate.

27. The carrier plate as claimed in claim 1, wherein a locking member of a second coupling portion of the carrier plate is configured such that a holding member of a first coupling portion of a second adjacent carrier plate can be engaged with the locking member of the second coupling portion of the carrier plate to couple the carrier plate with the second adjacent carrier plate.

28. The carrier plate as claimed in claim 1, wherein the carrier plate comprises two third coupling portions configured to couple the carrier plate with corresponding coupling portions of another object.

29. The carrier plate as claimed in claim 28, wherein the two third coupling portions are arranged on a second edge side of the carrier plate.

30. The carrier plate as claimed in claim 28, wherein each third coupling portion comprises a holding member, and each corresponding coupling portion of the other object is engageable with the holding member of each third coupling portion for coupling.

31. The carrier plate as claimed in claim 28, wherein each third coupling portion comprises a recess, a holding member is arranged in each recess, and each recess is configured such that each corresponding coupling portion of the other object can engage each recess to couple the carrier plate with the other object.

32. The carrier plate as claimed in claim 1, wherein the other object is a handling device.

33. The carrier plate as claimed in claim 32, wherein the handling device comprises a receiving device having a receiving member forming a coupling portion, wherein the first coupling portion or each third coupling portion of the carrier plate is engageable with the coupling portion of the receiving member for coupling.

34. A carrier plate for inserting containers filled with a medical, pharmaceutical or cosmetic substance into a freeze dryer, the carrier plate comprises a plurality of receptacles that are each configured to receive a container and a first coupling portion configured to couple the carrier plate with a corresponding coupling portion of a handling device, wherein the handling device comprises a linear unit having a pushing member that forms the corresponding coupling portion, wherein the first coupling portion or any third coupling portion of the carrier plate is engageable with the corresponding coupling portion of the pushing member for coupling.

35. A carrier plate arrangement having a plurality of carrier plates for inserting containers filled with a medical, pharmaceutical or cosmetic substance into a freeze dryer, each of the plurality of carrier plates comprises a plurality of receptacles that are each configured to receive a container and a first coupling portion configured to couple the carrier plate with a second coupling portion of a first adjacent carrier plate, wherein the second coupling portion of the first adjacent carrier plate comprises a locking member, and the first coupling portion is engageable with the locking member for coupling.

36. The carrier plate arrangement as claimed in claim 35, wherein adjacent carrier plates are coupled with each other by the corresponding first and second coupling portions.

37. A loading system for a freeze dryer, wherein the loading system comprises one or more handling devices and one or more carrier plates as claimed in claim 1 or a carrier plate arrangement as claimed in claim 35.

38. The loading system as claimed in claim 37, wherein at least one of the handling devices is configured to insert the containers into the receptacles of a carrier plate and/or to remove the containers from the receptacles of the carrier plate.

39. The loading system as claimed in claim 37, wherein at least one of the handling devices is configured to push and/or pull one or more carrier plates into the freeze dryer and/or out of the freeze dryer.

40. The loading system as claimed in claim 37, wherein at least one of the handling devices is configured to couple with at least one carrier plate to move the at least one carrier plate.

41. A freeze-drying system having a freeze dryer and the loading system as claimed in claim 37.

* * * * *